(12) United States Patent
Kang et al.

(10) Patent No.: US 6,191,820 B1
(45) Date of Patent: Feb. 20, 2001

(54) DEVICE AND METHOD FOR CONVERTING ASPECT RATIO OF VIDEO SIGNAL

(75) Inventors: Kyung Jin Kang; Woo Hyun Paik, both of Seoul (KR)

(73) Assignee: LG Electronics Inc., Seoul (KR)

( * ) Notice: Under 35 U.S.C. 154(b), the term of this patent shall be extended for 0 days.

(21) Appl. No.: 09/157,949

(22) Filed: Sep. 22, 1998

(30) Foreign Application Priority Data

Apr. 28, 1998 (KR) .................................................. 98-15110
Apr. 28, 1998 (KR) .................................................. 98-15111
Apr. 28, 1998 (KR) .................................................. 98-15112

(51) Int. Cl.$^7$ ..................................................... H04N 7/01
(52) U.S. Cl. ........................... 348/445; 348/581; 348/704
(58) Field of Search .................................. 348/704, 445, 348/556, 581; 382/298; 345/439, 127

(56) References Cited

U.S. PATENT DOCUMENTS

| | | | |
|---|---|---|---|
| 5,436,669 | * | 7/1995 | Baba et al. ............................. 348/556 |
| 5,537,149 | * | 7/1996 | Teraoka et al. ....................... 348/556 |
| 5,638,130 | * | 6/1997 | Lizzeir ................................. 348/556 |
| 5,760,837 | * | 6/1998 | Izawa et al. ........................... 348/445 |
| 5,764,297 | * | 6/1998 | Sengoku ............................... 348/704 |
| 5,835,813 | * | 11/1998 | Luong et al. ......................... 348/704 |
| 5,856,849 | * | 1/1999 | Aihara ................................... 348/445 |
| 5,917,549 | * | 6/1999 | Simons et al. ........................ 348/441 |
| 5,943,098 | * | 8/1999 | Lagarde et al. ....................... 348/704 |
| 5,956,092 | * | 9/1999 | Ebihara et al. ....................... 348/445 |

* cited by examiner

Primary Examiner—Victor R. Kostak
(74) Attorney, Agent, or Firm—Fleshner & Kim, LLP

(57) ABSTRACT

Device and method for converting an aspect ratio of a video signal, is disclosed, in which an aspect ratio of an image at an arbitrary position can be converted to an arbitrary value, the device including means for generating arbitrary mapping information on the received image in image block units defined by the horizontal, and vertical sections, and means for determining the aspect ratio of the received image for a block using the arbitrary mapping information and converting the received image, varying a vertical display ratio for each horizontal position and/or a horizontal display ratio for each vertical position, of the received image with the aspect ratio, and the method including the steps of generating arbitrary mapping information on the received image in image block units defined by the horizontal, and vertical sections, and determining the aspect ratio of the received image for a block using the arbitrary mapping information and converting the received image, varying a vertical display ratio for each horizontal position and/or a horizontal display ratio for each vertical position, of the received image with the aspect ratio.

40 Claims, 43 Drawing Sheets

FIG.2d
FIG.2e
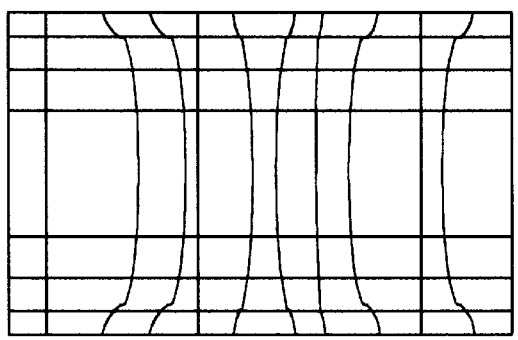
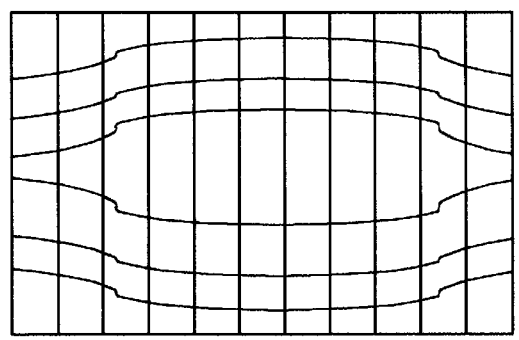
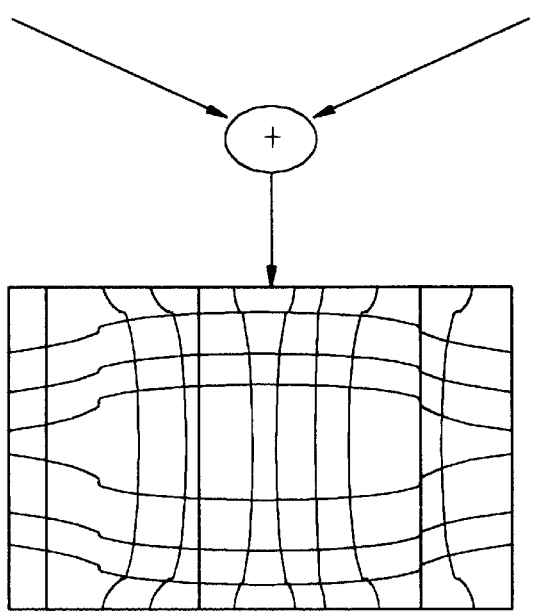
FIG.2f

DEVICE AND METHOD FOR CONVERTING ASPECT RATIO OF VIDEO SIGNAL

BACKGROUND OF THE INVENTION

1. Field of the Invention

The present invention relates to a device and a method for converting an aspect ratio of a video signal, and more particularly, to a device and a method for converting an aspect ratio of a video signal in which an aspect ratio of an image at an arbitrary position can be converted to an arbitrary value.

2. Discussion of the Background Art

As a society is more and more information oriented, images become more and more abundant such that even general people have frequent contact with the images, and as forms of the images become to have variety, cases when the images are edited even in homes or offices are increasing more and more. Most of the editions of images up to now are done on personal computers. In most of the cases, the image edition is based on a method in which image data are read from a video RAM, make modification of the data and using the data again.

A television receiver is not a device on which edition of images can be made as it has been designed to display images as they were. Since the television receiver has in general a fixed aspect ratio of 4:3 or 16:9, when it is desired to convert the aspect ratio of the image, the conversion up to now is limited to changing of an overall aspect ratio. This is merely a processing of images for the convenience of watch rather than an image edition.

FIG. 1 illustrates a system block diagram of a general analog type deflective wave generator.

Referring to FIG. 1, the general analog type deflective wave generator is provided with horizontal and vertical sawtooth wave generating circuits 11 and 21 for generating horizontal and vertical sawtooth waves synchronous to horizontal and vertical synchronizing signals Hsync/Vsync respectively, horizontal and vertical S-form modifying circuits 12 and 22 for modifying starting and end portions of the sawtooth waves from the horizontal and vertical sawtooth wave generating circuits 11 and 21 to S-forms respectively, and current amplifiers 13 and 23 for amplifying signals from the horizontal and vertical S-form modifying circuits 12 and 22 to a prescribed levels and providing to a CRT, respectively. The horizontal and vertical sawtooth waves are set to be scanned in one direction, for example, from left to right, or from top from down, at fixed intervals.

And, a technique in which a deflection slope or a read/write clock speed of a display is controlled for changing the aspect ratio is suggested in U.S. Pat. No. 5,537,149. However, this technique can only convert an overall aspect ratio, linearly as a display ratio for an entire screen is fixed in vertical or horizontal direction of the screen. An image may be horizontally converted at a fixed ratio for all vertical directions by the horizontal S-form modification or may be vertically converted at a fixed ratio for all horizontal directions by the vertical S-form modification.

And, a technique is suggested, in which images are stored in a line memory and a field memory and subjected to compression or expansion interpolation between adjacent two pixels ro two lines, for changing the aspect ratio. However, in this technique, a ratio of the data interpolation is fixed for the entire screen in a horizontal or vertical direction, only allowing a fixed ratio conversion for the entire screen.

In the aforementioned techniques, since the scanning in general display is made in one direction(in general from left to right and from top to bottom) at fixed intervals, horizontal scanning lines and vertical scanning lines cross at right angles. That is, as shown in FIG. 2a, a regular frame of an image before conversion of an aspect ratio(an image display ratio is 1) shows a fixed ratio between scamming times and scanning distances expressed in the following equation (1) both in horizontal and vertical directions at any point 1(x1, y1) on the screen.

$$t_{x11}:t_{x12}=d_{x11}d_{12} \text{ and } t_{y11}:t_{y12}=d_{y11}:d_{y12} \qquad (1)$$

However, there is no techniques suggested presently yet, in which an aspect ratio of only a portion of a frame is converted for an improved image better than original image or to serve for a particular purpose intentionally. If conversion of an aspect ratio for a particular portion of an entire frame is possible, an improved image can be provided by high lighting characterized part of the image, and this technique will find wide application to various fields in image display.

SUMMARY OF THE INVENTION

Accordingly, the present invention is directed to a device and a method for converting an aspect ratio of a video signal that substantially obviates one or more of the problems due to limitations and disadvantages of the related art.

An object of the present invention is to provide a device and a method for converting an aspect ratio of a video signal, in which any video signal can be displayed in an aspect ratio the most suitable to a given screen regardless of an aspect ratio.

Another object of the present invention is to provide a device and a method for converting an aspect ratio of a video signal, in which an aspect ratio of only a portion of a frame can be converted arbitrarily for displaying a desired form of image.

Other object of the present invention is to provide a device and a method for converting an aspect ratio of a video signal, in which a deflective wave can be generated for varying an aspect ratio of any portion of a frame as desired.

Further object of the present invention is to provide a device and a method for converting an aspect ratio of a video signal, in which a clock for a portion of a video signal is made different for changing an aspect ratio of the image at a particular portion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for converting an aspect ratio of a video signal, the device displaying a received image on a screen divided into a plurality of horizontal, and vertical sections, includes means for generating arbitrary mapping information on the received image in image block units defined by the horizontal, and vertical sections, and means for determining the aspect ratio of the received image for a block using the arbitrary mapping information and converting the received image, varying a vertical display ratio for each horizontal position and/or a horizontal display ratio for each vertical position, of the received image with the aspect ratio.

In other object of the present invention, there is provided a device for converting an aspect ratio of a video signal, the device displaying a received image on a screen divided into a plurality of horizontal sections and vertical sections, including means for generating interpolation ratio conversion extent information on the received image in image block units defined by the horizontal, and vertical sections, and means for making different conversion of an interpolation ratio for a block for each horizontal, and/or vertical positions using the interpolation ratio conversion extent information.

In other object of the present invention, there is provided a device for converting an aspect ratio of a video signal, the device displays a received image on a screen divided into a plurality of horizontal sections and vertical sections, including means for generating deflective ratio conversion extent information on the received image in image block units defined by the horizontal, and vertical sections, and means for making different conversion of a deflective ratio for a block for each horizontal, and/or vertical positions using the deflective ratio conversion extent information.

In further aspect of the present invention, there is provided a device for converting an aspect ratio of a video signal, the device displays a received image on a screen divided into a plurality of horizontal sections and vertical sections, including means for generating clock speed conversion extent information on the received image in image block units defined by the horizontal, and vertical sections, and means for making different conversion of a clock speed for a block for each horizontal, and/or vertical positions using the clock speed conversion extent information.

In still other aspect of the present invention, there is provided a method for converting an aspect ratio of a video signal, in which a received image is displayed on a screen divided into a plurality of horizontal, and vertical sections, including the steps of generating arbitrary mapping information on the received image in image block units defined by the horizontal, and vertical sections, and determining the aspect ratio of the received image for a block using the arbitrary mapping information and converting the received image, varying a vertical display ratio for each horizontal position and/or a horizontal display ratio for each vertical position, of the received image with the aspect ratio.

In still another aspect of the present invention, there is provided a method for converting an aspect ratio of a video signal, in which a received image is displayed on a screen divided into a plurality of horizontal, and vertical sections, including the steps of (1) generating interpolation ratio conversion extent information on the received image in image block units defined by the horizontal, and vertical sections, (2) receiving, decoding, and storing the interpolation ratio conversion extent information, and (3) determining horizontal and/or vertical interpolation ratio conversion extents of the received image for a block using the stored interpolation ratio conversion extent information and converting the received image varying an interpolation ratio for each horizontal and/or vertical positions, of the received image, with the conversion extents.

In still further aspect of the present invention, there is provided a method for converting an aspect ratio of a video signal, in which a received image is displayed on a screen divided into a plurality of horizontal, and vertical sections, including the steps of (1) generating deflective ratio conversion extent information on the received image in image block units defined by the horizontal, and vertical sections, (2) receiving, decoding, and storing the deflective ratio conversion extent information, and (3) determining horizontal and/or vertical deflective ratio conversion extents of the received image for a block using the stored interpolation ratio conversion extent information and converting the received image varying a deflective ratio for each horizontal and/or vertical positions, of the received image, with the conversion extents.

In yet further aspect of the present invention, there is provided a method for converting an aspect ratio of a video signal, in which a received image is displayed on a screen divided into a plurality of horizontal, and vertical sections, including the steps of (1) generating clock speed conversion extent information on the received image in image block units defined by the horizontal, and vertical sections, (2) receiving, decoding, and storing the clock speed conversion extent information, and (3) determining horizontal and/or vertical clock speed conversion extents of the received image for a block using the stored clock speed conversion extent information and converting the received image varying a clock speed for each horizontal and/or vertical positions, of the received image, with the conversion extents.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2d illustrates the regular frame in FIG. 2a after a horizontal conversion at another fixed ratio for all vertical sections of the frame;

FIG. 2e illustrates the regular frame in FIG. 2a after a vertical conversion at another fixed ratio for all horizontal sections of the frame;

FIG. 2f illustrates the regular frame in FIG. 2a after vertical and horizontal conversions at different ratios for all horizontal and vertical sections of the frame;

FIG. 37 illustrates a block diagram of the horizontal processor shown in FIG. 36a;

DETAILED DESCRIPTION OF THE PREFERRED EMBODIMENT

Reference will now be made in detail to the preferred embodiments of the present invention, examples of which are illustrated in the accompanying drawings.

FIRST EMBODIMENT

Figure 3:
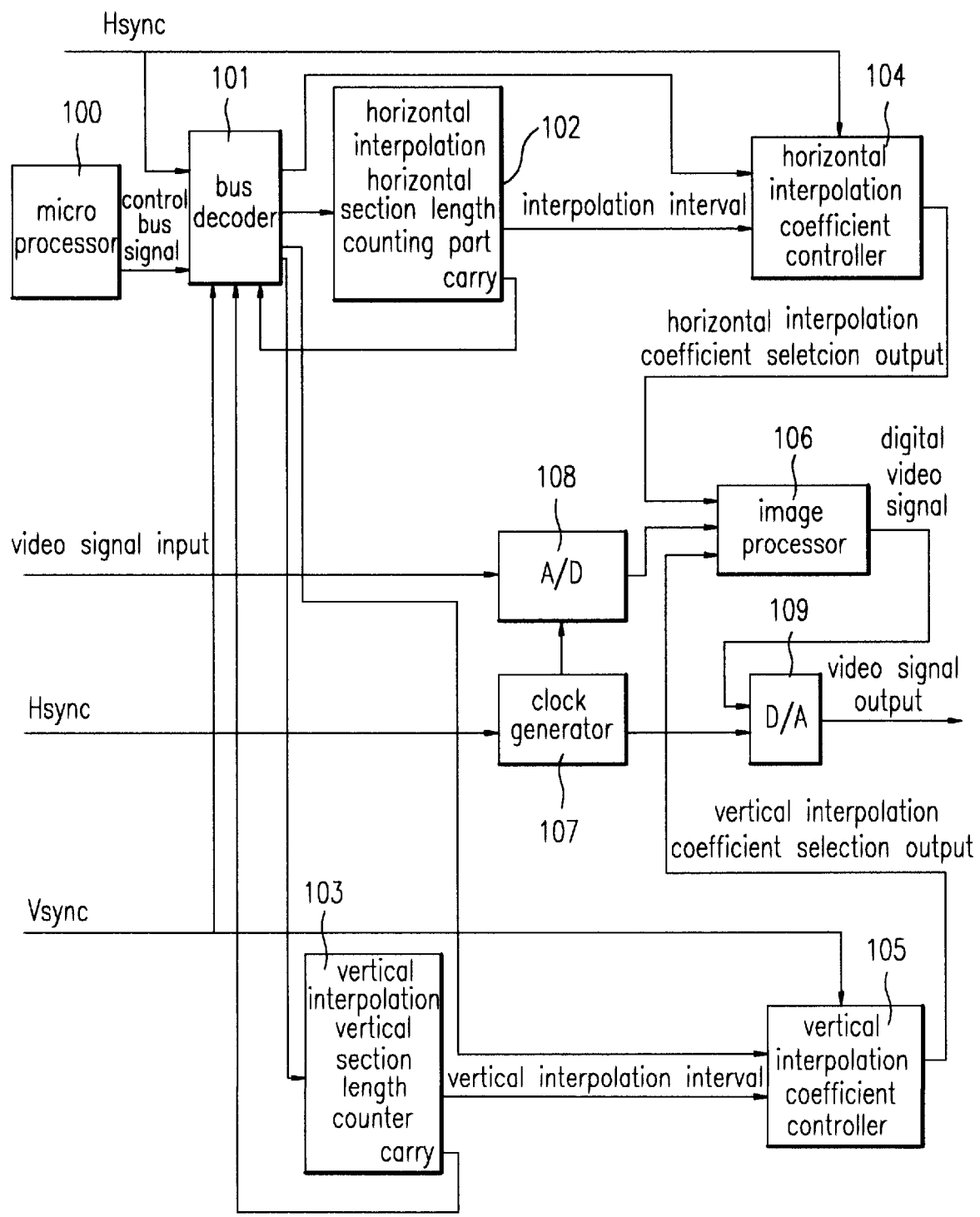
FIG. 3 illustrates a block diagram of a device for converting an aspect ratio of a video signal in accordance with one preferred embodiment of the present invention.

The system and operation of a device for converting an aspect ratio of a video signal in accordance with a first preferred embodiment of the present invention will be explained with reference to FIGS. 3~15. FIG. 3 illustrates a block diagram of a device for converting an aspect ratio of a video signal in accordance with one preferred embodiment of the present invention.

Referring to FIG. 3, the device for converting an aspect ratio of a video signal in accordance with one preferred embodiment of the present invention includes a microprocessor 100 for generating interpolation ratio conversion extent information for each block formed by horizontal and vertical sections, a bus decoder 101 for decoding and storing the interpolation ratio conversion extent information received from the micro-processor 100, and an interpolation ratio controller for using the interpolation ratio conversion extent information stored in the bus decoder 101 in determining horizontal and/or vertical interpolation ratio conversion extent in a preset order for each block and changing an interpolation ratio as much as the conversion extent for horizontal and/or vertical direction. The interpolation ratio controller includes a horizontal interpolation horizontal section length counting part 102 for determining horizontal section lengths according to the interpolation ratio conversion extent information stored in the bus decoder 101, a vertical interpolation vertical section length counting part 103 for determining vertical section lengths according to the interpolation ratio conversion extent information stored in the bus decoder 101, a horizontal interpolation coefficient controller 104 for selecting a coefficient required for a horizontal interpolation according to the interpolation ratio conversion extent information from the bus decoder 101, a vertical interpolation coefficient controller 105 for selecting a coefficient required for a vertical interpolation according to the interpolation ratio conversion extent information from the bus decoder 101, and an image processor 106 for subjecting an image to horizontal and/or vertical interpolation according to horizontal and/or vertical interpolation values from the horizontal interpolation coefficient controller 104 and/or the vertical interpolation coefficient controller 105.

In the aforementioned device for converting an aspect ratio of a video signal in accordance with a first embodiment of the present invention, an entire frame is divided into a plurality of sections by means of the micro-processor 100 and the interpolation ratio is converted for each of the sections. Of course, application of the interpolation conversion ratio even to each pixel is also possible if a size of a memory for storing conversion control data is enough and a picture quality degradation from too sharp a slope conversion does not matter. However, in the present embodiment, a frame is divided into minute sections only to an extent a naked eye can not distinguish section boundaries, and the interpolation ratio conversion is processed section by section for preset plurality of sections. That is, referring to FIGS. 7a and 7b, an entire frame is divided into 64 sections both in horizontal and vertical directions. Each section has a section length which is not equal between sections, and, in the present invention, each section can have 1~64 pixels(or lines in vertical direction) as necessary. Accordingly, no matter how much sharp interpolation ratio is given in view of eye sight, the section boundaries can not be seen. The bus decoder 101 in FIG. 3 receives a series of control buses from the micro-processor 100 and stores data bits required for the horizontal and vertical 64 sections. Thus, horizontal and vertical interpolation ratios for a block in question can be obtained from the stored data. The horizontal interpolation horizontal section length counting part 102 or the vertical interpolation vertical section length counting part 103 count each section as much as a length of the section by pixel clock or horizontal synchronizing signal Hsync, to inform an end of the section if a carry is occurred and to go over to the next horizontal or vertical section. The horizontal interpolation coefficient controller 104 receives information on expansion/compression or non-interpolation (two bits) from the bus decoder 101 and selects a coefficient required for a horizontal interpolation. Then, the image processor 106 makes a horizontal interpolation of an image to be displayed at a desired ratio according to a horizontal interpolation value from the horizontal interpolation coefficient controller 104. And, the vertical interpolation coefficient controller 105 receives information on expansion/compression or non-interpolation (two bits) from the bus decoder 101 and selects a coefficient required for a vertical interpolation. Then, the image processor 106 makes a vertical interpolation of an image to be display at a desired ratio according to a vertical interpolation value from the vertical interpolation coefficient controller 105. The division into 64 sections both in horizontal and vertical directions implies that directions (expansion or compression) of the interpolation ratio may be changed maximum up to 64 times, with maximum 64 curves for an interpolation and an interpolation ratio curve cycling in horizontal and vertical directions maximum 32 times. Therefore, section boundaries can not be almost seen in view of eye sight characteristic, and, moreover, since a section length is adjusted as necessary, desired horizontal and vertical interpolations can be done as desired.

Figure 4:
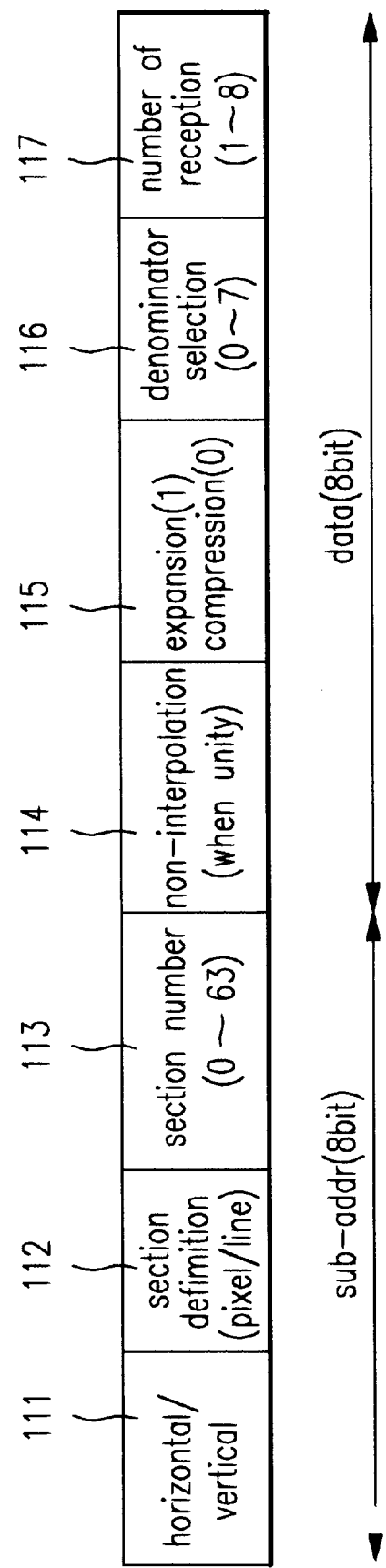
FIG. 4 illustrates a format of a control bus from the micro-processor shown in FIG. 3.

FIG. 4 illustrates a control bus format used between the micro-processor 100 and the bus decoder 101.

Referring to FIG. 4, the control bus format provided to the bus decoder 101 includes a horizontal/vertical interpolation indicating section 111 for indicating a following data to be applicable in horizontal or vertical interpolation, a section definition indicating section 112 for indicating a horizontal section or a vertical section in a horizontal interpolation, a section number indicating section 113 for indicating a selected section within a preset sections, a non-interpolation indicating section 114 for indicating conduction of interpolation, an expansion/compression indicating section 115 for indicating increase/decrease of data on image to be provided according to a condition of the non-interpolation indicating section 114, and a denominator selection indicating section 116 and a repetition times indicating section 117 both for calculating a section length. The horizontal/vertical interpolation indicating section 111, section definition indicating section 112 and section number indicating section 113 may be classified as a sub-address section, and the non-interpolation indicating section 114, expansion/compression indicating section 115, denominator selection indicating section 116 and repetition times indicating section 117 may be classified as a data indicating section. The horizontal/vertical interpolation indicating section 111 has one bit for serving to indicate a following data of being applicable to a horizontal interpolation or a vertical interpolation. The section definition indicating section 112 has one bit for serving to indicate that, in a same horizontal interpolation, horizontal interpolations of different ratios are conducted for positions different in a vertical direction. The section number indicating section 113 has six bits, indicating section numbers 0~63(or 1~64). The non-interpolation indicating section 114 has one bit, indicating non-execution of an interpolation when the bit has a value of unity and leaving numbers of data of an input and an output images the same. In this instance, a bit value in the expansion/compression indicating section 115 is ignored, automatically. On the contrary, if the bit value in the expansion/compression indicating section 115 is zero, a number of video data is increased when a bit value of the one bit in the expansion/compression indicating section 115 is unity and a number of video data is decreased when a bit value of the one bit in the expansion/compression indicating section 115 is zero. Each of the denominator selection indicating section 116 and repetition times indicating section 117 has three bits for calculating a section length. The section length is a number of pixels(or lines when it is vertical) for which the same operation is made at the present interpolation ratio. The number is calculated in the horizontal or vertical section length counting part 102 or 103.

The operation of the bus decoder 101 for use in a horizontal interpolation will be explained referring to FIG. 5.

In this first embodiment, a 8 bits×64 memory 126 is included additionally, as the horizontal interpolation is conducted dividing a frame not only in horizontal direction, but also in vertical direction and applying different horizontal interpolation ratios to each of the vertical sections. A 64×1 multiplexer(MUX) 129 selects a vertical section according to a horizontal interpolation vertical section number from the memory 126, calculates a vertical section length of the selected section and provides to the horizontal interpolation vertical section length counting part 131. The vertical section length counting part 131 counts lines as many as the calculated vertical section length, and, when a carry is occurred, informs that an end of the vertical section comes and makes the carry to act as a clock of a modular counter MC2 so that an output of the modular counter MC2 selects the next inputs of the 6 bits×1 MUX 129 and the 8 bits×1 MUX(128a–128n) for use in selecting vertical sections. Since the 8 bit data for any vertical section selected thus has 64 conversion data for each horizontal section. The carry produced in the horizontal interpolation horizontal section length counting part 102 is provided to the 64×1 MUX 130 through the modular counter MC1 to provide a horizontal section number. Accordingly, the horizontal section selecting MUX 130 provides the present 6 bit(a horizontal section length of the present block) to the horizontal interpolation horizontal section length counting part 131 for moving over to the next block. Also, in a vertical interpolation, alike the horizontal interpolation, a carry from the vertical interpolation vertical section length counting part 103 shown in FIG. 3 is received so that the modular counter MC7 shown in FIG. 6 selects a vertical section.

Figure 6:
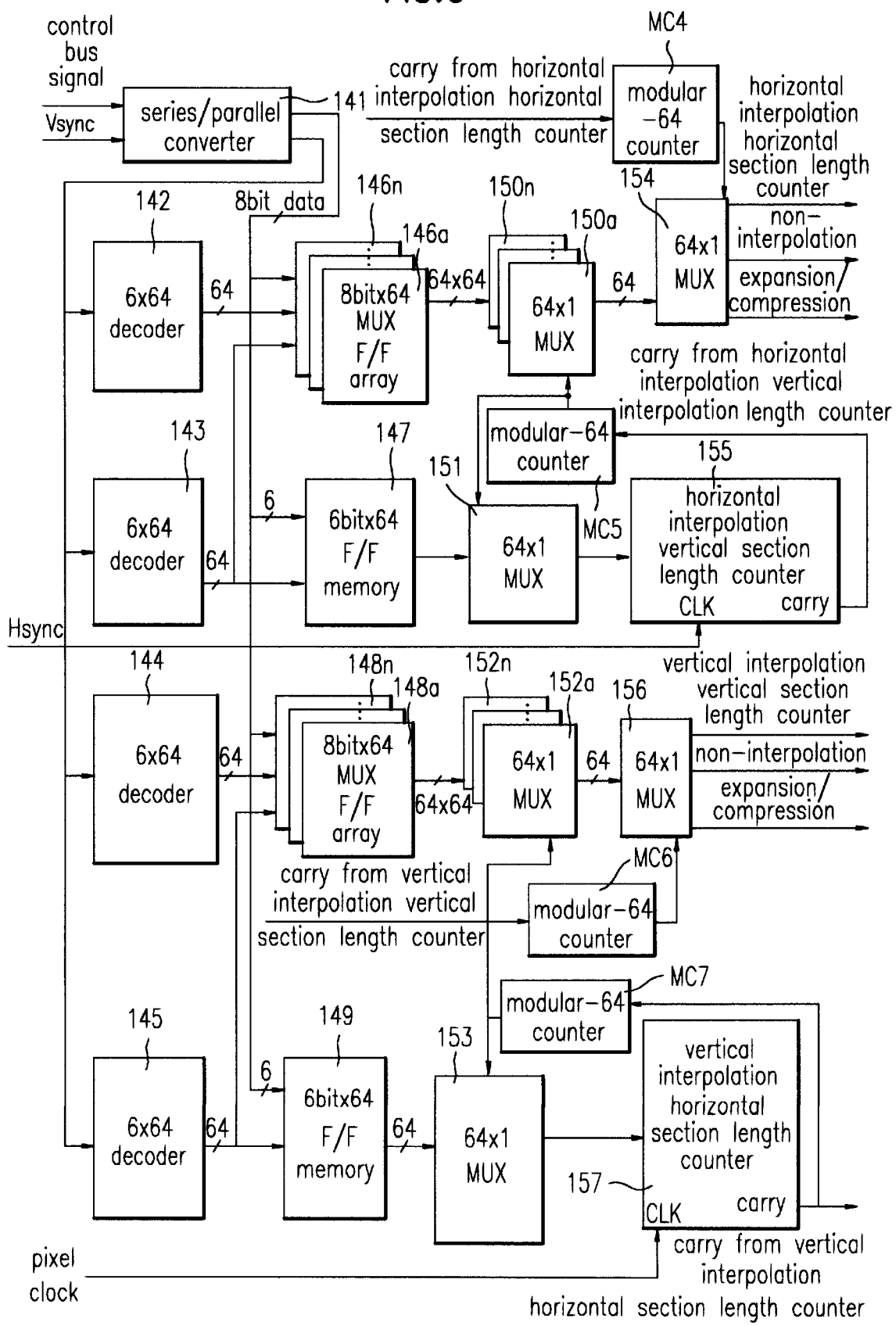
FIG. 6 illustrates a block diagram of another embodiment of the bus decoder shown in FIG. 5.
Figure 7A:
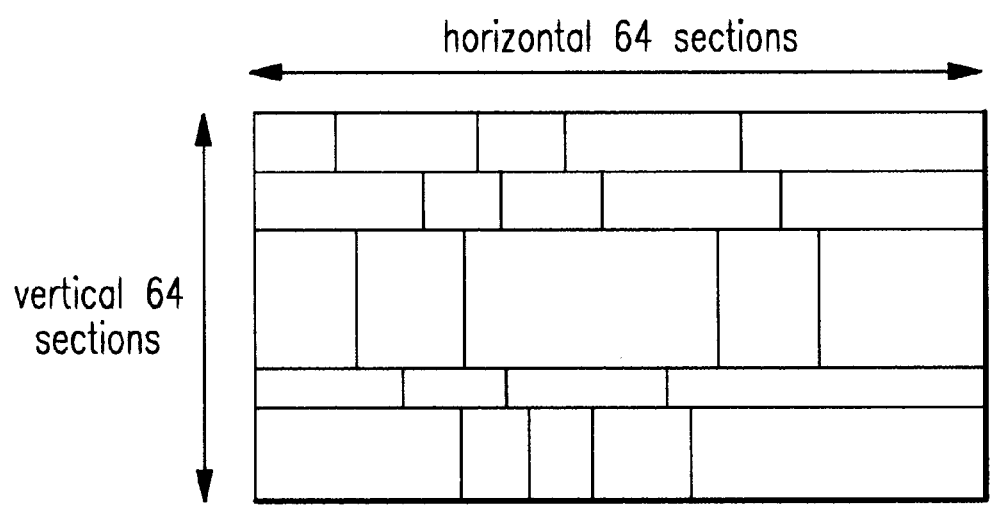
FIGS. 7a and 7b illustrates a frame with 64 horizontal, and vertical sections.
Figure 7B:
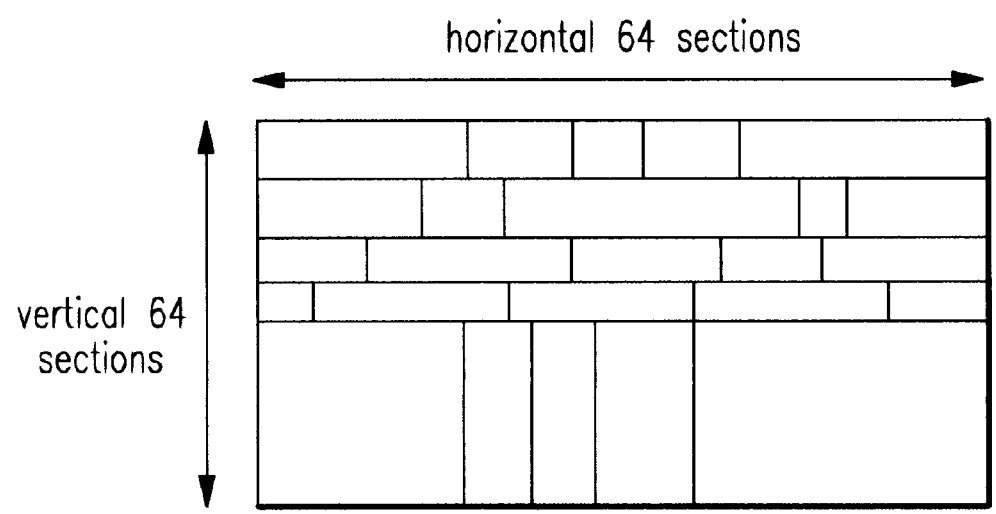
Figure 8:
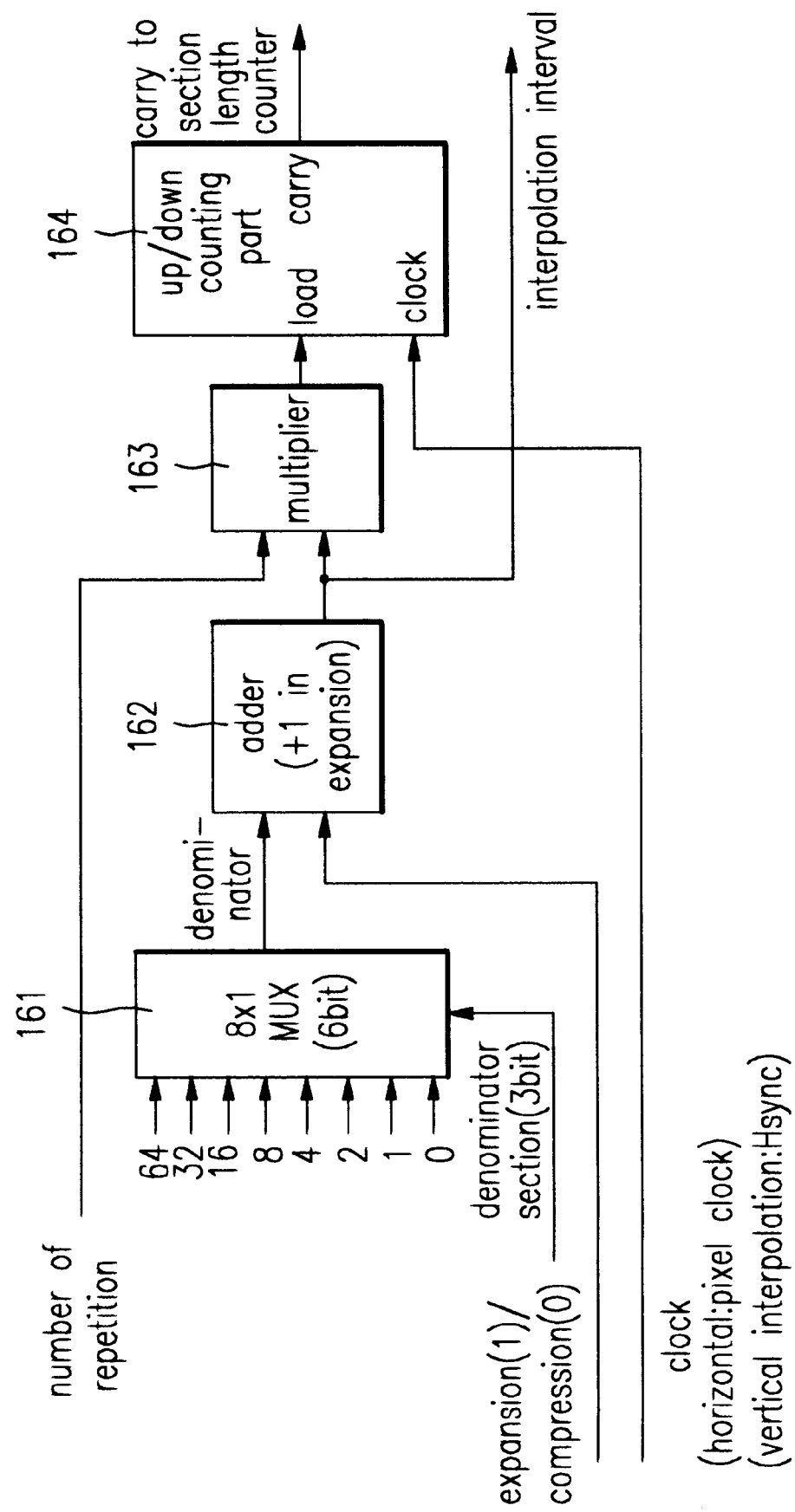
FIG. 8 illustrates a block diagram of the horizontal interpolating horizontal section length counting part or the vertical interpolating vertical section length counting part shown in FIG. 3.

As shown in FIGS. 7a~7b, in the first embodiment of the present invention, blocks formed by vertical and horizontal sections for horizontal interpolations and blocks formed by vertical and horizontal sections for vertical interpolations may be provided separately. However, in FIG. 5, vertical sections provided differently only in the horizontal interpolation while all horizontal section are converted at fixed rates. FIG. 6 illustrates another embodiment of a bus decoder in which the bus decoder 101 shown in FIG. 5 is further extended for applying different conversion ratios for horizontal sections even in vertical interpolations. In this instance, a block size may be fixed by fixing lengths of horizontal and vertical sections, arbitrarily. As all the block should be divided such that no blocks are overlapped or no gap is formed between the blocks, for convenience sake, vertical lengths for horizontal sections in a vertical section are fixed the same. This is because the interpolation is proceeded from left to right and from top to bottom of a display, but this in not necessarily means that the horizontal lines can not be curved in top and bottom directions. When the image processor 106 shown in FIG. 3 is applied to the bus decoder system 101 shown in FIG. 6, the horizontal and vertical lines may be curved in top and bottom directions by valuing vertical interpolation ratio for each horizontal section. FIG. 8 illustrates a block diagram of the horizontal interpolation horizontal section length counting part 102 and the vertical interpolation vertical section length counting part 102 shown in FIG. 3, wherein a denominator selection and repetition times values are received from the bus decoder 101 in calculating a section length and the section length is taken as a counter load value in driving an up/down counting part 164. The section length is obtained by multiplying the denominator and the repetition times. In the embodiments of the present invention, a system in which entire operation is processed by one clock is taken as an example. And, if an expansion or compression ratio is expressed in a fraction, the ratio may expressed as ((denominator+1)/denominator) in the case of expansion and as ((denominator−1)/denominator) in the case of compression. And, all the denominator taken is only limited to an exponent of 2 which is convenient for digital processing. Therefore, since an output data has a number less than a number of an input data by one in a compression, one cycle of interpolation is processed when clocking times as many as the denominator are passed while, since an output data has a number greater than a number of an input data by one in an expansion, one cycle of interpolation is processed only when clocking times greater than the denominator by one are passed, that is, clocking as many as the numerator which is the denominator plus 1 in the expansion is required. This up/down counting part 164 has an output which provides information beginning the next section to the bus decoder 101.

Figure 9:
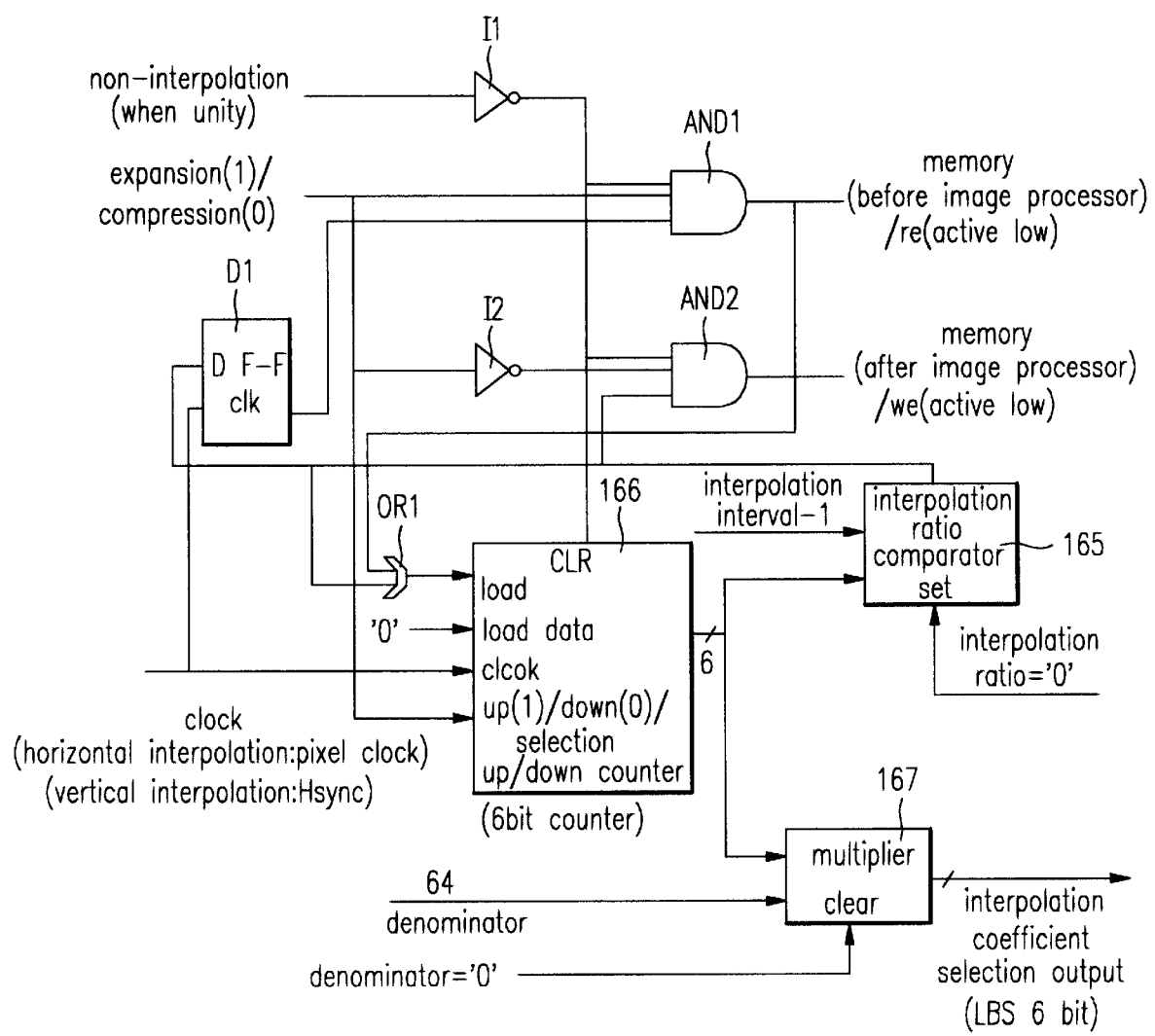
FIG. 9 illustrates a block diagram of the horizontal or the vertical interpolating coefficient controller shown in FIG. 3.

FIG. 9 illustrates a block diagram showing a system of the horizontal and the vertical interpolation coefficient controller 104 and 105 shown in FIG. 3, which provides information which makes to select interpolation coefficients according to an order of interpolation to the image processor 106. As input/output image data numbers are the same when a bit value in the non-interpolation indicating section 114 is unity, /re or /we of the memory is need not to be disabled, and, as interpolation coefficient is also left as zero(the present data is mixed with the next data in a ratio of 1:0), the present data is made to be provided as it is. In a case when it is not the non-interpolation, in the expansion, a number of input data is made less than a number of output data by one by stopping data reading of the image processor 106 from a forward memory once when the interpolation is started(one clock later after the counter counts as many as an interpolation period). Opposite to this, in the compression, a number of output data is made less than a number of input data by one by stopping data writing of the image processor 106 on a backward memory once at the last clock in an interpolation period when the counter counts as many as the interpolation period).

Figure 5:
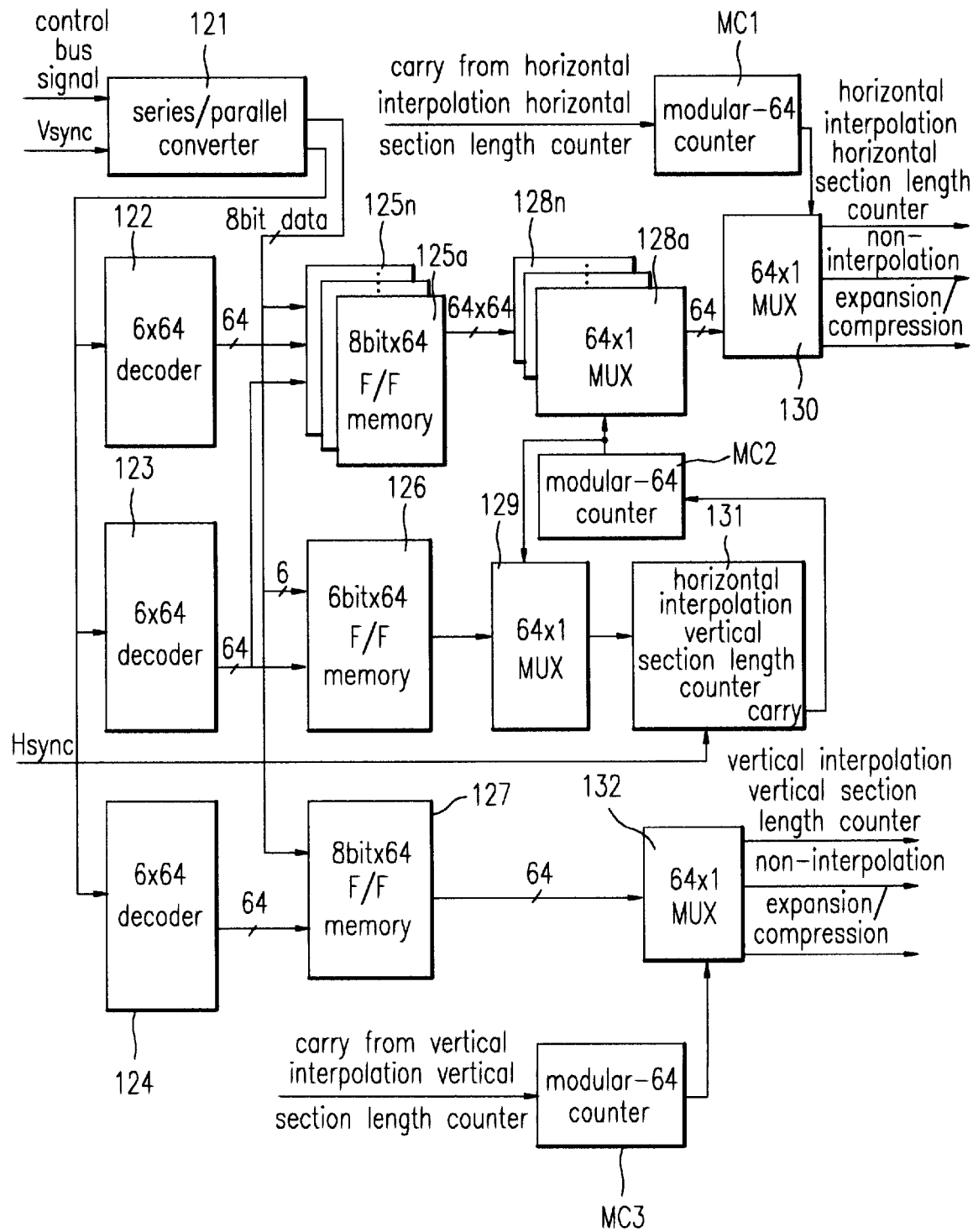
FIG. 5 illustrates a block diagram of the bus decoder shown in FIG. 3.
Figure 10:
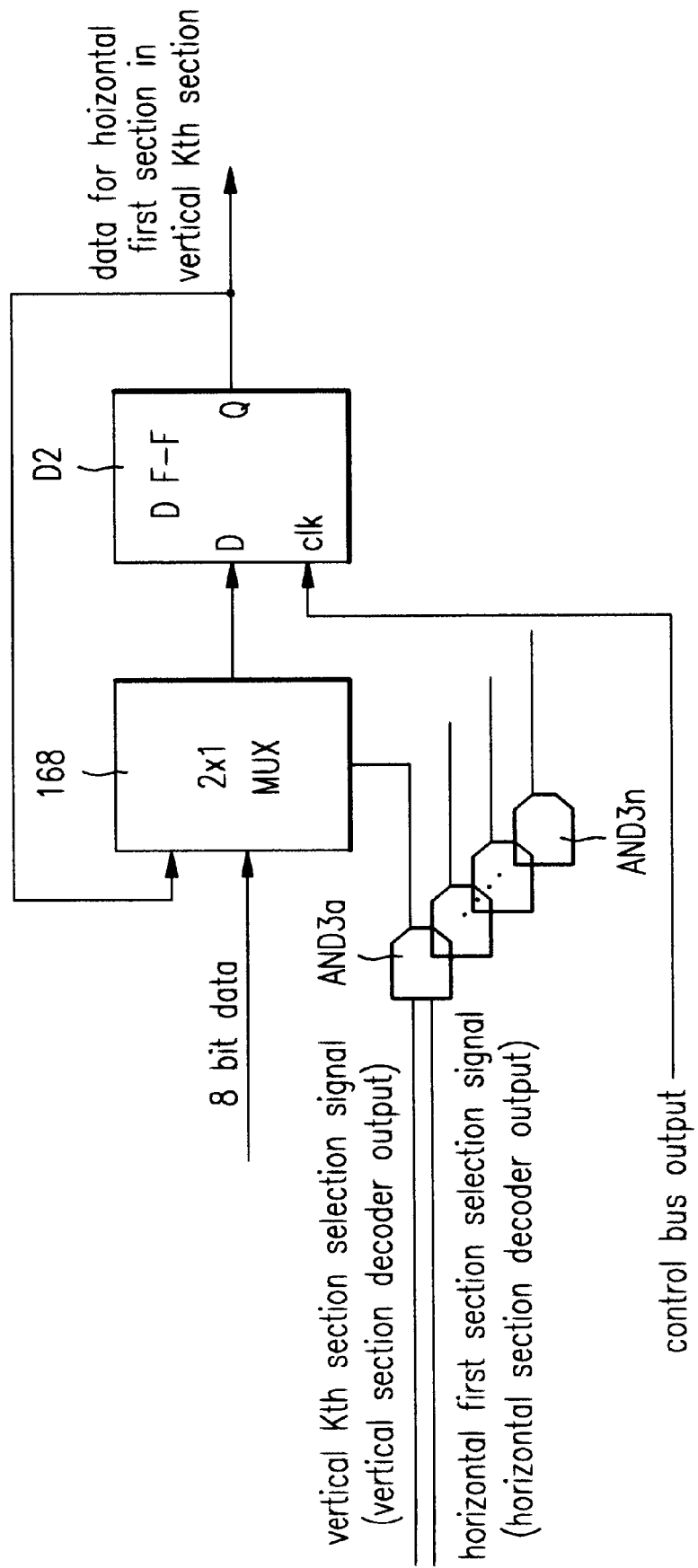
FIG. 10 illustrates a block diagram of the flipflop array type memory shown in FIG. 5.

FIG. 10 illustrates a block diagram of the flipflop array type memory 125a–125n shown in FIG. 5, showing how the memories 125a–125n store the 8 bit data with data on the horizontal sections and the vertical sections identified. That is, the 8 bit data is provided to the 8 bit memory 125a–125n as the selection signal to the 2×1 MUX 168 shown in FIG. 10 is transited to high when decoder outputs for a vertical Ith section and a horizontal Ith section are high on the same time. However, in cases other than above, the present value is kept feeding back to maintain its own value.

Figure 11:
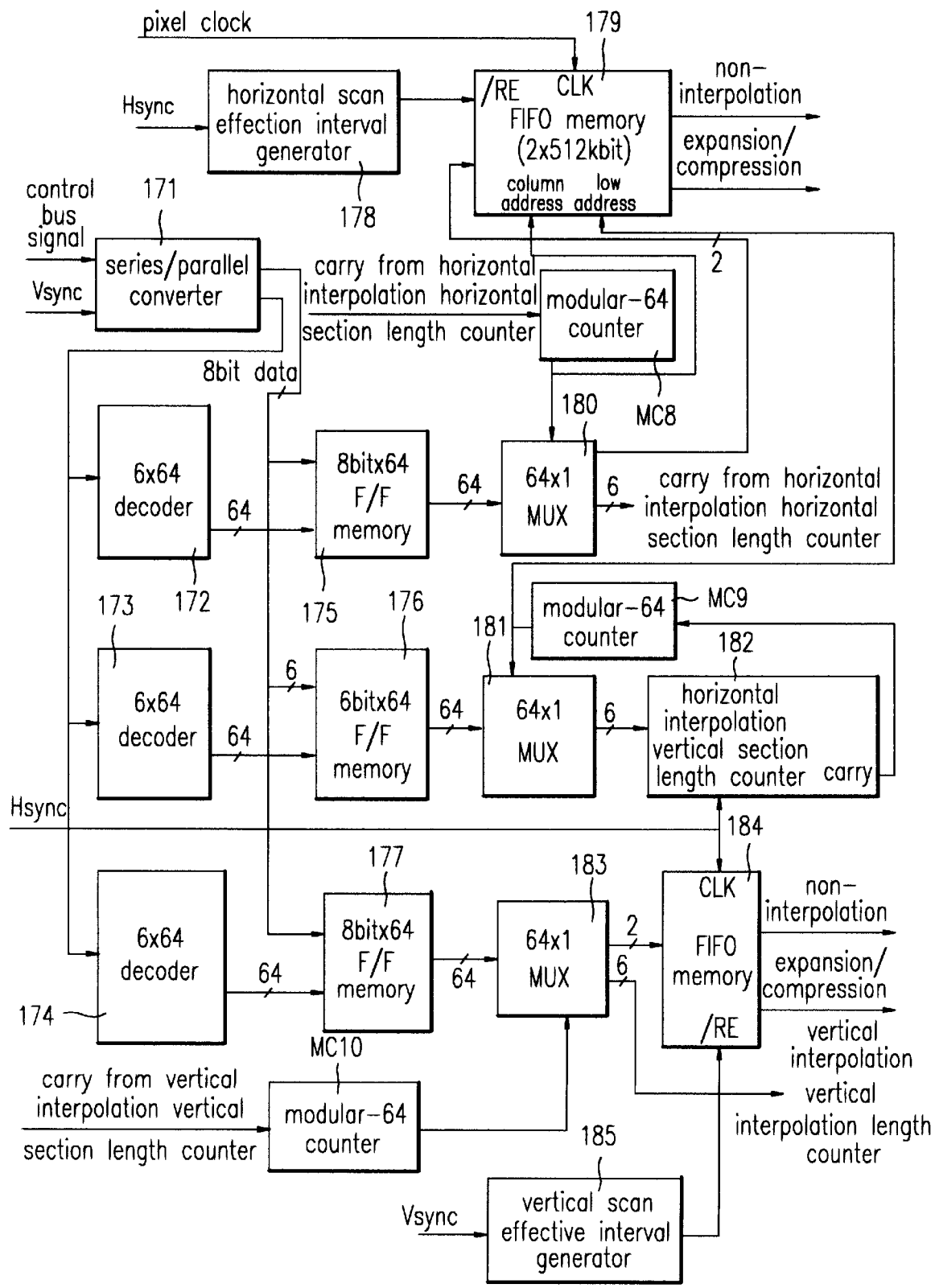
FIG. 11 illustrates a block diagram of another embodiment of the bus decoder shown in FIG. 5.

FIG. 11 illustrates a block diagram showing another embodiment of the bus decoder in FIG. 5, wherein flipflop memories 175 and 177 are used instead of the 64×64 8 bit flipflop array used in FIG. 5 for a horizontal interpolation. Since these are in storage of non-interpolation and expansion/compression bit information as much as given lengths for each block, these may be a sort of 2 bit field memory. And, as shown in FIG. 5, the 2 bit field memory should be used when horizontal sections are provided in a vertical interpolation with different conversion ratios. However, for a vertical interpolation, 2 bit data may be stored only in a vertical direction for a flipflop memory 197 to use 2 bit line memory in vertical direction. In the embodiments of the present invention, what is required for a horizontal interpolation is storage of 2 bit data required for producing a horizontal interpolation value in a flipflop memory 195 during a horizontal scan effective interval, and what is required for a vertical interpolation is storage of 2 bit data required for producing a vertical interpolation value during a vertical scan effective interval.

Figure 12:
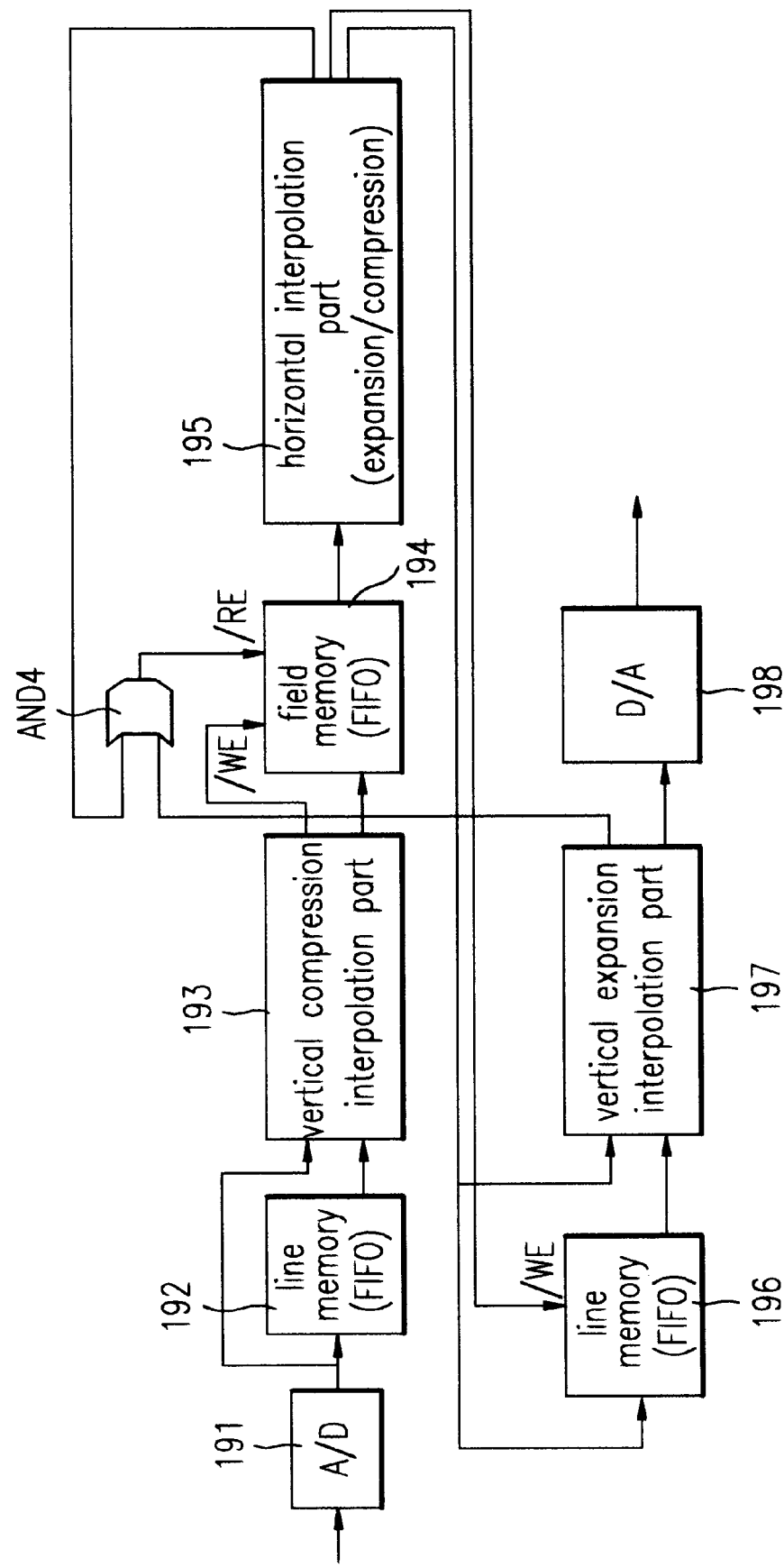
FIG. 12 illustrates a block diagram of the image processor shown in FIG. 5.

FIG. 12 illustrates a block diagram of the image processor 106 shown in FIG. 3.

Figure 13:
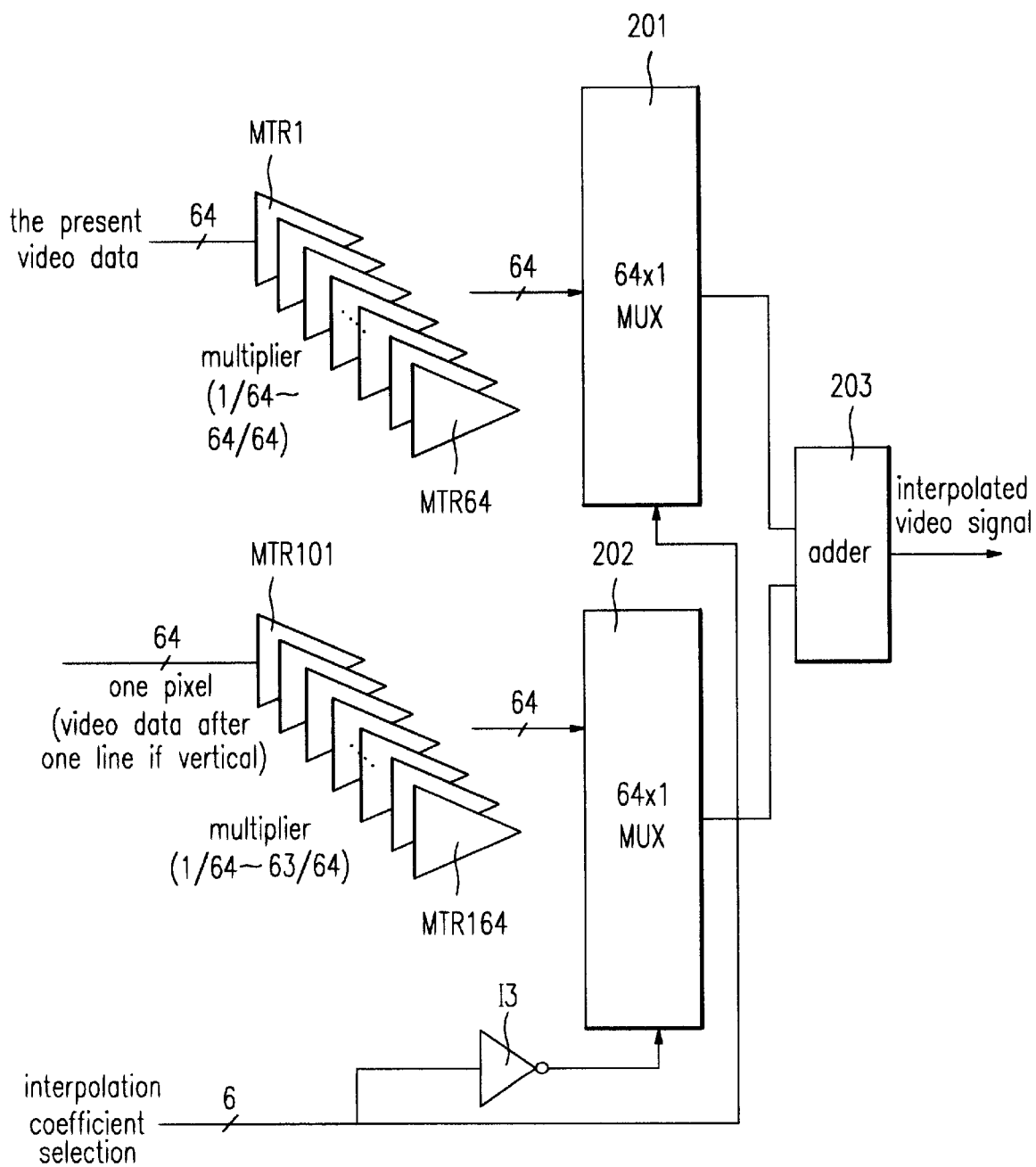
FIG. 13 illustrates a block diagram of an expansion/compression interpolating part for explaining an interpolation principle using the image processor shown in FIG. 12.

Referring to FIG. 12, for making a vertical interpolation compression, line interpolation should be done. Input/output of a first field memory 194 are provided to a vertical compression interpolation part 193, which is adapted not to write a last interpolation line on a field memory 194(/we is disabled). And, for making a vertical interpolation expansion, the vertical expansion interpolation part 197 is adapted not to read a data from the field memory 194 at a first clock in an interpolation period(/re is disabled). The vertical expansion/compression interpolation part 193 and 197 are, not separate circuit, but one circuit as shown in FIG. 13. Alikely, for a horizontal interpolation compression, pixel interpolation should be done. Successive 2 pixels from the field memory 194 are provided to the horizontal interpolaiton part 195, which is adapted not to write a last pixel on a second line memory 196(/we is disabled). And, for a horizontal interpolation expansion, the horizontal interpolaiton part 195 is adapted not to read a data from the field memory 194 at a first clock in an interpolaiton period(/re is disabled).

Figure 1:
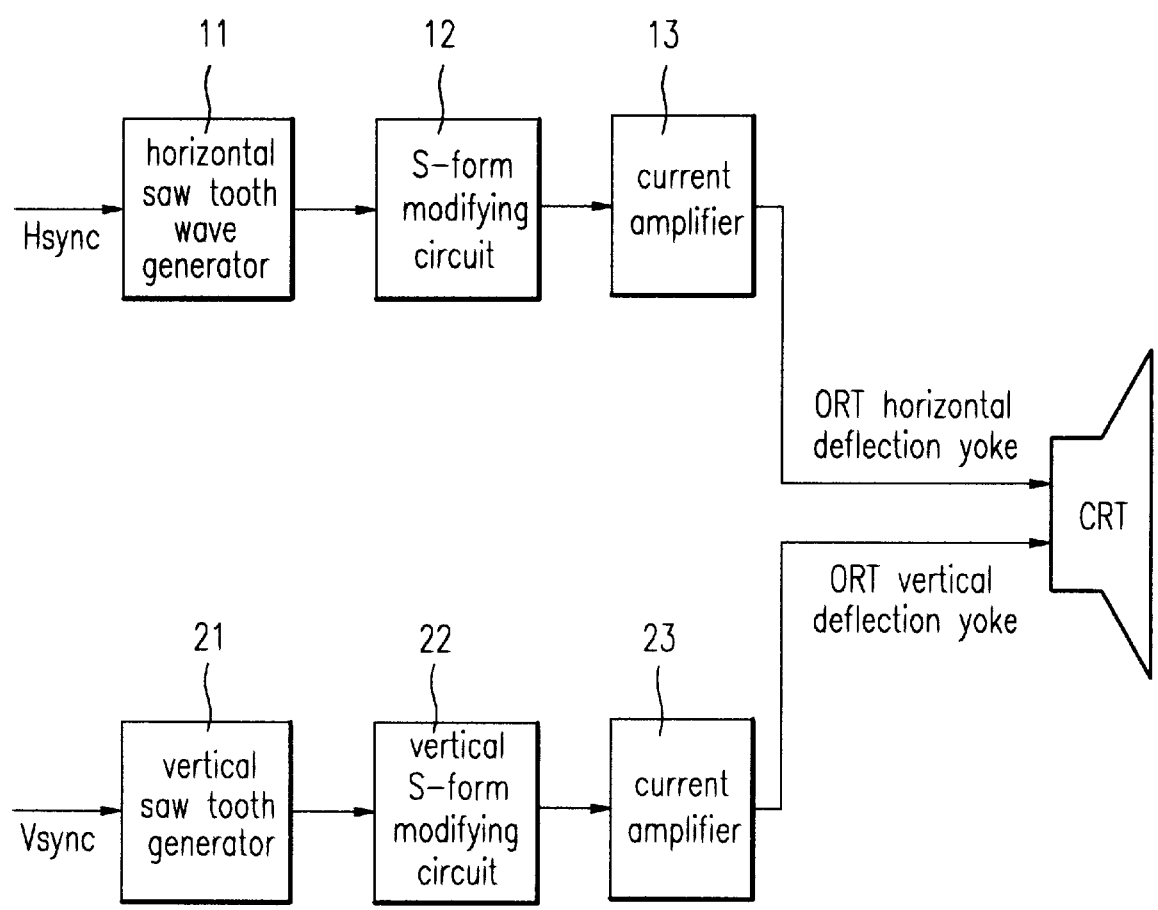
FIG. 1 illustrates a system block diagram of a general analog type deflective wave generator.
Figure 2A:
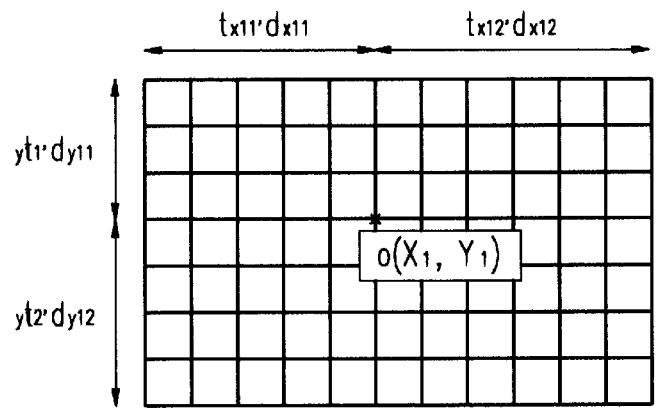
FIG. 2a illustrates a regular frame without aspect ratio conversion.
Figure 2B:
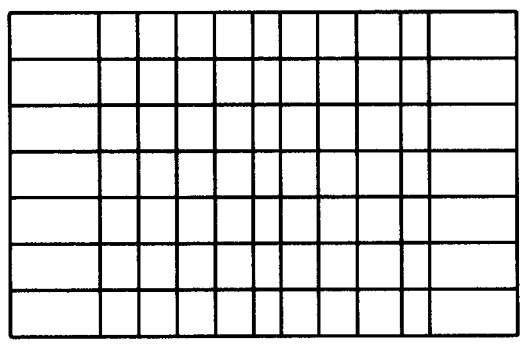
FIG. 2b illustrates the regular frame in FIG. 2a after a horizontal conversion at a fixed ratio for all vertical sections of the frame.
Figure 14A:
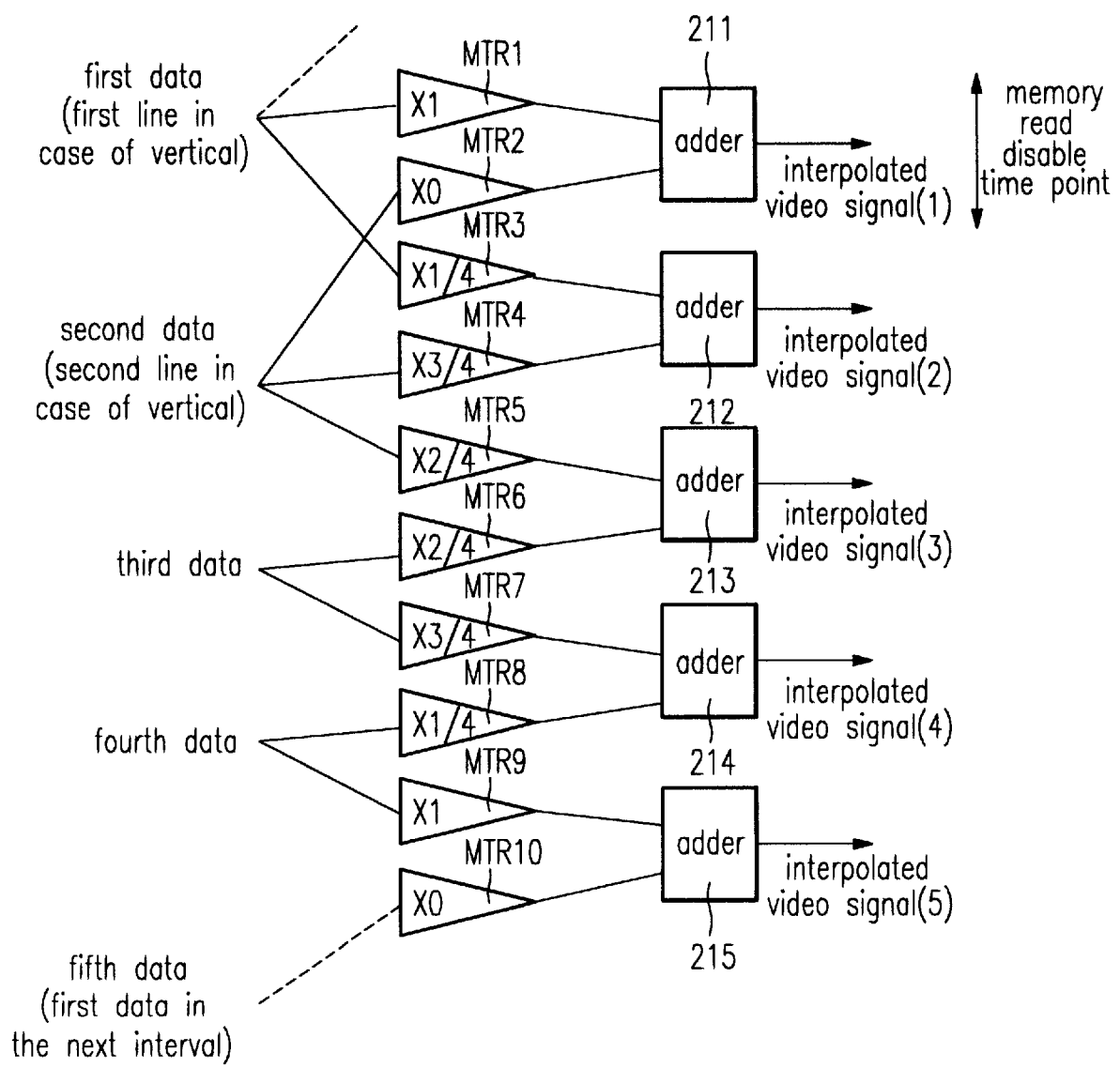
FIGS. 14a and 14b respectively explain operation of the expansion/compression interpolating part shown in FIG. 13.
Figure 14B:
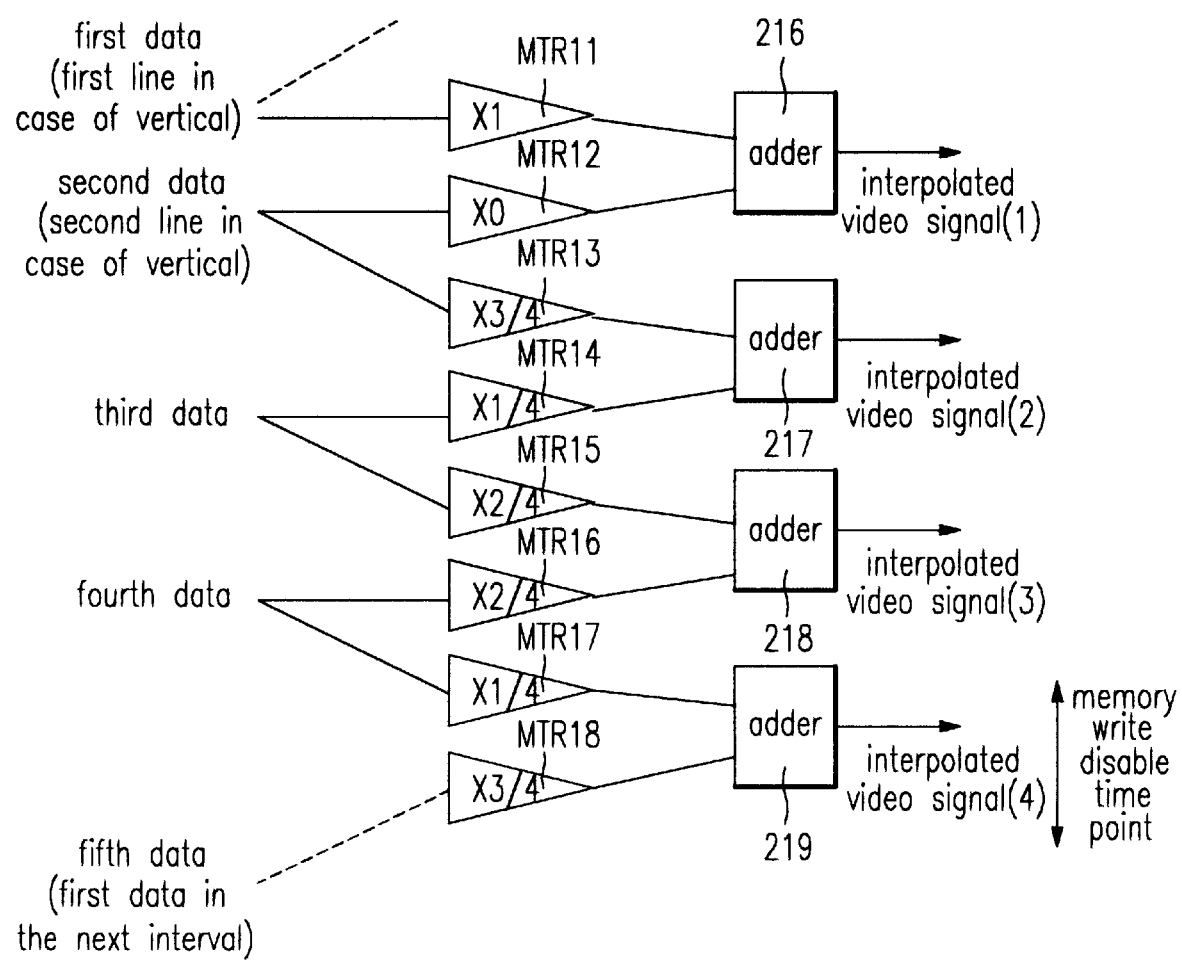
Figure 15:
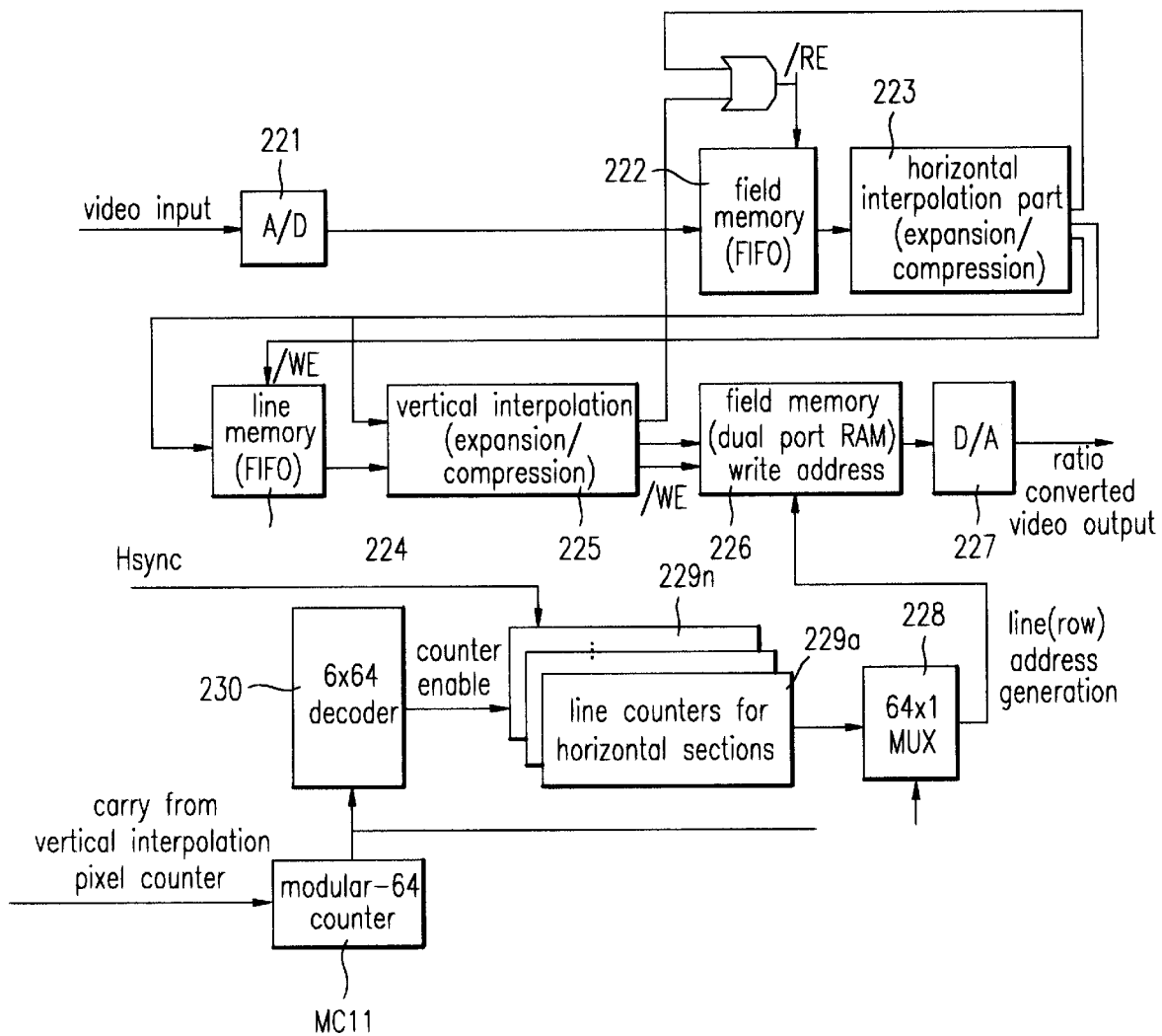
FIG. 15 illustrates a block diagram of another embodiment of the image processor shown in FIG. 3.

FIG. 13 illustrates a block diagram of expansion/compression part for showing a principle of actual interpolation in FIG. 12. FIGS. 14a and 14b respectively illustrate expansion and compression operation of one interpolation period, wherein the interpolation coefficients are 0~63/64 or 1/64~64/64, ones equally divided by 64, wherein coefficient selection signals are provided oppositely such that a sum of coefficients provided to the two MUXs 201 and 202 in FIG. 13 is always 1. As shown in FIGS. 14a and 14b, an interpolation cycle in an interpolation expansion in a data section is 5 greater than the denominator by unity, and in a compression, the denominator 4 is the very interpolation cycle. FIG. 2a illustrates a regular frame without any frame ratio conversion, and FIG. 2d illustrates a frame after a frame ratio conversion is made by applying a system shown in FIG. 6 in which a vertical interpolation is carried out applying fixed interpolation ratios to a horizontal direction. However, if different interpolation ratios are applied to the horizontal sections even in the vertical interpolation as the system of FIG. 6 designed, with different vertical interpolation ratios for each horizontal section, a number of vertical lines may be increased or decreased depending on horizontal positions. In this instance, as shown in FIG. 3, a field memory having a dual port RAM may be provided additionally while the line memory 222 in front of the field memory 194 in FIG. 12 may be removed. Because, when a compression interpolated data is written on the added field memory 192, a /we appeared in the compression interpolation can be applicable. And, 64 individual horizontal section line counting parts 229a–229n may be provided for counting a sum of lines vertically interpolated up to the present time for each horizontal section with a horizontal synchronizing signal as a clock, to utilize the sum as a write row address row addr. of a field memory 226 for the horizontal section. In this instance, of the horizontal sections, a section having a relatively short vertical length is adapted to keep on writing dummy data while other sections having long vertical lengths write data. However, this causes no problem because a new data is written thereon when a horizontal section is started in a next vertical section. Thus, FIG. 2f shows a frame subjected to vertical interpolation according to horizontal section conversion when vertical conversion ratios for each horizontal section are different.

SECOND EMBODIMENT

Figure 16:
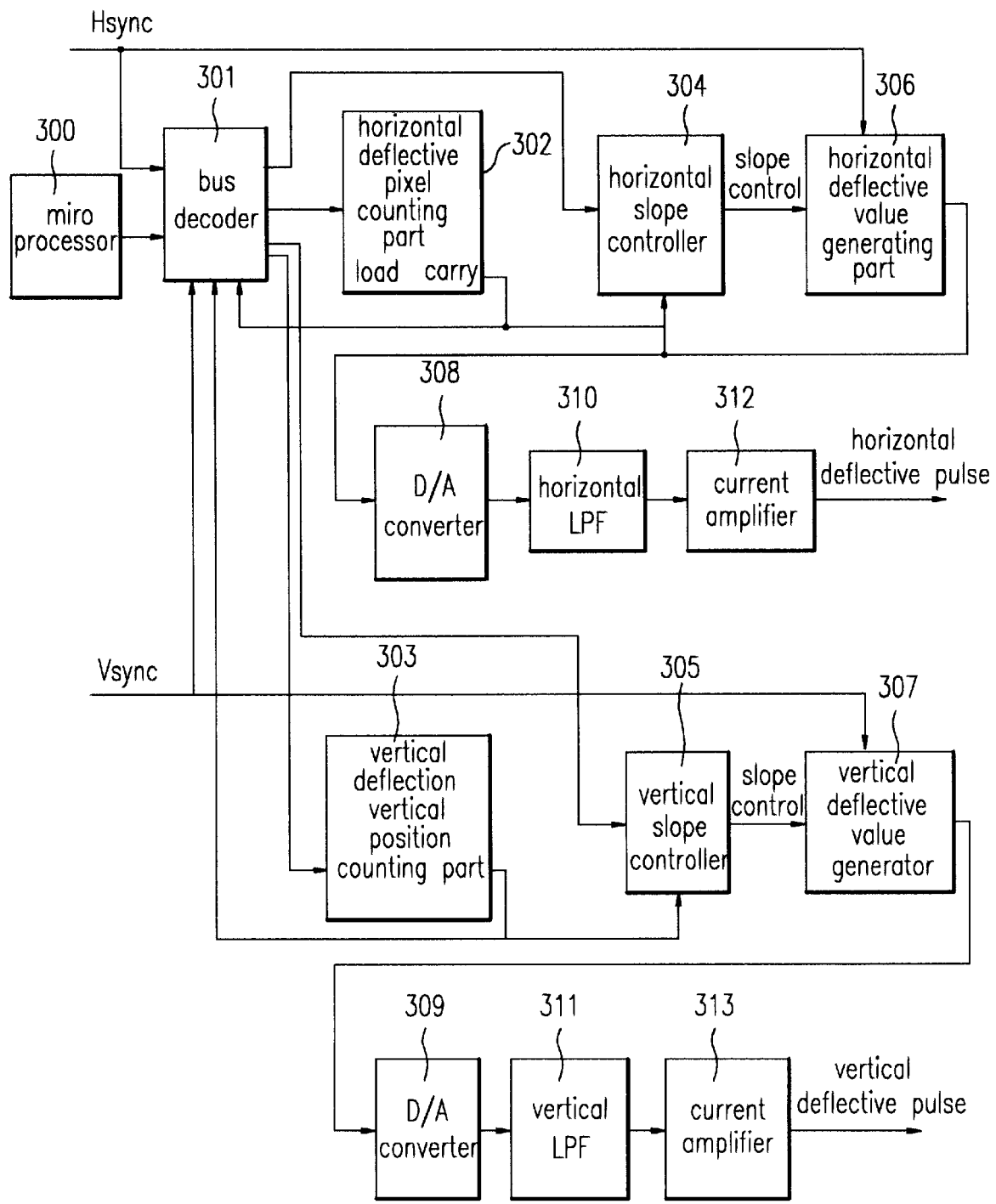
FIG. 16 illustrates a block diagram of a device for changing a deflective ratio in accordance with a second preferred embodiment of the present invention.

The system and operation of a device for changing a deflective ratio in accordance with a second preferred embodiment of the present invention will be explained with reference to FIGS. 16~27. FIG. 16 illustrates a block diagram of a device for changing a deflective ratio in accordance with a second preferred embodiment of the present invention.

Referring to FIG. 16, the device for changing a deflective ratio in accordance with a second preferred embodiment of the present invention includes a microprocessor 300 for producing deflective ratio conversion extent information for each block of a received image defined by a horizontal section and a vertical section in response to a control signal from a user, a bus decoder 301 for decoding and storing the deflective ratio conversion extent information received from the microprocessor 300, and a deflective ratio controller for using the deflective ratio conversion extent information stored in the bus decoder 301 in determining horizontal and/or vertical deflective ratio conversion extent in a preset order and controlling a horizontal and/or vertical deflective ratio according to the extent. As shown in FIG. 16, the deflective ratio controller includes a horizontal deflective pixel counting part 302 for determining a length of each horizontal section by means of a pixel clock provided from the bus decoder 301, a horizontal slope controller 304 for receiving slope(linear) or up/down information contained in the deflective ratio conversion extent received from the bus decoder 301 and controlling a slope of a horizontal deflective wave, a horizontal deflective value generating part 306 for generating a horizontal deflective value using a signal from the horizontal slope controller 304 and an external horizontal synchronizing signal Hsync, a digital/analog converter 308 for converting the horizontal deflective value generated in the horizontal deflective value generating part 306 from digital to analog, a horizontal low pass filter 310 for filtering a signal from the digital/analog converter 308 with a preset frequency band, a current amplifier 312 for amplifying a signal from the horizontal low pass filter 310 to a preset amplification ratio to provide a horizontal deflective pulse, a vertical deflection vertical position counting part 303 for determining a length of each vertical section by the pixel clock provided from the bus decoder 301, a vertical slope controller 305 for receiving slope(linear) or up/down information contained in the deflective ratio conversion extent from the bus decoder 301 and controlling a slope of a vertical deflective wave, a vertical deflective value generating part for generating a vertical deflective value using a signal from the vertical slope controller 305 and an external vertical synchronizing signal Vsync, a digital to analog converter 309 for converting the vertical deflective value generated in the vertical deflective value generating part 307 from digital to analog, a horizontal low pass filter 311 for filtering a signal from the digital/analog converter 309 with a preset frequency band, a current amplifier 313 for amplifying a signal from the horizontal low pass filter 311 to a preset amplification ratio to provide a vertical deflective pulse. In the device for changing a deflective ratio in accordance with a second preferred embodiment of the present invention, a frame is divided into a plurality of sections in horizontal and vertical directions and a deflective ratio of each of the sections is adjusted. Though pixel unit adjustment of the deflective ratio is of course possible if a conversion control data memory is adequate and degradation in a picture quality due to sharp slope changes of conversion extent does not matters, in this embodiment of the present invention, a frame is divided into minute sections only to an extent a naked eye can not distinguish section boundaries, and the adjustment of the deflective ratio is processed section by section for preset plurality of sections. That is, as shown in FIGS. 7a and 7b, a frame is divided into 64 sections in horizontal and vertical directions respectively. Each section has a length which is not equal to other lengths, and, in the present invention, each section may be adjusted in 1~64 pixel units horizontally (or in lines, vertically). Therefore, no matter how much sharp a deflective ratio is given in view of eye sight, no section boundaries are almost distinguished.

The bus decoder 301 shown in FIG. 16 receives serial control bus from the microprocessor 300 and stores data required for the 64 horizontal and vertical sections. An amount of slope adjustment for horizontal or vertical deflective wave of a block(defined by each of the horizontal and vertical sections) is given from the stored data. The horizontal deflective pixel counting part 302 counts each horizontal section by a pixel clock as many as a length of the horizontal section until a carry is occurred, when an end of the section is informed and goes over to the next horizontal section to proceed the counting. Alikely, the vertical deflective pixel counting part 303 counts each vertical section with a horizontal synchronizing signal as many as a length of the vertical section until a carry is occurred, when an end of the section is informed and goes over to the next vertical section to proceed the counting. The horizontal slope controller 304 receives slope(linear), or slope up/down information from the deflective ratio conversion extent information stored in the bus decoder 301 and controls a slope of the horizontal deflective wave. Then, the horizontal deflective value from the horizontal deflective value generating part 306 is converted into an analog value by the digital to analog converter 308. This analog value becomes the very pulse that makes a horizontal deflection of the image displayed through the horizontal low pass filter 310 to a desired ratio. And, the vertical slope controller 305 receives slope(linear), or slope up/down information from the deflective ratio conversion extent information stored in the bus decoder 301 and controls a slope of the vertical deflective wave. Then, the vertical deflective value from the vertical deflective value generating part 307 is converted into an analog value by the digital to analog converter 309. This analog value becomes the very pulse that makes a vertical deflection of the image displayed through the vertical low pass filter 311 to a desired ratio. As a sign of the slope of a deflective pulse may alternate for 64 times in the case of the 64 sections, with 64 curves and up to 32 times of repetition of a sinusoidal wave. If, for example, the lengths of the sections are assumed to be equal and the system is operative at 60 Hz and 525 scanning lines, the horizontal low pass filter 310 will have a band greater than 31.5 kHz×32=about 1 MHz(because the band will increase if the lengths of the sections are not equal). The vertical low pass filter 311 will have a band greater than 60 Hz×32=about 2 kHz. However, if the horizontal deflection is changed according to a change of the vertical deflection as in FIG. 19(a case when a deflective current can flow in an opposite direction in the middle of scanning), the vertical deflection may be greater than about 1 MHZ, too.

Figure 17:
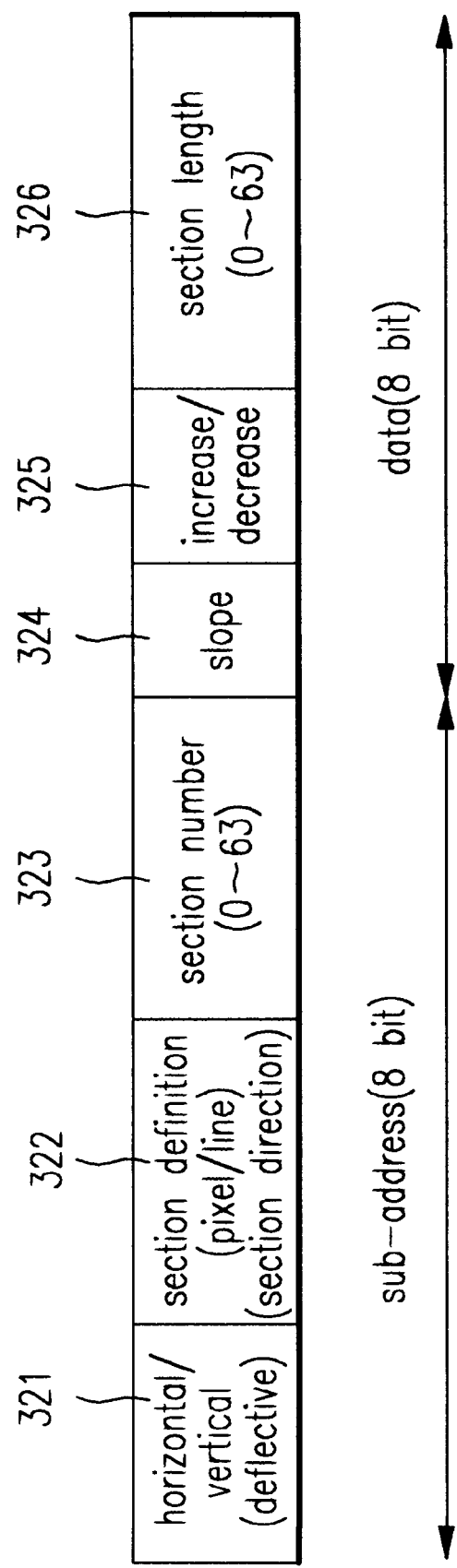
FIG. 17 illustrates a control bus format from the micro-processor shown in FIG. 16.

FIG. 17 illustrates a control bus format having deflective ratio conversion extent information provided from the microprocessor 300.

Referring to FIG. 17, the bus having deflective ratio conversion extent information provided from the microprocessor 300 includes a horizontal/vertical deflection indicating section 321 for indicating the following data of being data applicable to horizontal deflections or vertical deflections, a section definition indicating section 322 for defining a section of falling on a horizontal section or a vertical section in a horizontal or vertical deflection, a section number indicating section 323 for indicating 0–63th sections, a slope indicating section 324 for indicating conduction of a deflection, up/down indicating section 325 for conducting a slope up/down of the deflection wave in the case when a state of the slope indicating section indicates a deflection, and a section length indicating section 326 for indicating consecutive pixels(or lines in case of vertical) which have the present slope. The horizontal/vertical deflection indicating section 321 has one bit indicating the following data of being applicable to a horizontal deflection or vertical deflection. The section definition indicating section 322 has one bit indicating of being a horizontal section or a vertical section in a horizontal deflection because, even in a horizontal deflection, the horizontal deflections in different vertical positions may be different. The section number indicating section 323 has six bits, which indicates 0–63(or 1–64)th sections. When the slope indicating section 324 is unity, the slope is constant. In this instance, the up/down indicating section 325 is ignored. However, when the slope indicating section is 0, if the up/down indicating section is unity, a slope of the deflective wave is increased, if the up/down indicating section is zero, a slope of the deflective wave is decreased. The section length indicating section 326 indicates consecutive pixels(or lines if it is vertical) which have the present slope, which is a value to be loaded on either in the horizontal deflective pixel counting part 302 or vertical deflective vertical position counting part 303.

The operation of the horizontal deflective bus decoder will be explained with reference to FIG. 18.

Figure 25:
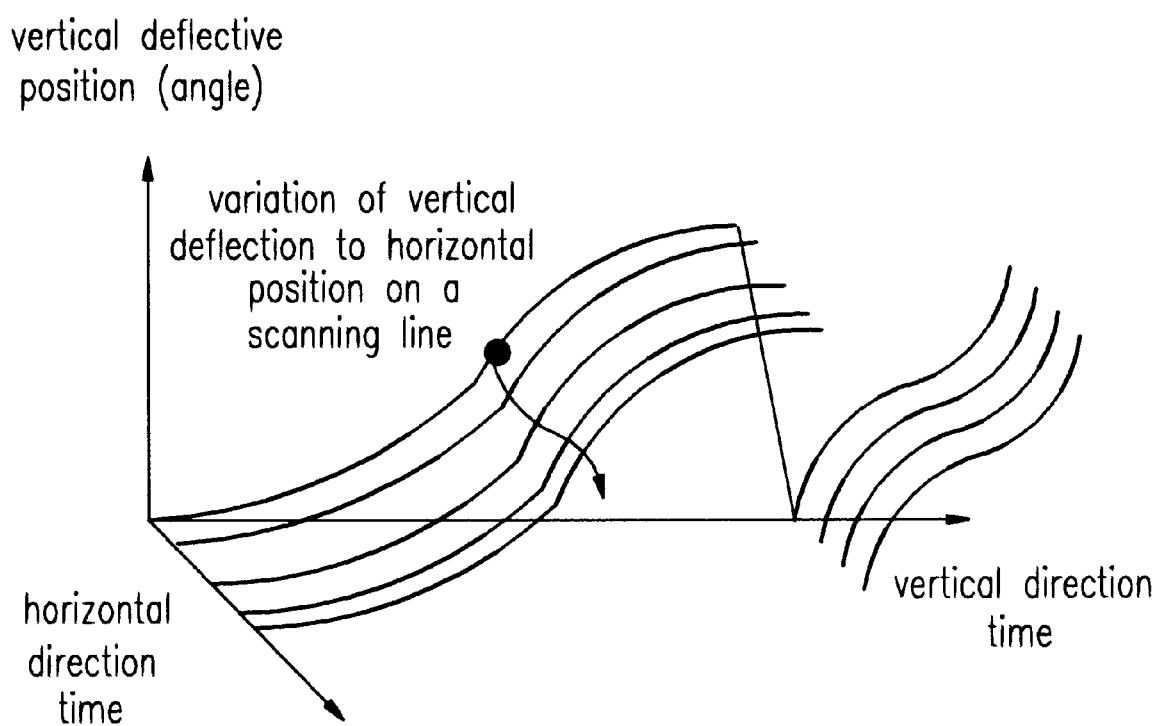
FIG. 25 illustrates a graph showing variation of vertical deflective waves along horizontal section in accordance with a second embodiment of the present invention.

First, in a horizontal conversion, since the horizontal deflections are different for each vertical section even within the same horizontal scanning line, a 6 bit×64 memory (flipflop) 336 arc provided additionally. Each vertical section is adapted to be selected by a 64×1 MUX 339, loaded on the horizontal deflective line counter 341, and, if a carry is occurred in the horizontal deflective line counter 341 after passing as many lines as the vertical section, coming to an end of the vertical section is informed and, on the same time, a signal acting as a clock signal is provided to the modular-64 counter MC32. Accordingly, an output of the counter MC32 is provided to the 6 bit 64×1 MUX 339 and the vertical section selection 8 bit 64×1 MUX 338*a*–338*n*, to select the next input. When the carry from the horizontal deflective pixel counting part 302 is provided to the modular-64 counter MC31, having 64 conversion data in every horizontal section, the 8 bit data in an arbitrary vertical section selected thus provides a horizontal section number to the 64×1 MUX 340. By selecting the horizontal section selecting 64×1 MUX 340 using the horizontal section number, up or down, a slope value and the present 6 bit value for going to the next block(i.e., a horizontal length of the present block) are provided as values to be loaded on the horizontal deflective pixel counting part 302. Alike the horizontal deflection, in a vertical deflection too, a carry is received from the vertical deflection vatical position counting part 303, for the modular-64 counter MC33 to select a vertical section. As shown in FIGS. 7*a* and 7*b*, in the second embodiment, though vertical and horizontal blocks for a horizontal deflection and vertical and horizontal blocks for a vertical deflection are provided separately, in FIG. 18, vertical sections are provided separately only in a horizontal deflection while all horizontal sections are converted in fixed ratios of conversion in a vertical deflection. However, if it is further expanded, as a bus decoder shown in FIG. 19, ratios of conversion for the horizontal section are provided differently even in a vertical deflection. Sides of the block can be fixed according to the section length data. Herein, since all blocks should be neither overlapped, nor spaced for convenience's sake, lengths of all horizontal sections within a vertical section are made the same. This is because a deflection beam of a CRT proceeds from left to right, and from top to bottom in a sequence, though a horizontal line are not impossible to curve in a top to bottom direction. It is possible as much as one like by varying a horizontal slope of a vertical deflection as shown in FIG. 25 according to a system shown in FIG. 19.

Figure 20:
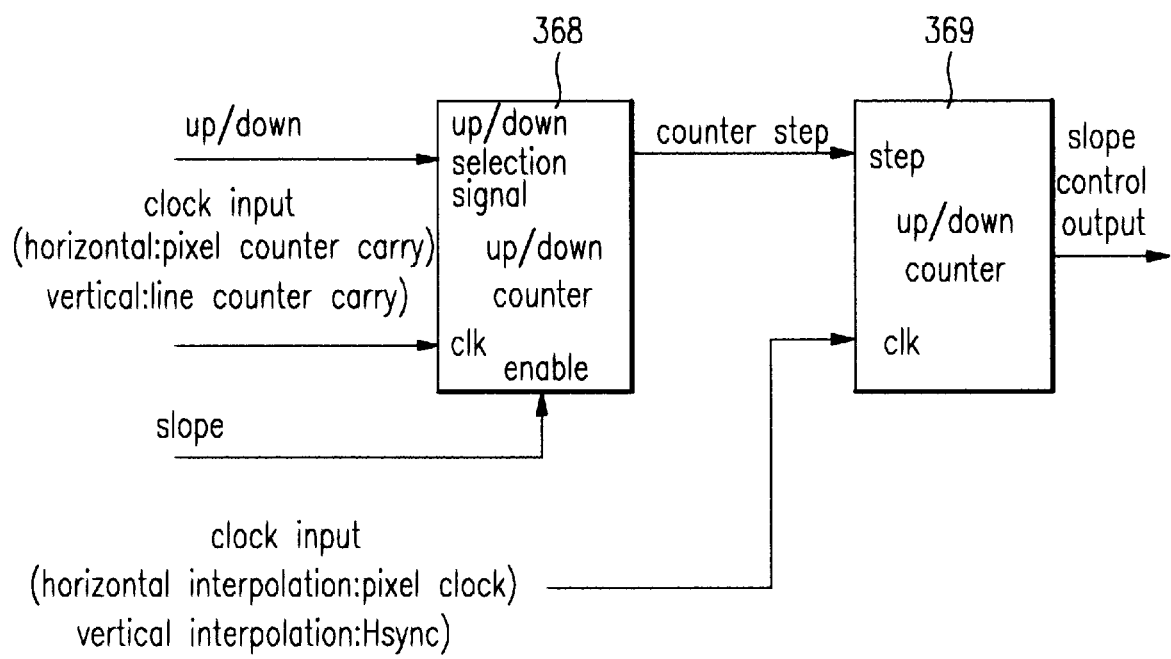
FIG. 20 illustrates a block diagram of the horizontal or vertical slope controller shown in FIG. 16.
Figure 21:
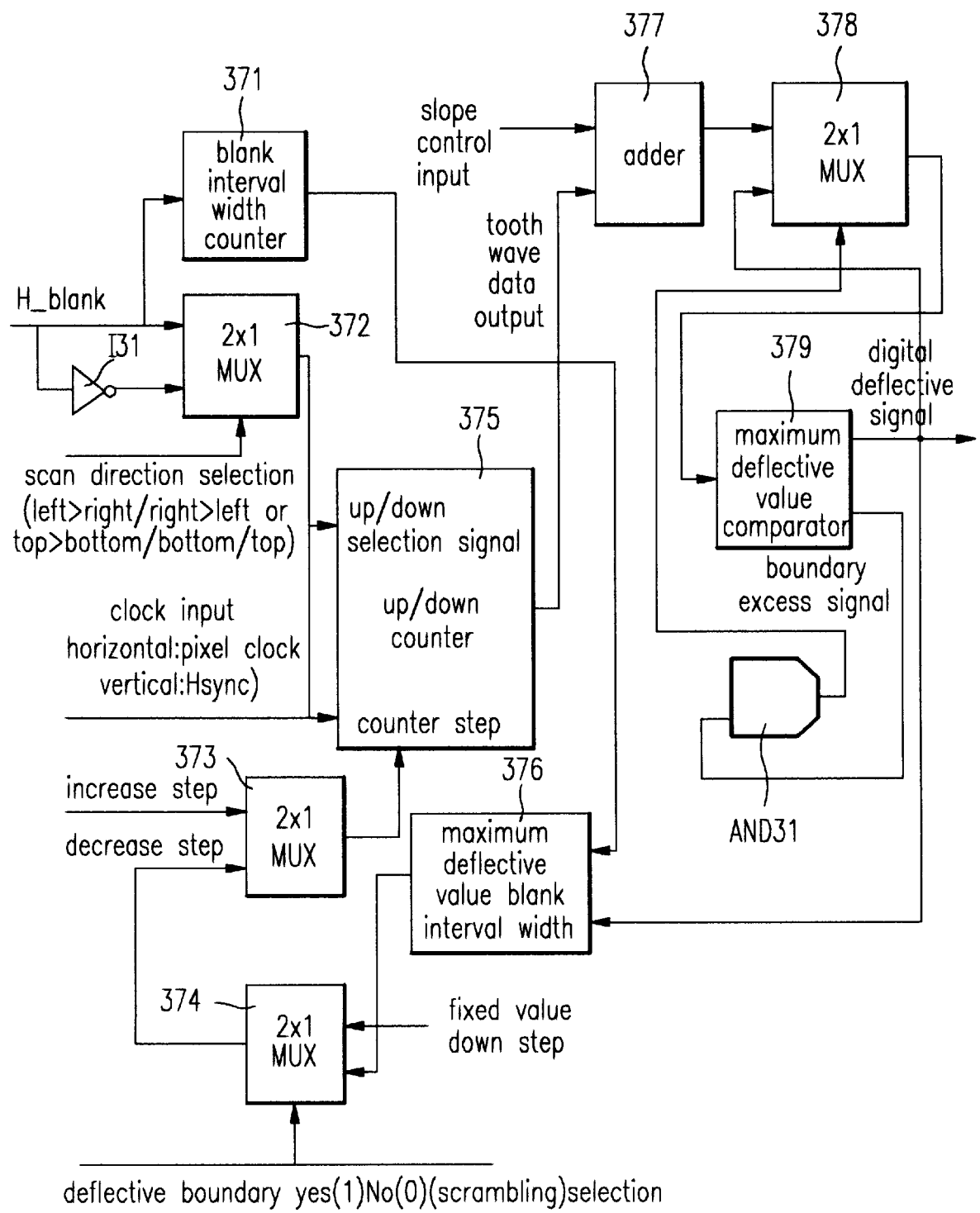
FIG. 21 illustrates a block diagram of the horizontal or vertical deflection value generator shown in FIG. 16.

FIG. 20 illustrates a system of the horizontal or vertical deflection slope controller 304 or 305, wherein a slope or an up or down signal is received from the bus decoder 301 to drive an up/down counter 368. A signal from the counter 368 acts as a step of the next counter 369. Therefore, the step may be "+" or "−", and, if a slope is given, the present step is held as it is while a value for varying the slope increases linearly as shown in FIG. 12*a*. For reference, since this step has a value adequately smaller than the increase step of an up/down counter 375 which generates an output of sawtooth data shown in FIG. 21, a slope of the deflection changes comparatively slowly, and, when a digital deflection signal is to be converted into an analog deflection signal, the signal from the counter 368 is preferably at least 10 bits greater than a number of pixels per one horizontal scanning line(a number of lines in a frame if it is a vertical deflection). The sawtooth data signal from an up/down counter 375 shown in FIG. 21 is added to a controlled value of a deflective wave slope differential in an adder 377 into a waveform as shown in FIG. 24c. In this instance, when the controlled value of the deflective wave slope differential is negative, the controlled value should be smaller than an absolute value of the sawtooth wave slope. This is because, if a direction of horizontal scanning is reversed in a middle of a screen due to the negative slope of the horizontal deflective wave, causing to proceed the deflection from a prior image, the present image and, again, to an original direction, three images are overlapped.

When a digital value of an end of a deflection in a maximum deflective value comparator 379 exceeds a boundary, a top and a bottom horizontal scanning lines are not matched(in a case of a vertical deflection, an image flickers in a top and down direction at every field in terms of time). Though it may be disregarded if it is for a scrambling effect of a screen, in order to prevent such an effect, it is necessary to select a lower side input of a 2×1 MUX 378 if the boundary exceeding signal is generated, to maintain the present digital deflection signal, continuously. And, if a maximum deflection is divided by a synchronous interval width, this reduced step generates a sawtooth wave which causes a deflective value to return to a starting point during a blanking interval. In this instance, too, a fixed reduced step may be selected disregarding a boundary of the starting point if the scrambling effect is desirable. In this second embodiment of the present invention, for convenience of use of the counter, a deflection value at an end of the deflection is considered the maximum deflection value, a deflection value at a starting point is considered a minimum value.

Figure 18:
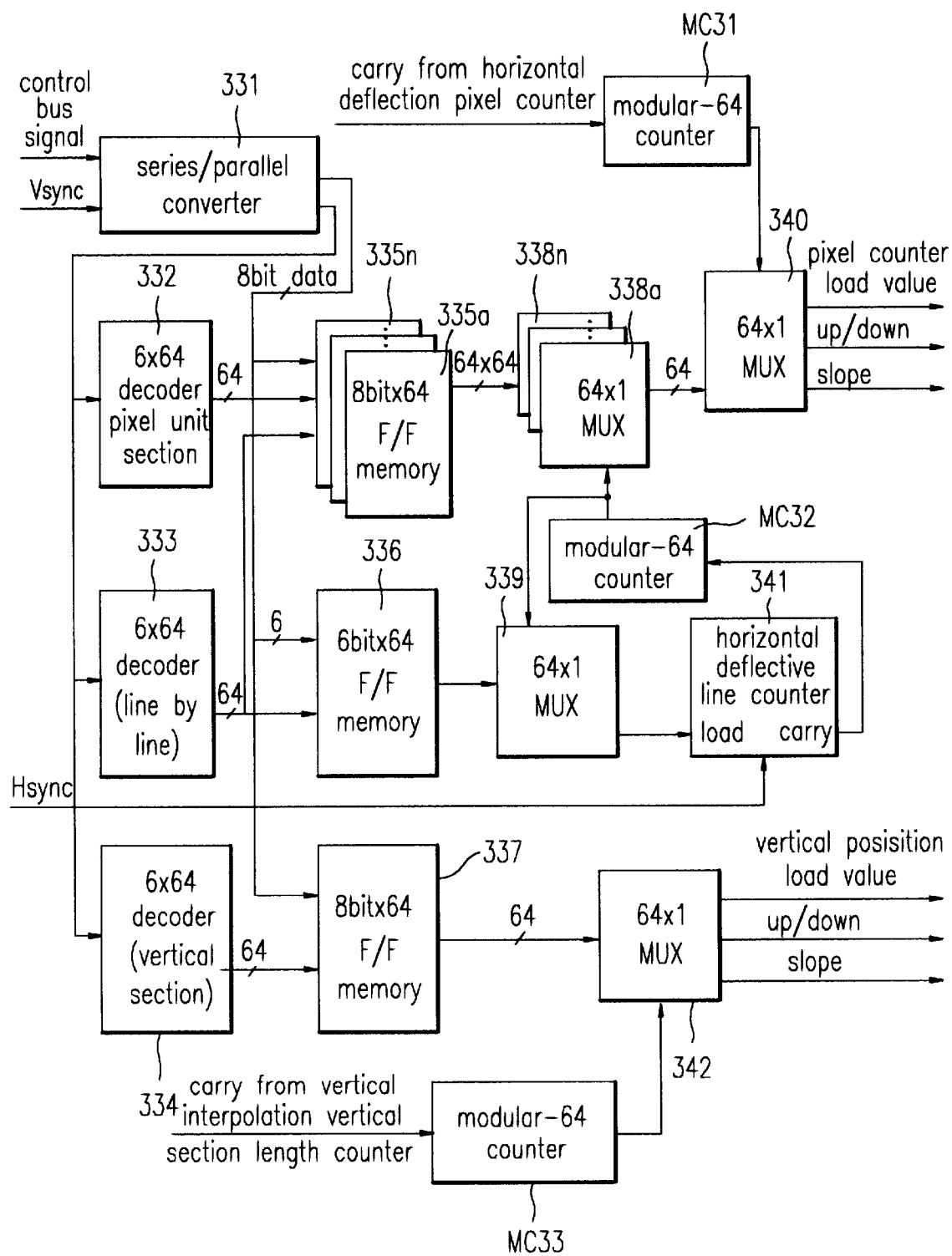
FIG. 18 illustrates a block diagram of the bus decoder shown in FIG. 16.
Figure 19:
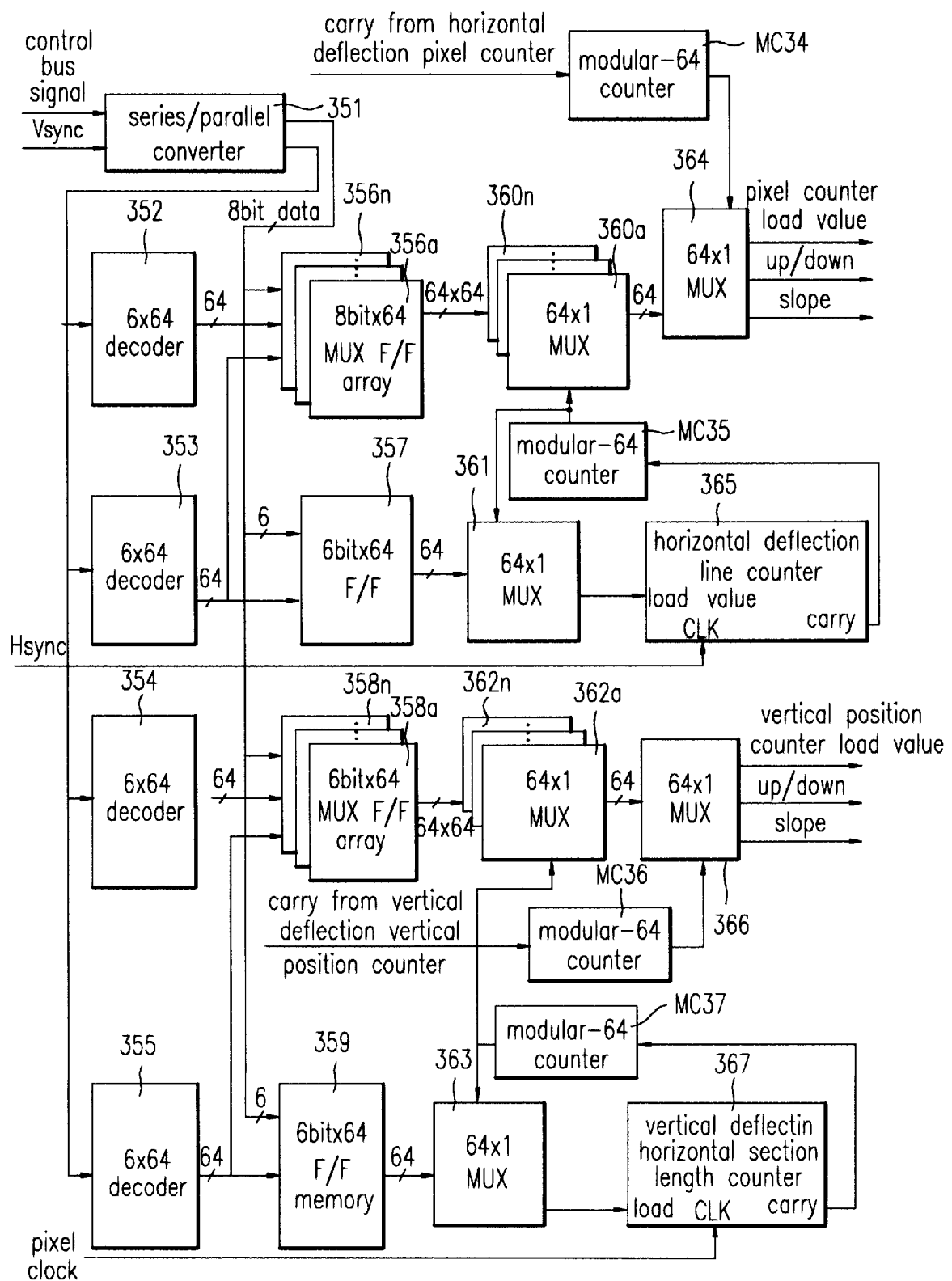
FIG. 19 illustrates a block diagram of the bus decoder shown in FIG. 18.
Figure 22:
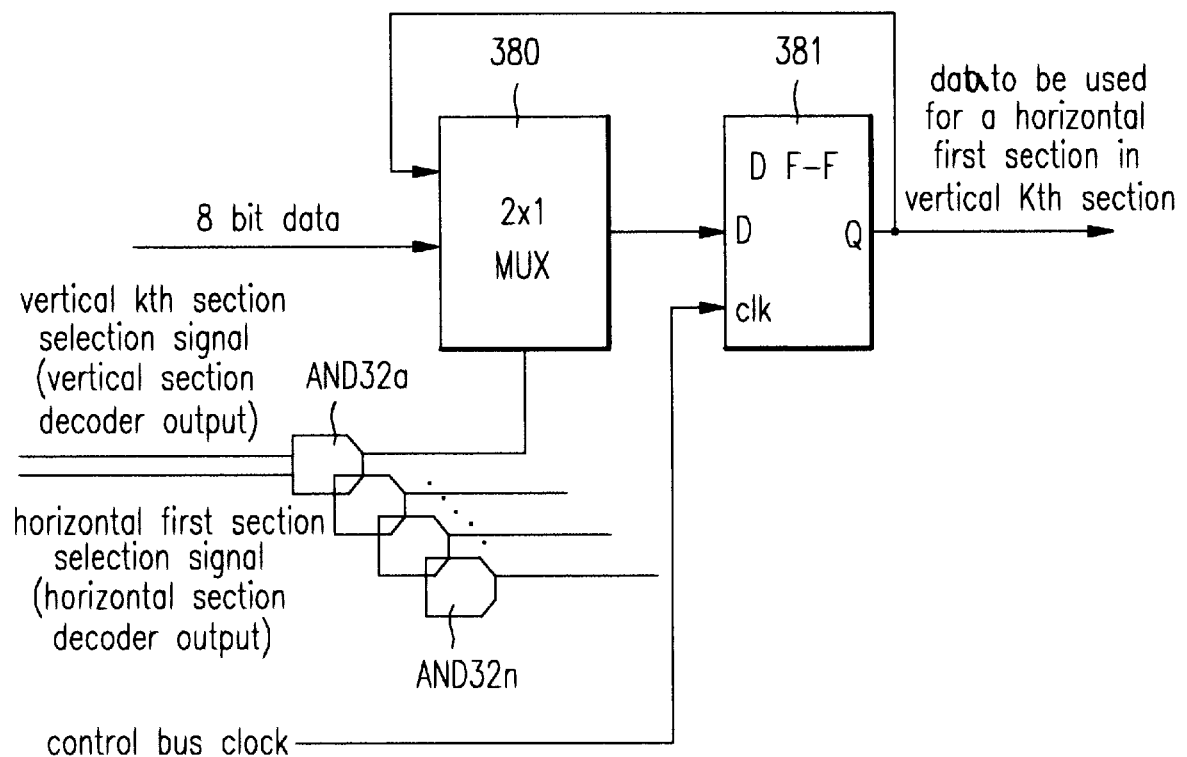
FIG. 22 illustrates a block diagram of the flipflop array shown in FIG. 18.

FIG. 22 illustrates how the flipflop array 335a–335n shown in FIG. 18 identify horizontal sections and vertical sections in storing an 8 bit data. That is, when outputs of decoders representing vertical kth section and horizontal first section arc transited to high on the same time, causing a selection signal to a 2×1 MUX 380 to transit to high, an 8 bit data is provided to an 8 bit flipflop 381. Other than this case, the present value is kept fed-back, to maintain its own value.

Figure 23:
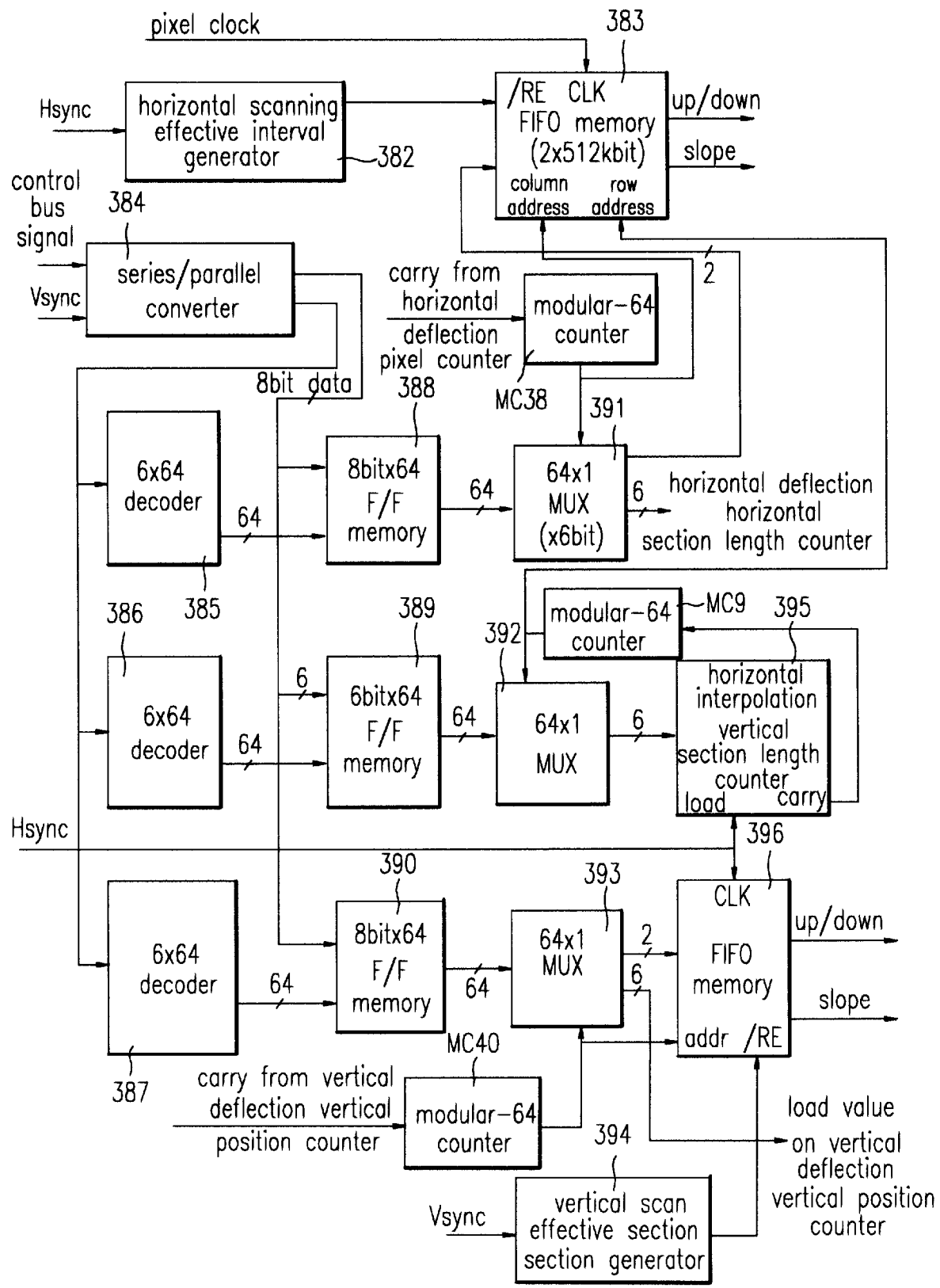
FIG. 23 illustrates a block diagram of another embodiment bus decoder shown in FIG. 18.

FIG. 23 illustrates another embodiment of a bus decoder in a case when a flipflop memory 388 is used instead of the 64×64 8 bit flipflop array 335a–335n shown in FIG. 18. Because this flipflop memory 388 is in storage of the up/down or slope information for given lengths of block units, this flipflop memory 388 is a 2 bit field memory. And, as the flipflop memory 388 is in storage of 2 bit data only in a vertical direction for use in a vertical deflection, a vertical direction 2 bit line memory may be used for a flipflop memory 390. However, as is in FIG. 19, if horizontal sections are provided for application of different conversion ratio thereto in a vertical deflection too, alike the case of horizontal deflection, this should be the 2 bit field memory. For a horizontal deflection, a 2 bit data required for generation of a horizontal deflection value is stored in a flipflop memory 390 only for a horizontal scanning effective interval, and for a vertical deflection, a 2 bit data required for generation of a vertical deflection value is stored in a flipflop memory 390 only for a vertical scanning effective interval.

Figure 2C:
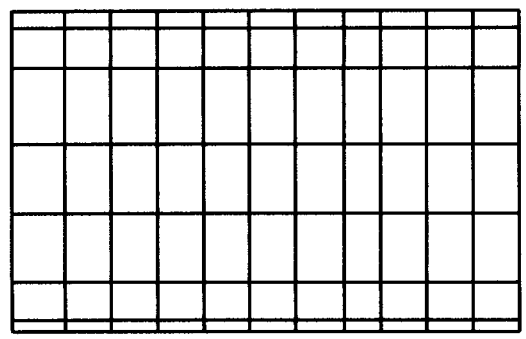
FIG. 2c illustrates the regular frame in FIG. 2a after a vertical conversion at a fixed ratio for all horizontal sections of the frame.
Figure 24A:
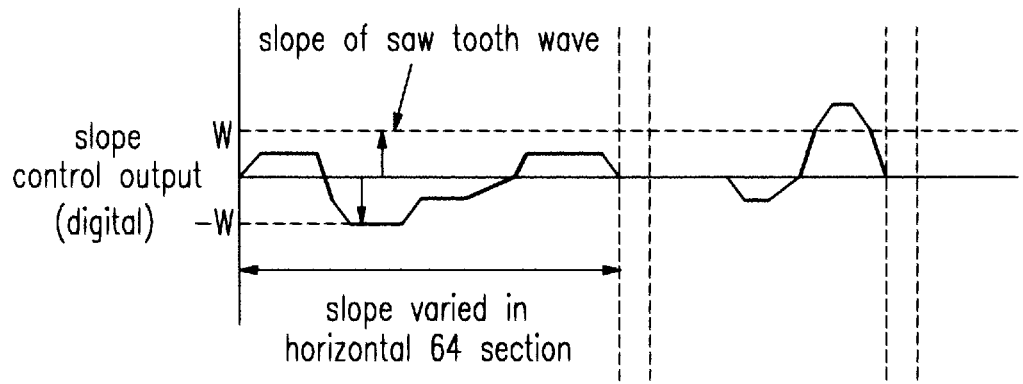
FIGS. 24a~24c illustrate waveforms of a slope control output and a sawtooth wave output in accordance with a second preferred embodiment of the present invention.
Figure 24B:
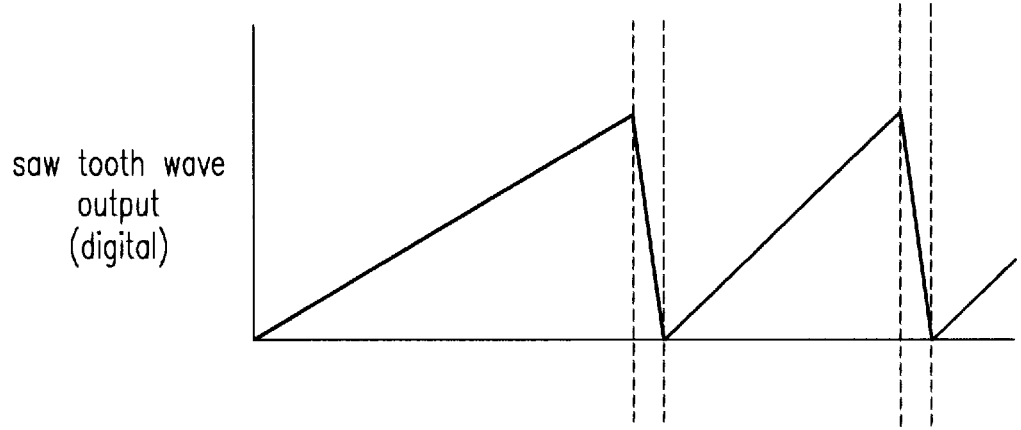
Figure 24C:
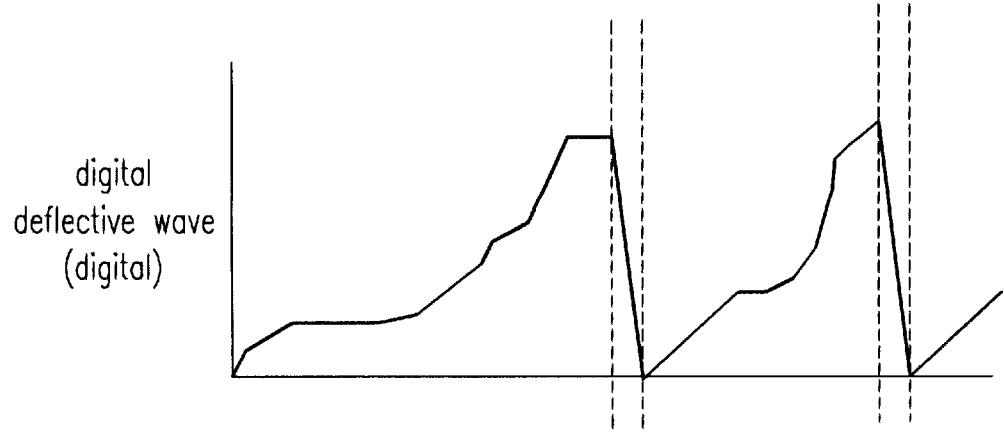

FIG. 24c illustrates a deflective wave form of which image ratio conversion is possible, a sum of the slope control output shown in FIG. 24a and the sawtooth wave output shown in FIG. 24b. FIG. 2c illustrates an image after aspect ratio conversion using vertical deflective pulse constant in a horizontal direction without the horizontal deflective pulse and negative slope of FIG. 24c. However, if a slope is varied with horizontal sections even in a vertical deflection using the decoder shown in FIG. 19, causing a vertical deflective pulse also to have a negative slope, a vertical position alternates in a top and bottom direction even in one horizontal scan line duration. FIG. 2d illustrates a case when a vertical deflection is varied with horizontal sections in a top and bottom direction.

Figure 26:
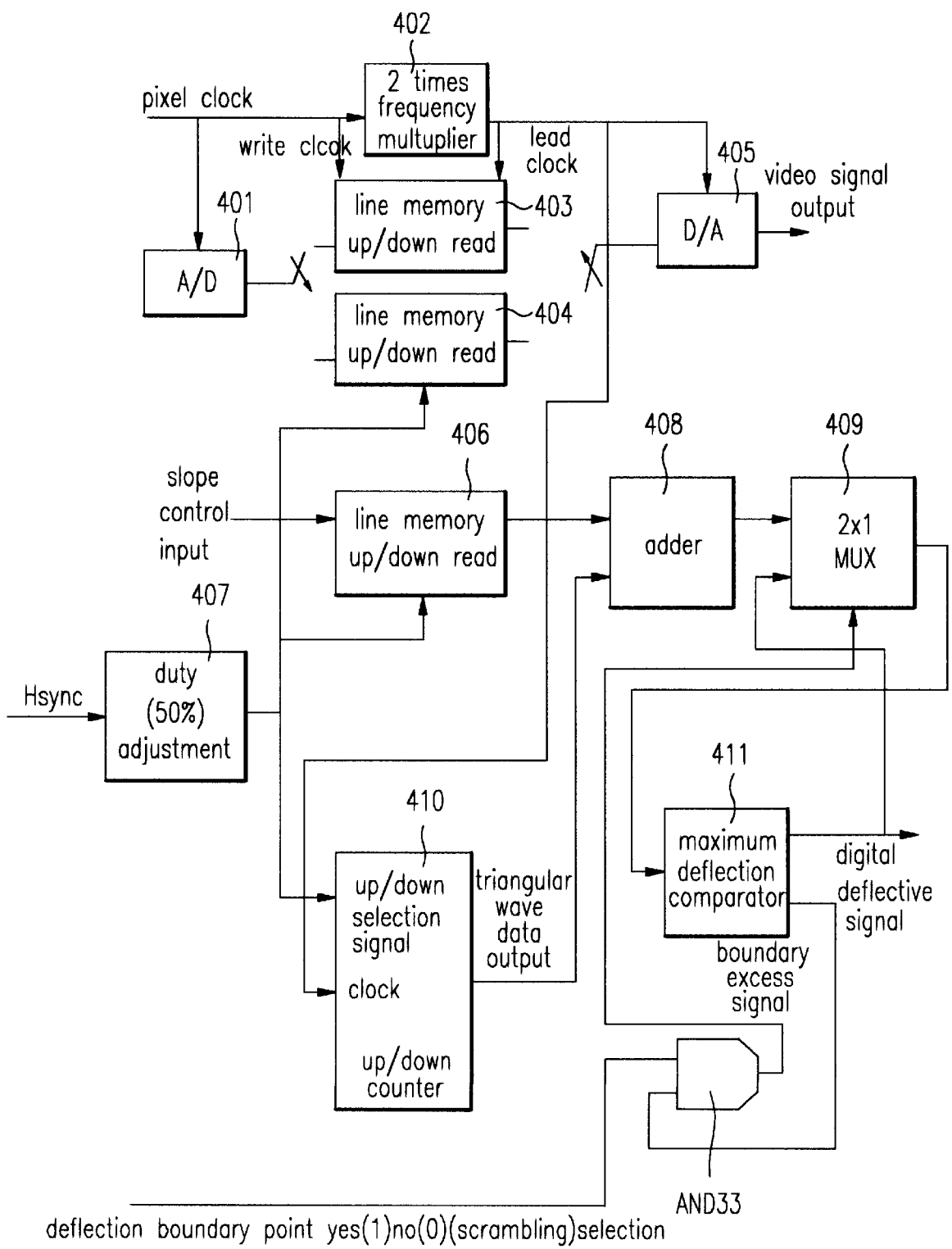
FIG. 26 illustrates a block diagram of the horizontal, or vertical deflection value generator shown in FIG. 16 in two way scanning in accordance with the present invention.
Figure 27A:
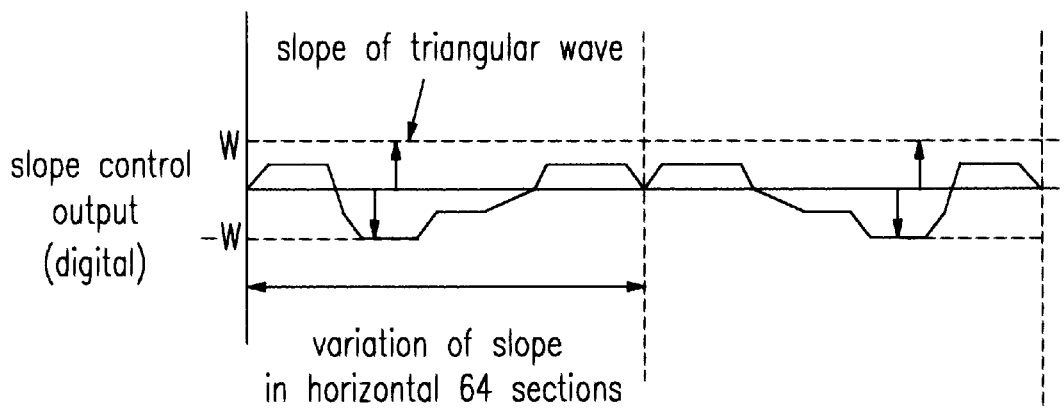
FIGS. 27a~27c illustrate deflective waveforms in two way scanning by the horizontal, or vertical deflective value shown in FIG. 26.
Figure 27B:
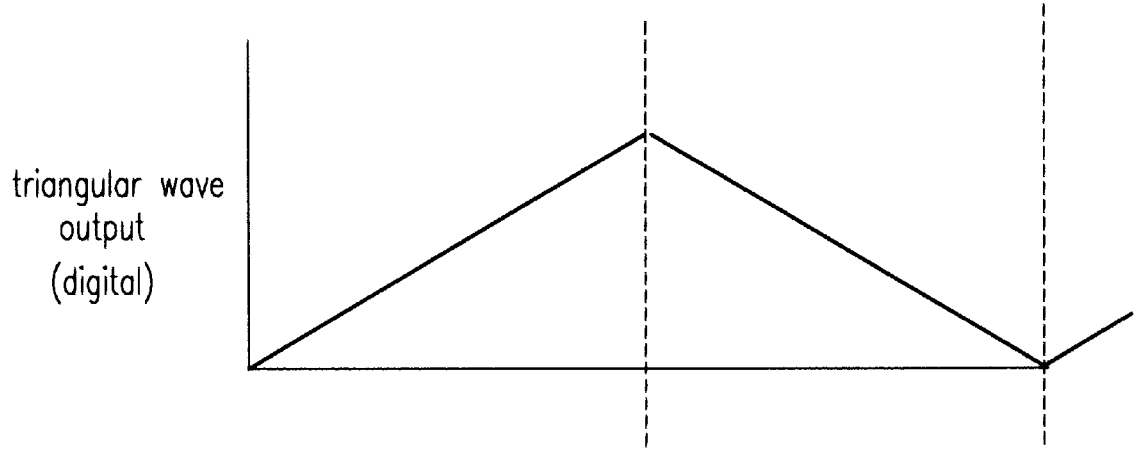
Figure 27C:
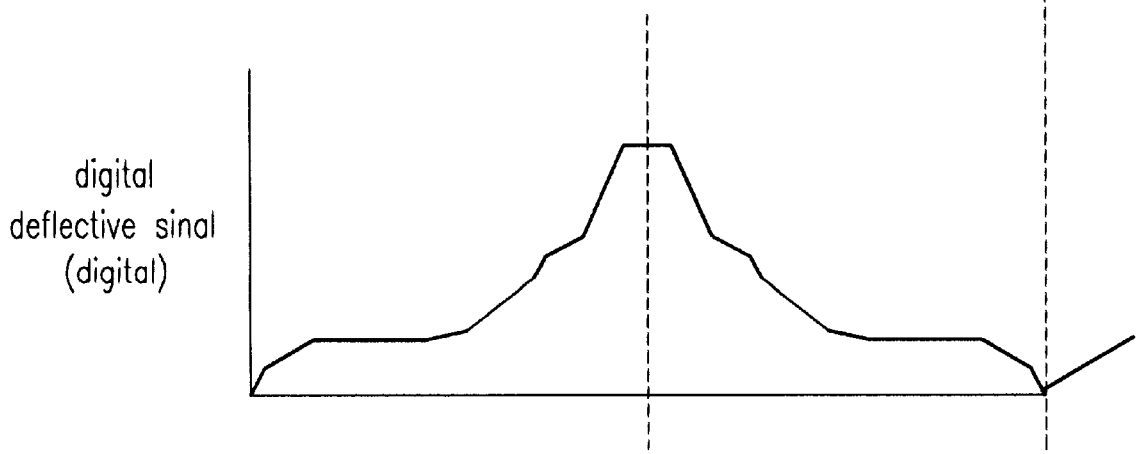

FIG. 26 illustrates a block diagram of another embodiment of a deflection value generation counter for generating triangular deflective pulse to allow two way scan using a digital deflective wave generating principle in accordance with the second embodiment of the present invention. In FIG. 26, a slope control input in a regular deflection(from left to right) is in storage in a line memory for reading in an opposite direction(reducing address) in an opposite direction scanning for use as a deflective wave(triangular wave) slope control input in the opposite direction scanning. That is, when a symmetric triangular wave slope control input shown in FIG. 27a and a triangular wave output which scans in an opposite direction each by 50% of a horizontal or vertical synchronizing cycle are summed, a deflective pulse which can make an image ratio conversion and two way scanning can be obtained. In this instance, alikely a video signal is also in storage in a line memory and read at a speed two times of a write clock, in a regular direction for 50% of a scanning time period while increasing addresses and in a reverse direction for the rest 50% of a scanning time period while decreasing addresses, and taking pause without reading for a blanking period. As this method allows to maintain a horizontal scanning frequency as an original frequency was(15.7 kHz in a case of an NTSC signal) while increasing a number of scanning lines two times and reducing line flickers(field flicker in case of vertical), this method has advantage in that a double scanning can be made while a CPT of double scanning is not used, and in that a good picture quality can be obtained even if deflection through detection of movement is not made because no opposite direction scanning line overlaps with a regular direction scanning line.

THIRD EMBODIMENT

Figure 28:
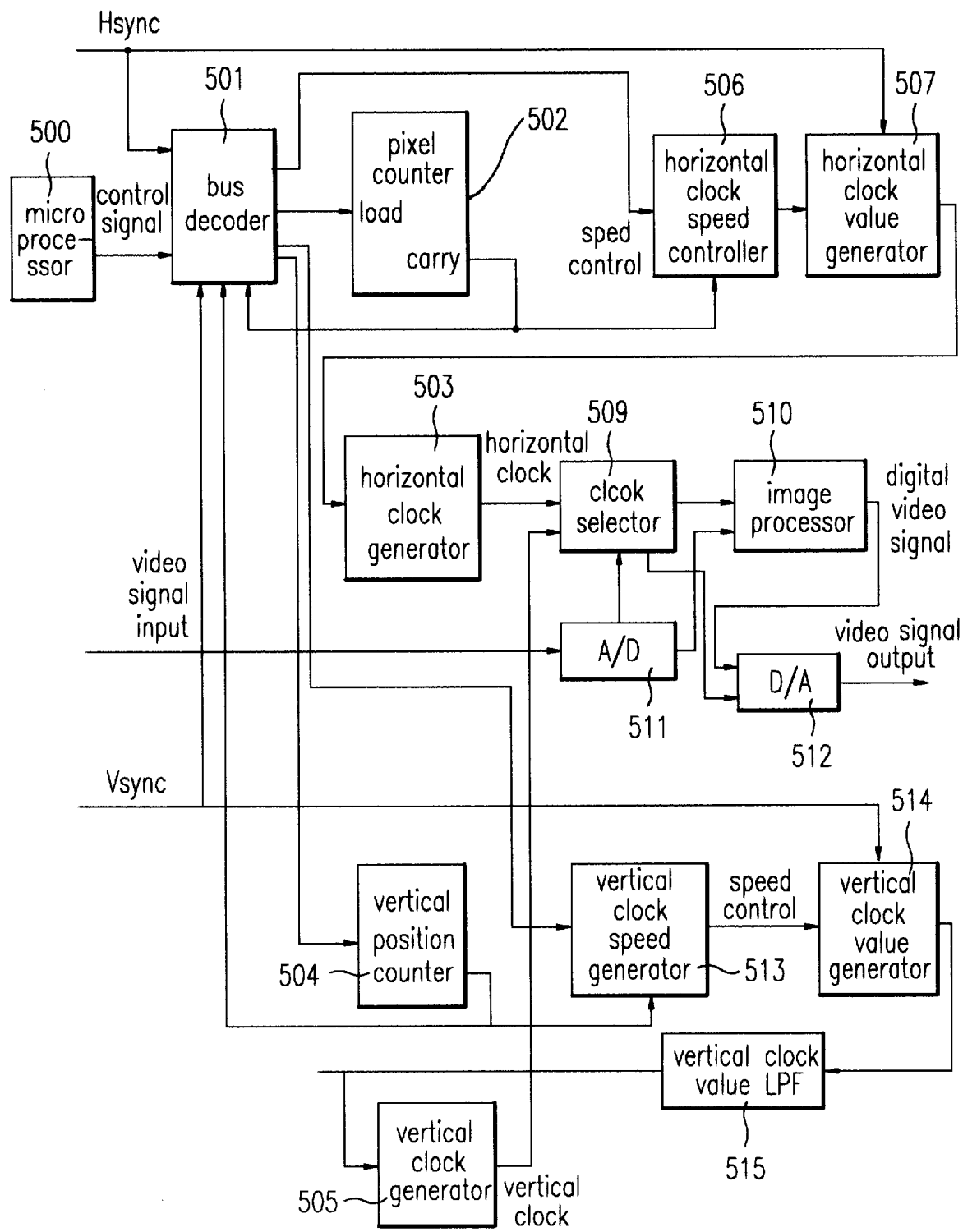
FIG. 28 illustrates a block diagram of a device for converting, an aspect ratio of a video signal by adjusting a clock speed in accordance with a third preferred embodiment of the present invention.

A system and operation of a device for converting an aspect ratio of a video signal by adjusting a clock speed in accordance with a third preferred embodiment of the present invention will be explained with reference to FIGS. 28–41. FIG. 28 illustrates a block diagram of a device for converting an aspect ratio of a video signal by adjusting a clock speed in accordance with a third preferred embodiment of the present invention.

Referring to FIG. 28, the device for converting an aspect ratio of a video signal by adjusting a clock speed in accordance with a third preferred embodiment of the present invention includes a microprocessor 500 for providing a clock speed conversion extent information for a block each defined by a plurality of horizontal sections and vertical sections of a received image in response to a control signal, a bus decoder 101 for receiving, decoding and storing a clock speed conversion extent information from the microprocessor 500, and a clock speed controller for using the clock speed conversion extent information stored in the bus decoder 101 in determining horizontal and/or vertical clock speed conversion extent of a block and controlling horizontal and/or vertical clock speed conversion extent as much as the conversion extent. The clock speed controller includes a pixel counter 502 for determining a length of each horizontal section by a pixel clock from the bus decoder 501, a horizontal clock speed controller 506 for receiving slope or up/down information provided from clock speed conversion extent information stored in the bus decoder 501 and controlling a horizontal clock speed, a horizontal clock value generator 507 for using a horizontal clock speed control signal from the horizontal clock speed controller 506 and an external horizontal synchronizing signal Hsync in generating a horizontal clock value, a horizontal clock value low pass filter 508 for filtering a signal from the horizontal clock value generator 507 with a preset frequency band, a horizontal clock generator 503 for receiving a signal from the horizontal clock value low pass filter 508 and generating a horizontal clock signal, a vertical position counter 504 for determining a length of each vertical section by a horizontal synchronizing signal Vsync from the bus decoder 501, a vertical clock speed controller 513 for receiving slope or up/down information provided from the clock speed conversion extent information stored in the bus decoder 501 in controlling a vertical clock speed, a vertical clock value generator 514 for using the vertical clock speed control signal from the vertical clock speed controller 513 and the external vertical synchronizing signal in generating a vertical clock value, a vertical clock value low pass filter 515 for filtering a signal from the vertical clock value generator 514 with a preset frequency band, a vertical clock generator 505 for receiving a signal from the vertical clock value low pass filter 515 in generating vertical clock signal, a clock selector 509 for selecting a signal from signals of the horizontal clock generator 503 and the vertical clock generator 505, and an image processor 510 for converting a received image block by block according to a video signal display ratio conversion value received through the clock selector 509. In the aforementioned device for converting an aspect ratio of a video signal by adjusting a clock speed in accordance with a third preferred embodiment of the present invention, an entire frame is divided into a plurality of sections in a horizontal and a vertical directions and a clock speed for each of the sections are converted by a microprocessor 100. Though pixel unit clock speed conversion is of course possible if a conversion control data memory is adequate and degradation in a picture quality due to sharp slope changes of the conversion extent does not matters, in this embodiment of the present invention, a frame is divided into minute sections only to an extent a naked eye can not distinguish section boundaries, and the clock speed conversion is made section by section for preset plurality of sections. That is, as shown in FIG. 7a and 7b, a frame is divided into 64 sections in horizontal and vertical directions respectively. Each section has a length which is not equal to other lengths of sections, and, in the present invention, each section may be adjusted in 1~64 pixel units horizontally, or in line units vertically. Therefore, no matter how much sharp a conversion extent change is given in view of eye sight, no section boundaries can be almost distinguished.

The bus decoder 301 shown in FIG. 28 receives serial control buses from the microprocessor 300 and stores data required for the 64 horizontal and vertical sections. When a block is defined as a rectangle formed when each of the horizontal and vertical sections are overlapped, an extent of horizontal or vertical clock speed adjustment for each of the blocks is given from the stored data. The pixel counting part 502 counts each horizontal section by a pixel clock as many as a length of the horizontal section until a carry is occurred, when an end of the section is informed and goes over to the next horizontal section to proceed the counting. Alikely, the vertical position counting part 503 counts each vertical section by a horizontal synchronizing signal Hsync as many as a length of the vertical section until a carry is occurred, when an end of the section is informed and goes over to the next vertical section to proceed the counting. The horizontal clock speed controller 504 receives slope, or up/down information from the bus decoder 501 and controls a horizontal clock speed. Then, the horizontal clock value from the horizontal clock value generating part 507 is converted into a horizontal conversion clock by the digital horizontal clock generator 503 through a horizontal low pass filter 508. This becomes the very horizontal conversion clock that converts a displayed image to a desired ratio. And, the vertical clock speed controller 513 receives slope, or up/down information from the bus decoder 501 and controls a vertical clock speed. Then, the vertical clock value from the vertical clock value generating part 514 is converted into a vertical conversion clock by the digital vertical clock generator 505 through the vertical low pass filter 515. This becomes the very vertical conversion clock that converts a displayed image to a desired ratio. In the meantime, as signs of clock speed differentials(slopes) may alternate for 64 times in the case of the 64 sections, with 64 curves and up to 32 times of repetition of a sinusoidal wave. Therefore, if, for example, the lengths of the sections are assumed to be equal and the system is operative at 60 Hz and 525 scanning lines, the horizontal clock value low pass filter 508 will have a band greater than 31.5 kHz×32=about 1 MHz and the vertical clock value low pass filter 515 will have a band greater than 60 Hz×32=about 2 kHz. However, if the horizontal conversion clock is changed along the horizontal sections as in FIG. 31, i.e., a case when a horizontal line of a frame is changed in top and bottom direction, the vertical clock value low pass filter 515 also may have a band greater than about 1 MHZ.

Figure 29:
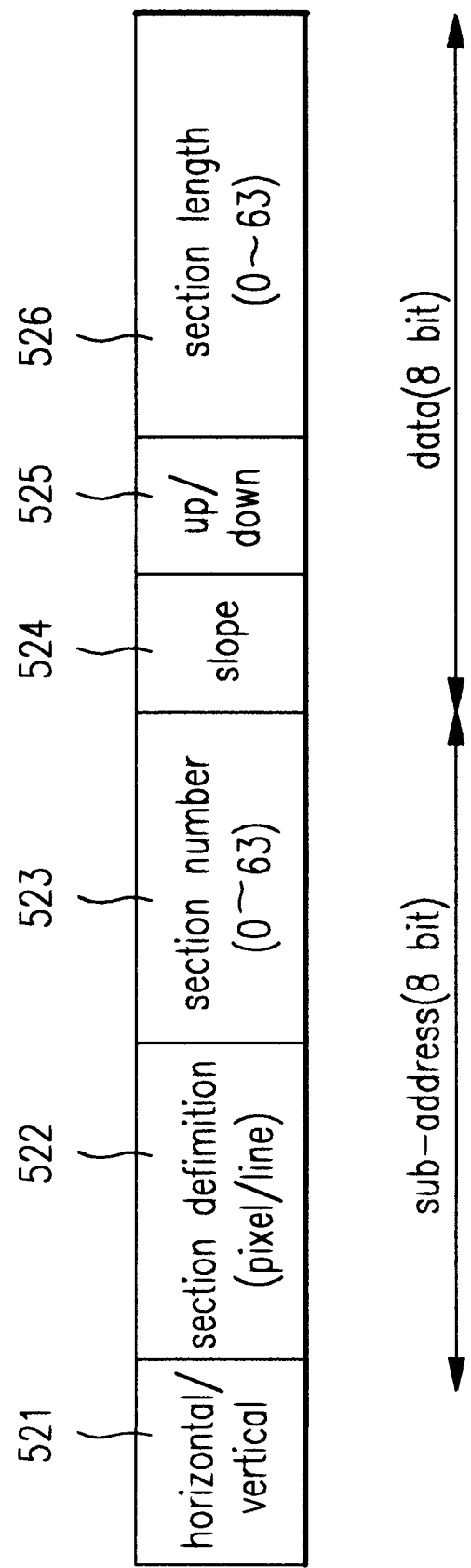
FIG. 29 illustrates a control bus format from a microprocessor.

FIG. 29 illustrates a control bus format from the microprocessor 500.

Referring to FIG. 29, the bus having a clock speed change rate information provided from the microprocessor 500 includes a horizontal/vertical conversion indicating section 521 for indicating the following data of being data applicable to horizontal conversions or vertical conversions, a section definition indicating section 522 for defining a section of falling on a horizontal section or a vertical section in a horizontal or vertical conversion, a section number indicating section 523 for indicating 0–63th sections, a slope indicating section 524 for indicating conduction of a clock speed conversion, up/down indicating section 525 for conducting up/down of a clock speed slope in the case when a state of the slope indicating section 524 indicates a clock speed conversion, and a section length indicating section 526 for indicating consecutive pixels(or lines in case of vertical) which have the present slope. The horizontal/ vertical conversion indicating section 521 in sub-address has one bit indicating the following data of being applicable to a horizontal conversion or vertical conversion. The section definition indicating section 522 has one bit indicating of being a horizontal section or a vertical section in a horizontal conversion because, even in a horizontal conversion, the horizontal conversions in different vertical positions may be different. The section number indicating section 523 has six bits indicating 0–63(or 1–64)th sections. When the slope indicating section 524 is unity, the clock speed is constant.

In this instance, the up/down indicating section 525 is ignored. However, when the slope indicating section 524 is 0, if the up/down indicating section 525 is unity, a conversion clock speed is increased, and if the up/down indicating section 525 is zero, a conversion clock speed is decreased. The section length indicating section 526 indicates consecutive pixels(or lines if it is vertical) which have the present slope, which is a value to be loaded either on the pixel counting part 502 in a horizontal conversion or vertical position counting part 504 in a vertical conversion.

The operation of the bus decoder 501 for horizontal conversion of a clock speed will be explained with reference to FIG. 30.

In this third embodiment, in a horizontal conversion, since horizontal conversions are different for each vertical section even in a horizontal conversion, a 6 bit×64 flipflop memory 536 is provided separately. Each vertical section is adapted to be selected by a 64×1 MUX 539, loaded on the horizontal conversion line counter 541, and, if a carry is occurred in the horizontal conversion line counter 541 after passing as many lines as the vertical section, coming to an end of the vertical section is informed and, on the same time, a signal acting as a clock signal is provided to the modular-64 counter MC52. Accordingly, an output of the counter MC52 is provided to the 6 bit 64×1 MUX 539 and the vertical section selection 8 bit 64×1 MUX 538a–538n, to select the next input. When the carry from the horizontal conversion pixel counting part 502 is provided to the modular-64 counter MC51, having 64 conversion data in every horizontal section, the 8 bit data in an arbitrary vertical section selected thus provides a horizontal section number to the 64×1 MUX 540. By selecting the horizontal section selecting 64×1 MUX 540 using the horizontal section number, a slope or up or down value of the present block and the present 6 bit value for going to the next block(i.e., a horizontal length of the present block) are provided as values to be loaded on the horizontal conversion pixel counting part 502. Alike the horizontal deflection, in a vertical conversion too, a carry is received from the vertical conversion vatical position counting part 503, for the modular-64 counter MC53 to select a vertical section. As shown in FIGS. 7a and 7b, in this third embodiment, though vertical and horizontal blocks for a horizontal conversion and vertical and horizontal blocks for a vertical conversion are provided separately, in FIG. 30, vertical sections are provided separately only in a horizontal conversion while all horizontal sections are converted in fixed ratios in a vertical conversion. However, expanding this further, a bus decoder is shown in FIG. 31 having a system in which ratios of conversion for horizontal sections are provided differently even in a vertical deflection. In this third embodiment, lengths of sides of a block can be arbitrarily fixed according to the section length data. Herein, since all blocks should be neither overlapped, nor spaced for convenience's sake, lengths of all horizontal sections within a vertical section are made the same. This is because a deflection beam in a CRT proceeds from left to right, and from top to bottom in a sequence, though a horizontal line are not impossible to curve in a top to bottom direction. Curving a horizontal line in a top and bottom direction as shown in FIG. 2e is possible as much as one like by horizontal variation of a vertical conversion clock speed using a decoder shown in FIG. 31.

Figure 32:
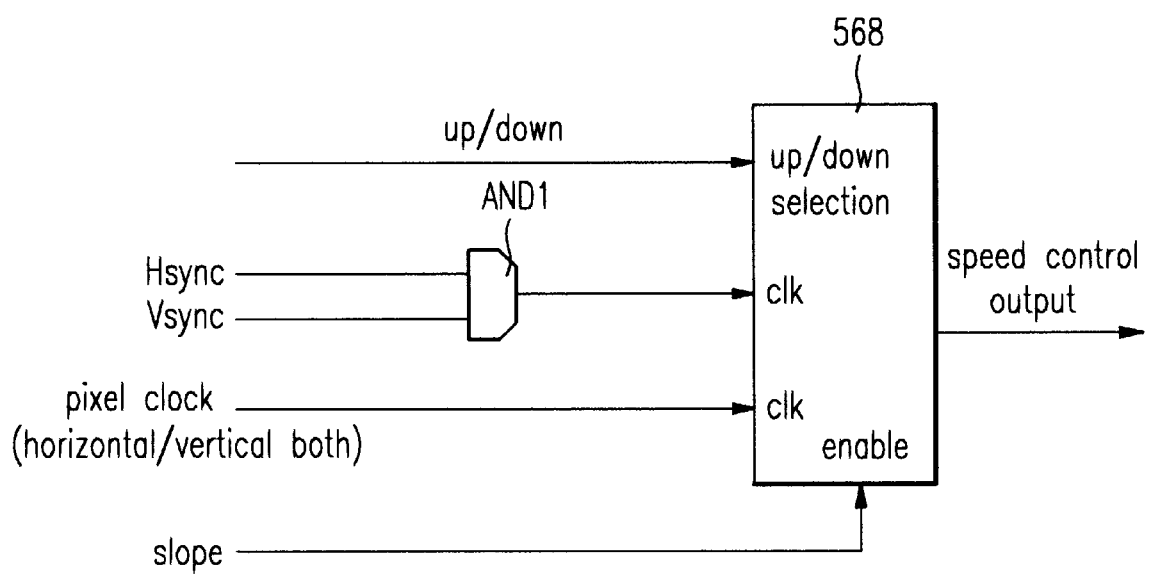
FIG. 32 illustrates a block diagram of the horizontal, or vertical clock speed controller shown in FIG. 28.
Figure 33:
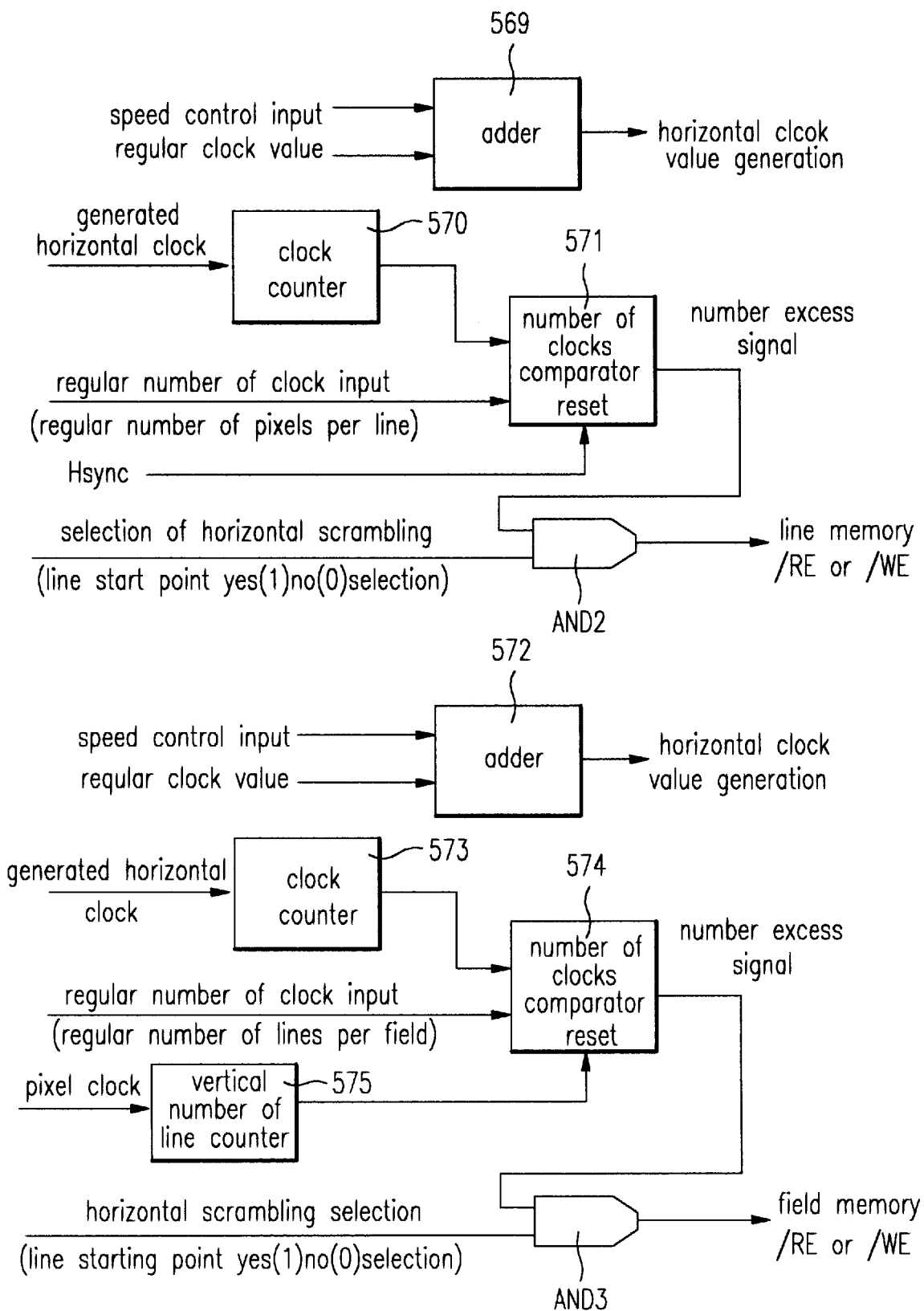
FIG. 33 illustrates a block diagram of the horizontal, or vertical clock value generator shown in FIG. 28.
Figure 41A:
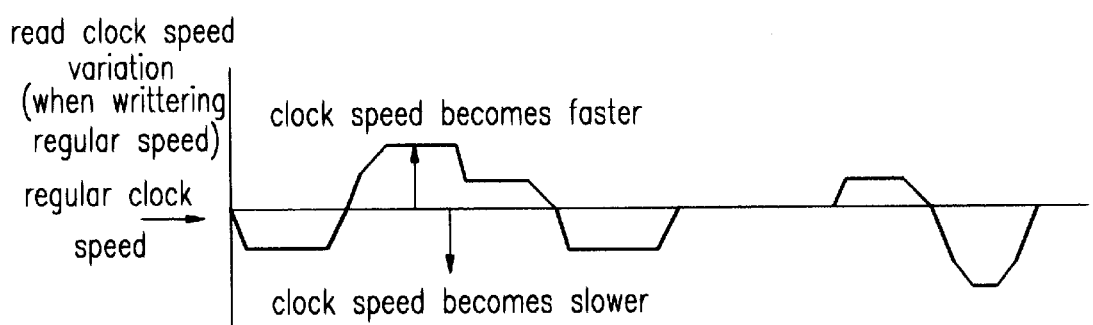
Figure 41B:
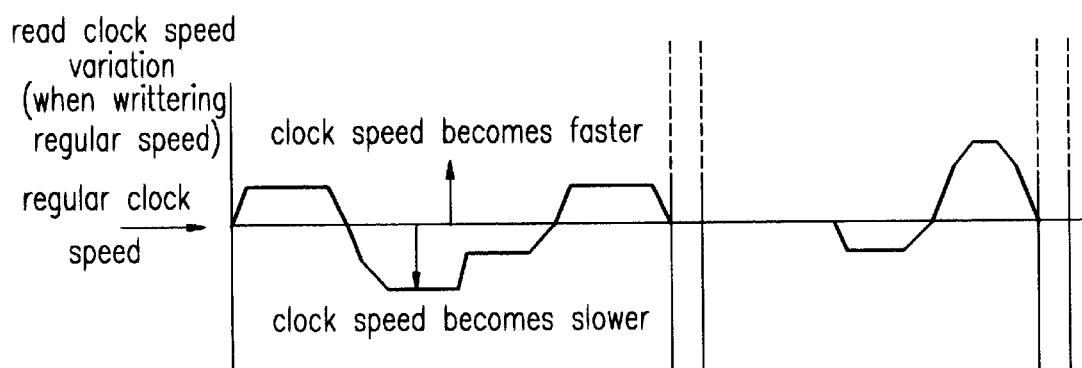
Figure 41C:
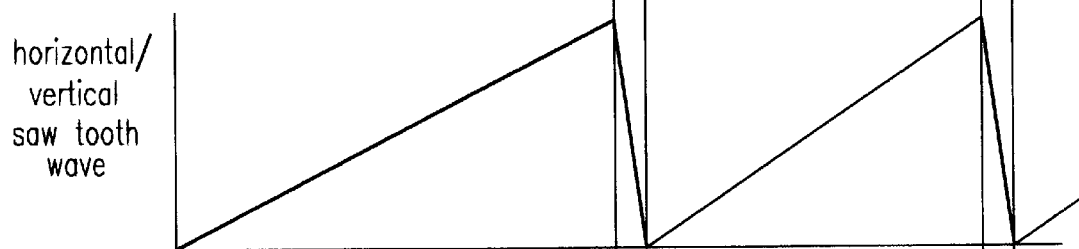
Figure 41D:
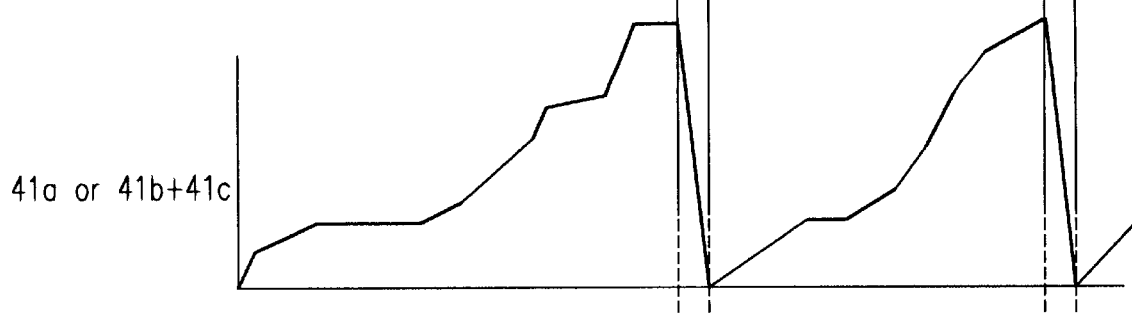

FIG. 32 illustrates a system of the horizontal or vertical clock speed controller 506 or 513 shown in FIG. 28, wherein a slope signal or an up or down of the slope signal is received from the bus decoder 501 to drive an up/down counter 568 which increases the present value when the slope increases and reduces the present value when the slope decreases. A signal from the up/down counter 568 is a clock speed control output. As shown in FIGS. 41a and 41b, this clock speed control output is linear in each section. FIG. 41a illustrates variation of a read clock speed to a regular clock speed when written in a regular speed, and FIG. 41b illustrates variation of a write clock speed to a regular clock speed when read in a regular speed. For reference, since this control output has a value adequately smaller than the regular clock value which is a clock value of a regular video signal shown in FIG. 33, causing a clock speed changed comparatively slow, even though the clock speed control output is provided to a digital clock generator 503 or 505 through a horizontal or vertical low pass filter 508 or 515 or to an analog clock generator after converting into analog signal, the clock generator can generate a converted clock frequency without any trouble. This digital clock value is preferably at least 10 bits greater than a number of pixels per one horizontal scanning line(a number of lines in a frame if it is a vertical conversion). In FIG. 33, a speed control value is added to a regular clock value to generate horizontal/vertical clock value as a waveform shown in FIG. 41d. In a clock number comparator 571 or 574 shown in FIG. 33, since a write or read is made after coming back to an original point again if a number obtained by counting a number of clocks until an end of an image is greater than a horizontal or vertical length of a memory, a starting portion in a horizontal scanning line (an upper starting portion when it is vertical) of a video data is broken as much as an exceeding portion when a clock number per line exceeds its boundary. Though it may be disregarded if it is for a scrambling effect of an image, in order to prevent such an effect, it is necessary to disable /WE(at a speed conversion in a write) or /RE(at a speed conversion in a read) of the line memory or the field memory if a number excess signal is occurred. In this clock speed controlling method, not that the output in FIG. 3 becomes a deflective wave to be used for an image conversion directly, but that a speed controlled clock provided to the image processor 510 adjusts an image display ratio.

Figure 30:
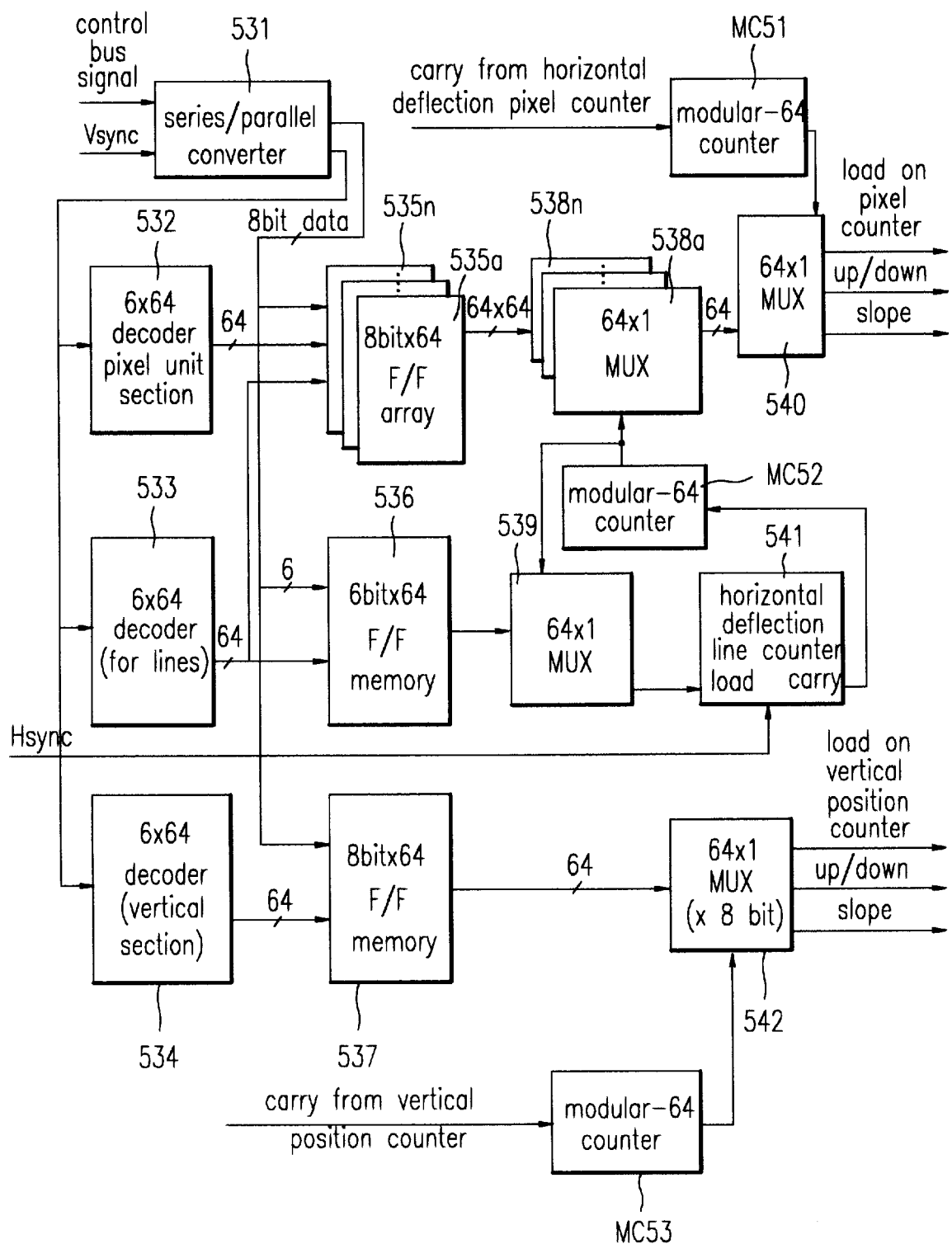
FIG. 30 illustrates a block diagram of the bus decoder shown in FIG. 28.
Figure 31:
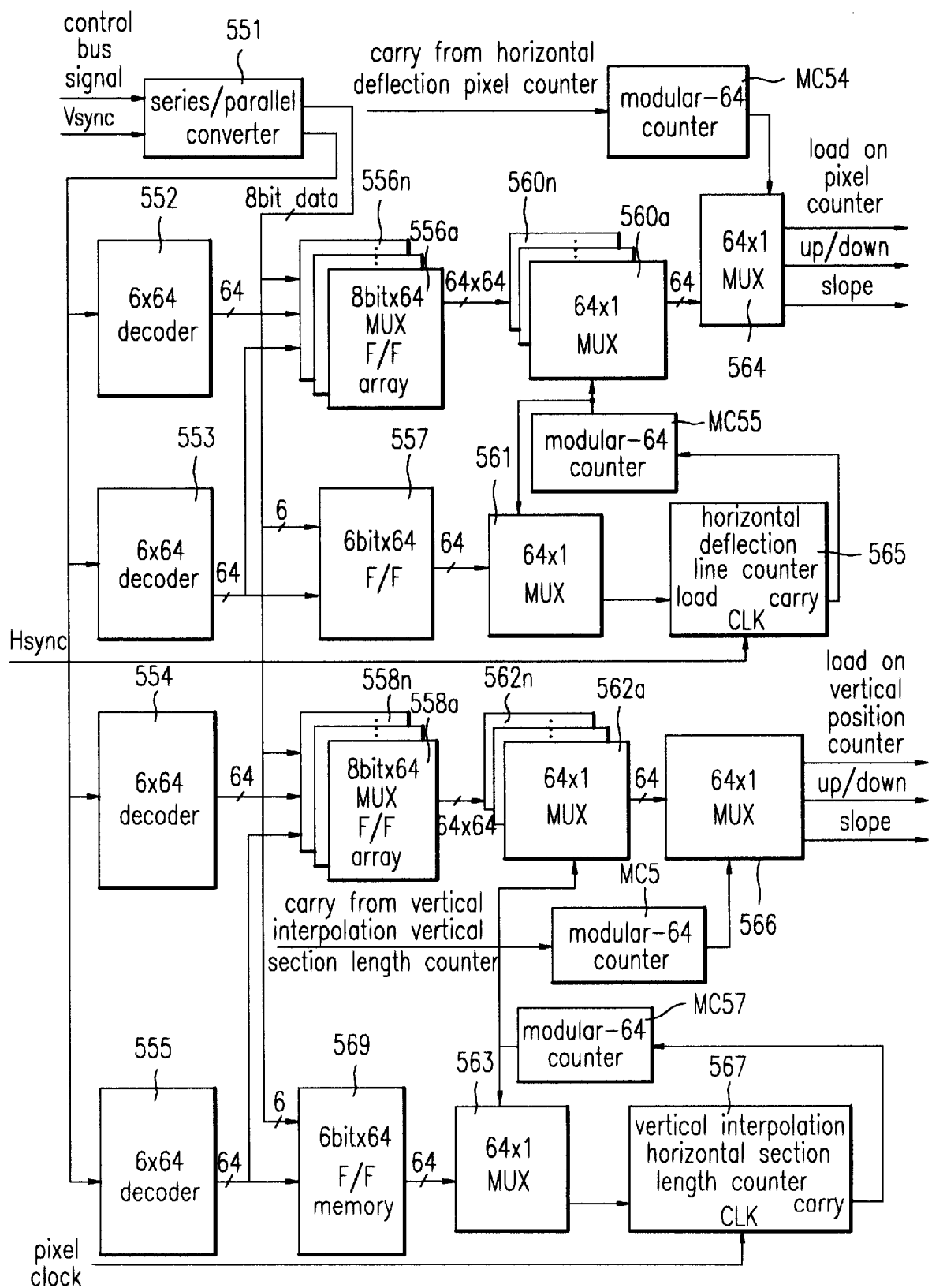
FIG. 31 illustrates a block diagram of another embodiment bus decoder shown in FIG. 30.
Figure 34:
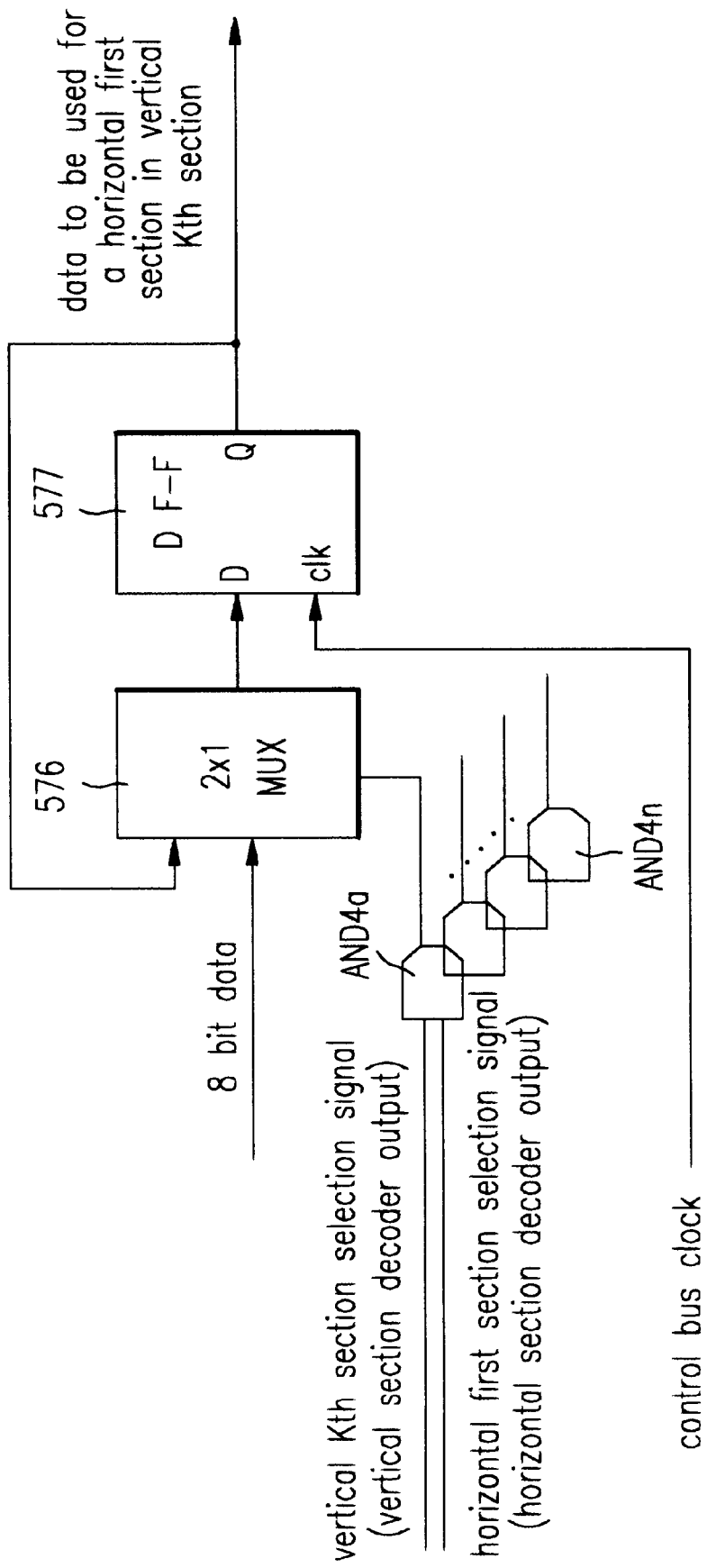
FIG. 34 illustrates a block diagram of the flipflop array shown in FIG. 30.

FIG. 34 illustrates how the flipflop array 335a–335n shown in FIG. 30 identify horizontal sections and vertical sections in storing an 8 bit data. That is, when outputs of decoders representing vertical kth section and horizontal first section are transited to high on the same time, causing a selection signal to a 2×1 MUX 576 to transit to high, the 8 bit data is provided to an 8 bit flipflop 577. Other than this case, the present value is kept fed-back, to maintain its own value.

Figure 35:
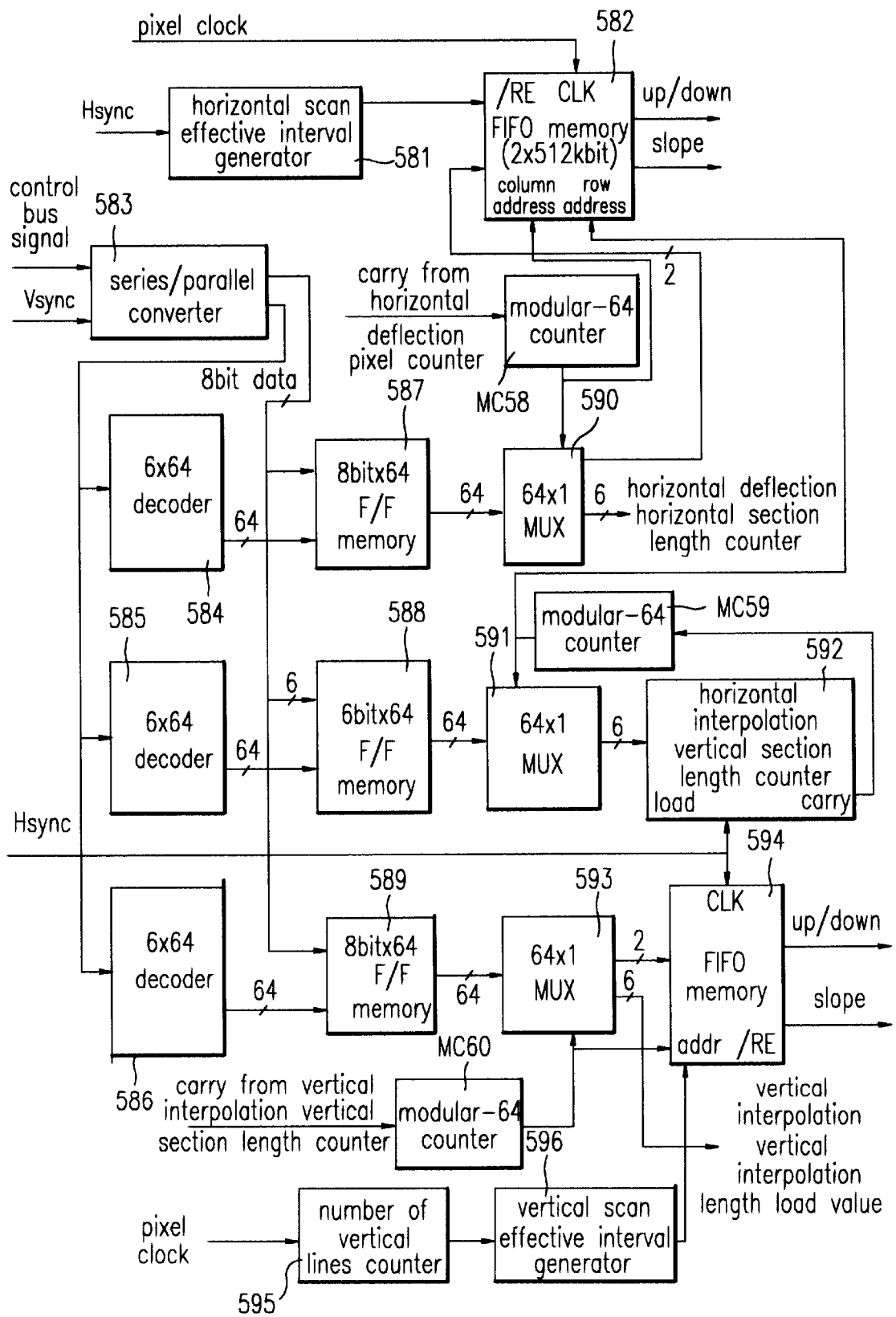
FIG. 35 illustrates a block diagram of another embodiment bus decoder shown in FIG. 30.

FIG. 35 illustrates an exemplary case when a flipflop memory 587 is used instead of the 64'64 8 bit flipflop array 535a–535n shown in FIG. 30. As this flipflop memory 587 is in storage of slope or slope up/down information for given lengths of block units, this flipflop memory 587 may be considered as a 2 bit field memory. And, as the flipflop memory 587 is in storage of 2 bit data only in a vertical direction for use in a vertical conversion, this flipflop memory 587 may be used as a 2 bit line memory in a vertical direction. However, as is in FIG. 31, if horizontal sections are provided with application of different conversion ratio thereto in a vertical conversion too, alike the case of horizontal conversion, this should be the 2 bit field memory. What is required for a horizontal conversion is storage of a 2 bit data required for generation of a horizontal conversion clock value in the flipflop memory 587 only for a horizontal scanning effective interval, and what is required for a vertical conversion is storage of a 2 bit data required for generation of a vertical deflection value in the flipflop memory 587 only for a vertical scanning effective interval.

Figure 36A:
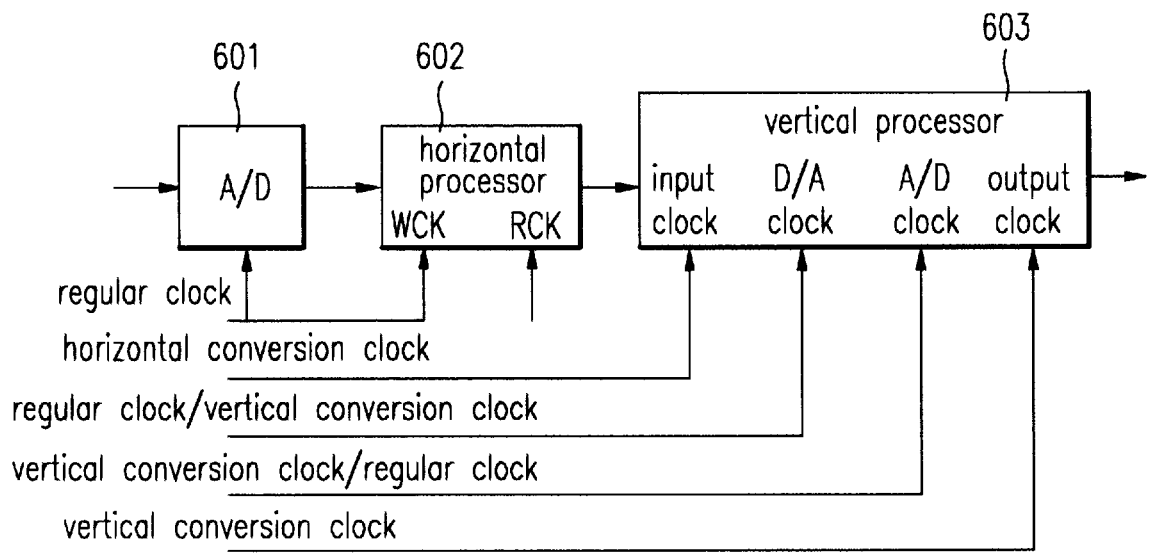
FIGS. 36a~36c illustrate block diagrams of the image processor shown in FIG. 30 in accordance with different embodiments of the present invention.
Figure 36B:
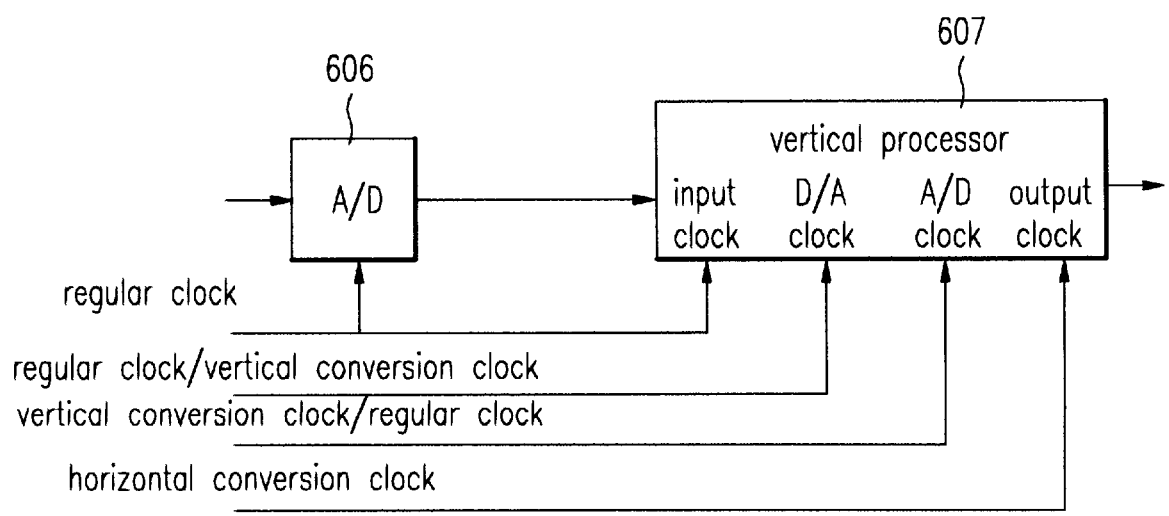
Figure 36C:
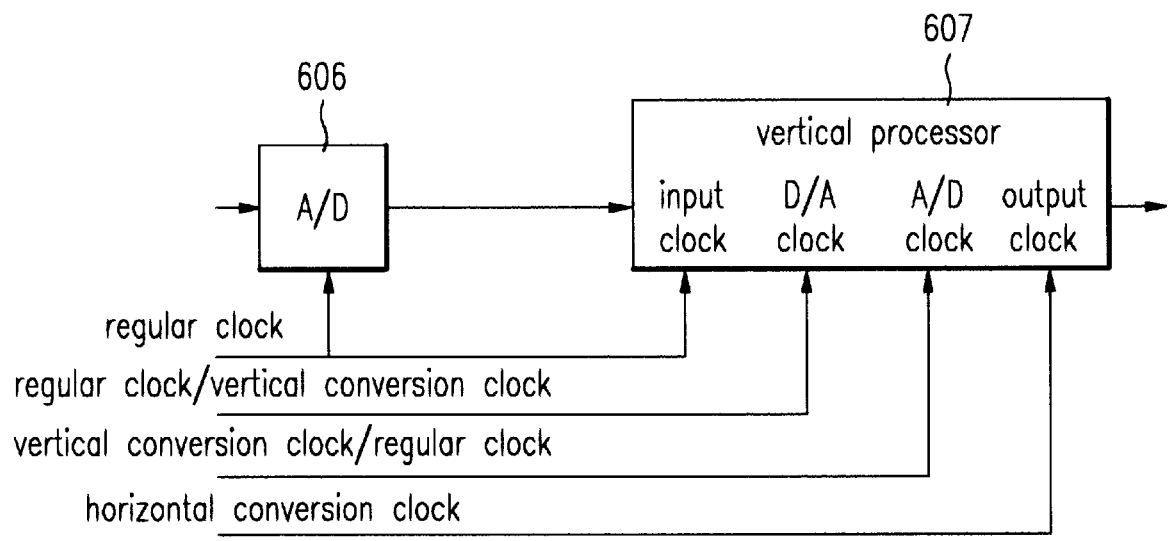

FIGS. 36a–36c illustrate a system of the image processor shown in FIG. 28, wherein the system may include, depending on processes, both a horizontal processor and a vertical processor, or a vertical processor only if a horizontal conversion is done in the analog to digital or digital to analog conversion. That is, FIG. 36a illustrates a case when a horizontal conversion is made by using a speed controlled clock at a time of reading a horizontal processor 602 of a line memory and then a vertical conversion is conducted using a vertical processor 603, FIG. 36b illustrates a case when the horizontal conversion is made in an analog to digital conversion, and FIG. 36c is a case when the horizontal conversion is carried out by means of an output clock in a digital to analog conversion. The horizontal conversion in an analog to digital conversion means a speed conversion in a write on a field memory in the vertical processor 605 as shown in FIG. 41b, and the horizontal conversion in a digital to analog conversion means a speed conversion in a read from a field memory in the vertical processor 607 as shown in FIG. 41a. Therefore, opposite clock speed conversions should be made to occur, to achieve conversions of the same ratios at the end.

Figure 37:
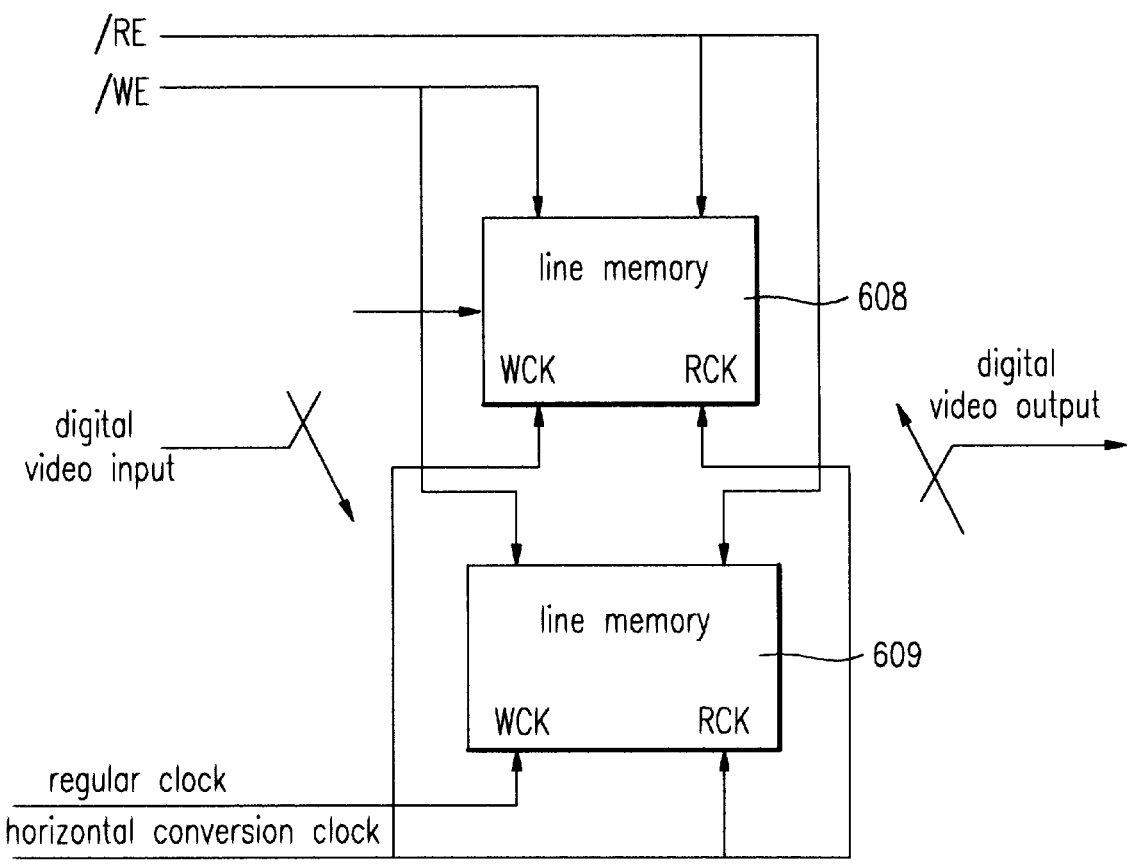

FIG. 37 illustrates a system of the horizontal processor 602 shown in FIG. 36a which writes a horizontal scanning interval on the line memories 608 and 609, alternatingly for horizontal conversion.

Figure 38:
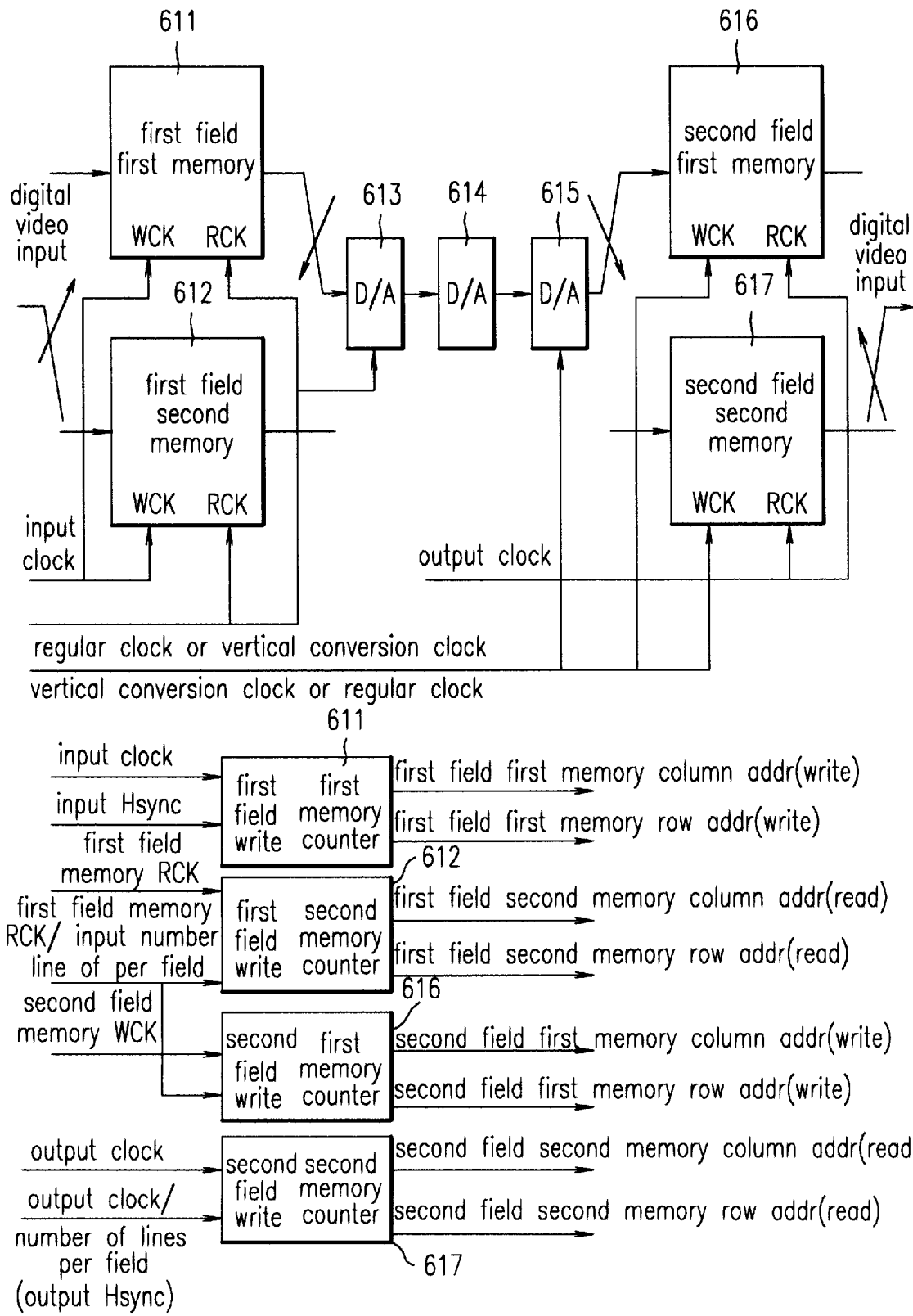
FIG. 38 illustrate block diagram of the vertical processor shown in FIGS. 36b and 36c.
Figure 39A:
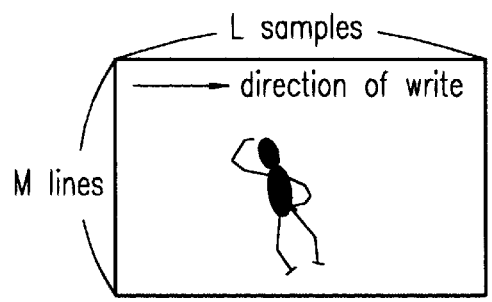
FIGS. 39a~39d illustrate states of images by operation of the horizontal processor and the vertical processor shown in FIGS. 37 and 38.
Figure 39B:
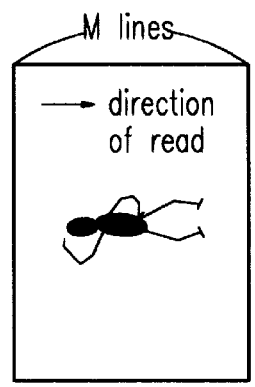
Figure 39C:
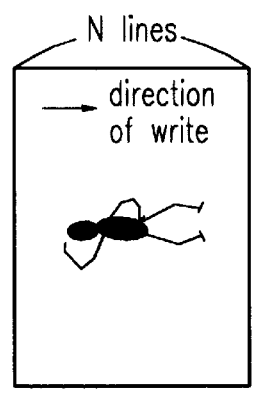
Figure 39D:
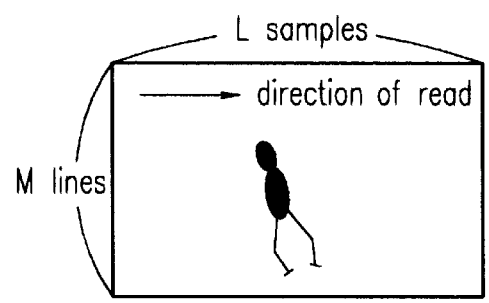
Figure 40:
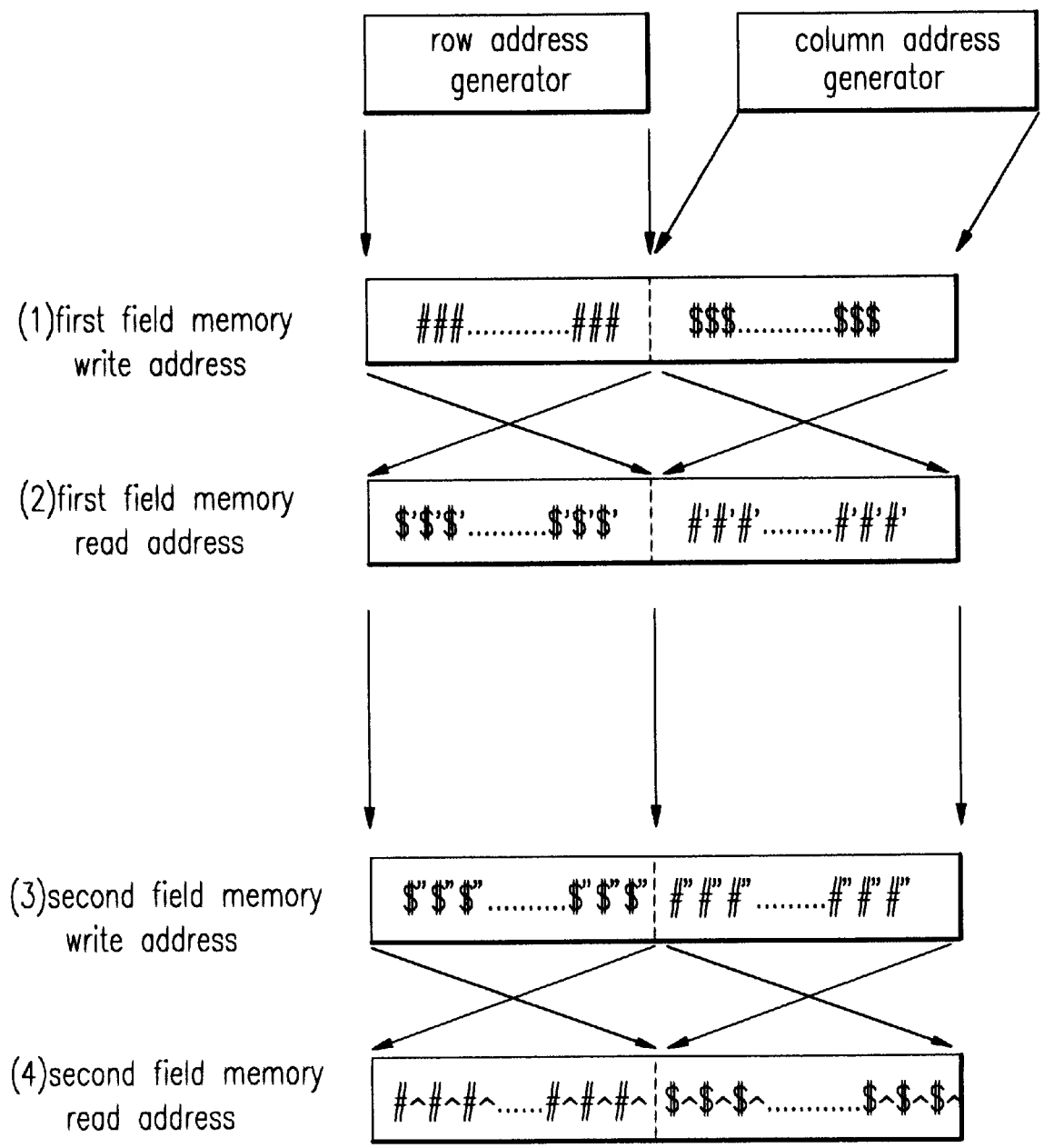
FIG. 40 explains address conversion by a horizontal and vertical conversion according to operation of the ones shown in FIGS. 37 and 38; and, FIGS. 41a~41d illustrate graphs showing variation of clock speed in horizontal and vertical sections.

FIG. 38 illustrates a system of the vertical processor 605 or 607 shown in FIG. 36b or 36c, wherein two pairs of field memories are used for writing on every field memory, alternatingly. In this instance, an image is read from a second field first memory 616 in a vertical direction while the image is written on a first field first memory 611 in a horizontal direction, for having an output of the first field first memory 611 as shown in FIG. 39b. Then, when the image is turned to a 90° through the digital to analog converter 613 and the low pass filter 614 and, again, analog to digital converted through the analog to digital converter 615, there is at the end an effect of making a vertical re-sampling. In this instance, received number of lines may be different from an output number of lines depending on the vertical conversion clock speed, when blanks may be occurred on the screen in a top to bottom direction or a portion of the image may not be seen. The vertical conversion clock applies only to either one of the digital to analog clock or analog to digital clock while the other one is applied of a regular clock. In this instance, the use of vertical conversion clock in a digital to analog conversion is a case identical to the case of FIG. 41a, and the use of vertical conversion clock in an analog to digital conversion is a case identical to the case of FIG. 41b. Therefore, opposite clock speed conversions should be made to occur, to obtain the same vertical image conversions.

FIGS. 39a–39d and 40 are provided for explaining how the vertical processor 605 or 607 conducts the vertical conversion. FIGS. 41a–41d show steps of obtaining a deflective waveform of a modified sawtooth wave which gives the same effect as a clock capable of an image ratio conversion actually obtained by adding a clock control output to a regular clock value. FIG. 2d illustrates an image of which frame ratio is converted using the horizontal conversion clock obtained in association with FIG. 41d and fixed vertical conversion clocks in a horizontal direction. However, as in FIG. 31, since vertical conversion can be carried out as the vertical conversion clock speed becomes faster and slower along the horizontal sections if the clock speed is made to differ along the horizontal sections even in the vertical deflection, when an image is passed through the second field first and second memory 616 and 617 shown in FIG. 38, as shown in FIG. 39, a position of a vertical data is inverted in a top to bottom direction even in a horizontal scanning line interval. An image obtained thus by moving a vertical deflection in a top to bottom direction along horizontal sections is shown in FIG. 2f.

According to the present invention as has been explained until now, any kind of video signal can be displayed on a given screen in a most suitable aspect ratio regardless of an aspect ratio of an input video signal.

More specifically, by dividing an entire frame into a plurality of horizontal and vertical sections and making expansion or compression conversions of the sections of images by adjusting an interpolation ratio, an image can be converted to be displayable in a desired form of image and an arbitrary portion of the image can be converted into an image of an arbitrary aspect ratio. The aforementioned device for converting an aspect ratio using interpolation can be easily applicable to an LCD or PDP, both digitize a video signal before display.

And, by dividing an entire frame into a plurality of horizontal and vertical sections, and either by adjusting a deflective wave or adjusting a clock signal of the video signal for each of the sections, an aspect ratio of the video signal can be arbitrarily varied. The device for converting an aspect ratio using either a deflective wave or clock speed can be easily applicable to a CRT which converts a video signal into analog signal before display.

It will be apparent to those skilled in the art that various modifications and variations can be made in the device and method for converting an aspect ratio of a video signal of the present invention without departing from the spirit or scope of the invention. Thus, it is intended that the present invention cover the modifications and variations of this invention provided they come within the scope of the appended claims and their equivalents.

What is claimed is:

1. A device for converting an aspect ratio of a video signal, the device displaying a received image on a screen divided into a plurality of horizontal, and vertical sections, the device comprising:

means for generating arbitrary mapping information on the received image in image block units defined by the horizontal, and vertical sections; and, means for determining the aspect ratio of the received image for a block using the arbitrary mapping information and converting the received image, varying a vertical display ratio for each horizontal position and/or a horizontal display ratio for each vertical position, of the received image with the aspect ratio.

2. A device as claimed in claim 1, wherein the horizontal sections and the vertical sections have unequal section lengths in 1 to 64 pixel units or line units.

3. A device for converting an aspect ratio of a video signal, the device displaying a received image on a screen divided into a plurality of horizontal sections and vertical sections, the device comprising:

means for generating interpolation ratio conversion extent information on the received image in image block units defined by the horizontal, and vertical sections; and, means for making different conversion of an interpolation ratio for a block for each horizontal, and/or vertical positions using the interpolation ratio conversion extent information.

4. A device for converting an aspect ratio of a video signal, the device displaying a received image on a screen divided into a plurality of horizontal sections and vertical sections, the device comprising:

a micro-processor for generating interpolation ratio conversion extent information in block units defined by the horizontal and vertical sections;

a bus decoder for receiving, decoding and storing the interpolation ratio conversion extent information; and, an interpolation ratio controller for using the stored interpolation ratio conversion extent information in determining horizontal and/or vertical interpolation ratio conversion extents for each block and making different conversion of an interpolation ratio for each horizontal and/or vertical positions of the received image according to the extents.

5. A device as claimed in claim 4, wherein the interpolation ratio controller includes, a horizontal interpolation horizontal section length counting part for determining horizontal section lengths according to the interpolation ratio conversion extent information stored in the bus decoder, a vertical interpolation vertical section length counting part for determining vertical section lengths according to the interpolation ratio conversion extent information stored in the bus decoder, a horizontal interpolation coefficient controller for selecting a coefficient required for a horizontal interpolation according to the interpolation ratio conversion extent information from the bus decoder, a vertical interpolation coefficient controller for selecting a coefficient required for a vertical interpolation according to the interpolation ratio conversion extent information from the bus decoder, and an image processor for subjecting a received image to horizontal and/or vertical interpolation according to expansion or compression interpolation values from the horizontal interpolation coefficient controller and/or the vertical interpolation coefficient controller.

6. A device as claimed in claim 4, wherein the interpolation ratio converting part includes, a horizontal interpolation horizontal section length counting part for determining horizontal section lengths according to the interpolation ratio conversion extent information stored in the bus decoder, a horizontal interpolation coefficient controller for selecting a coefficient required for a horizontal interpolation according to the interpolation ratio conversion extent information from the bus decoder, and an image processor for subjecting a received image to horizontal interpolation according to expansion or compression interpolation values from the horizontal interpolation coefficient controller.

7. A device as claimed in claim 4, wherein the interpolation ratio converting part includes, a vertical interpolation vertical section length counting part for determining vertical section lengths according to the interpolation ratio conversion extent information stored in the bus decoder, a vertical interpolation coefficient controller for selecting a coefficient required for a vertical interpolation according to the interpolation ratio conversion extent information from the bus decoder, and an image processor for subjecting a received image to vertical interpolation according to expansion or compression interpolation values from the vertical interpolation coefficient controller.

8. A device as claimed in claim 4, wherein a data format of the interpolation coefficient conversion extent information includes, a horizontal/vertical interpolation indicating section for indicating a following data of being applicable to horizontal or vertical interpolation, a section definition indicating section for indicating a section of falling on a horizontal section or a vertical section in a horizontal interpolation or a vertical interpolation, a section number indicating section for indicating a selected section within a preset range, a non-interpolation indicating section for indicating conduction of interpolation, an expansion/compression indicating section for indicating increase/decrease of a number of image data according to a condition of the non-interpolation indicating section, and a denominator selection indicating section for calculating a section length.

9. A device for converting an aspect ratio of a video signal, the device displays a received image on a screen divided into a plurality of horizontal sections and vertical sections, the device comprising:

means for generating deflective ratio conversion extent information on the received image in image block units defined by the horizontal, and vertical sections; and, means for making different conversion of a deflective ratio for a block for each horizontal, and/or vertical positions using the deflective ratio conversion extent information.

10. A device for converting an aspect ratio of a video signal, the device displaying a received image on a screen divided into a plurality of horizontal sections and vertical sections, the device comprising:

a micro-processor for generating deflective ratio conversion extent information in block units defined by the horizontal and vertical sections;

a bus decoder for receiving, decoding and storing the deflective ratio conversion extent information; and, an deflective ratio controller for using the stored deflective ratio conversion extent information in determining horizontal and/or vertical deflective ratio conversion extents for each block and making different conversion of a deflective ratio for each horizontal and/or vertical positions of the received image according to the extents.

11. A device as claimed in claim 10, wherein the deflective ratio conversion extent information is generated when a user selects a mode set in the microprocessor.

12. A device as claimed in claim 10, wherein the deflective ratio controller includes, a horizontal deflective pixel counting part for determining a length of each horizontal section by means of a pixel clock provided from the bus decoder, a horizontal slope controller for receiving slope(linear) or slope up/down information contained in the deflective ratio conversion extent information received from the bus decoder and controlling a slope of a horizontal deflective wave, a horizontal deflective value generating part for generating a horizontal deflective value using a signal from the horizontal slope controller and an external horizontal synchronizing signal, a vertical deflection vertical position counting part for determining a length of each vertical section by the pixel clock provided from the bus decoder, a vertical slope controller for receiving slope(linear) or slope up/down information contained in the deflective ratio conversion extent information from the bus decoder and controlling a slope of a vertical deflective wave, a vertical deflective value generating part for generating a vertical deflective value using a signal from the vertical slope controller and an external vertical synchronizing signal.

13. A device as claimed in claim 12, wherein the horizontal, or vertical deflective value generating part includes, at least one line memory for storing the video signal under the control of a signal from the horizontal or vertical slope controller in a regular deflection and reading the stored video signal in an opposite direction in an opposite direction scanning, an adder for adding a slope control signal from the horizontal slope controller or the vertical slope controller and the increased/decreased sawtooth wave data, and a maximum deflective value comparator for receiving a signal from the adder and comparing arrival of the signal at an end point of a deflection.

14. A device as claimed in claim 13, wherein the saw tooth wave data is scanned in opposite directions to each other by 50% of the horizontal synchronous cycle.

15. A device as claimed in claim 10, wherein the deflective ratio controller includes, a horizontal deflective pixel counting part for determining a length of each horizontal section by means of a pixel clock provided from the bus decoder, a horizontal slope controller for receiving slope(linear) or slope up/down information contained in the deflective ratio conversion extent information received from the bus decoder and controlling a slope of a horizontal deflective wave, and a horizontal deflective value generating part for generating a horizontal deflective value using a signal from the horizontal slope controller and an external horizontal synchronizing signal.

16. A device as claimed in claim 10, wherein the deflective ratio controller includes, a vertical deflection vertical position counting part for determining a length of each vertical section by the pixel clock provided from the bus decoder, a vertical slope controller for receiving slope or slope up/down information contained in the deflective ratio conversion extent information from the bus decoder and controlling a slope of a vertical deflective wave, and a vertical deflective value generating part for generating a vertical deflective value using a signal from the vertical slope controller and an external vertical synchronizing signal.

17. A device as claimed in claim 10, wherein a data format of the deflective ratio conversion extent information includes, a horizontal/vertical interpolation indicating section for indicating a following data of being applicable to horizontal or vertical deflection, a section definition indicating section for indicating a section of falling on a horizontal section or a vertical section in a horizontal deflection or a vertical deflection, a section number indicating section for indicating a selected section within a preset range, a slope indicating section for indicating conduction of deflection, an increase/decrease indicating section for indicating increase/decrease of a slope of a deflective wave according to a condition of the slope indicating section, and a section length indicating section for determining a number of pixels or lines of the present slope.

18. A device for converting an aspect ratio of a video signal, the device displays a received image on a screen divided into a plurality of horizontal sections and vertical sections, the device comprising:

means for generating clock speed conversion extent information on the received image in image block units defined by the horizontal, and vertical sections; and, means for making different conversion of a clock speed for a block for each horizontal, and/or vertical positions using the clock speed conversion extent information.

19. A device for converting an aspect ratio of a video signal, the device displays a received image on a screen divided into a plurality of horizontal sections and vertical sections, the device comprising:

a micro-processor for generating clock speed conversion extent information in block units defined by the horizontal and vertical sections;

a bus decoder for receiving, decoding and storing the clock speed conversion extent information; and, a clock speed controller for using the stored clock speed conversion extent information in determining horizontal and/or vertical clock speed conversion extents for each block and making different conversion of a clock speed for each horizontal and/or vertical positions of the received image according to the extents.

20. A device as claimed in claim 19, wherein the clock speed controller includes, a pixel counter for determining a length of each horizontal section by a pixel clock from the bus decoder, a horizontal clock speed controller for receiving slope or slope up/down information stored in the bus decoder and controlling a horizontal clock speed, a horizontal clock value generator for using a horizontal clock speed control signal from the horizontal clock speed controller and an external horizontal synchronizing signal in generating a horizontal clock value, a horizontal clock generator for receiving a signal from the horizontal clock value generator and generating a horizontal clock signal, a vertical position counter for determining a length of each vertical section by a horizontal synchronizing signal from the bus decoder, a vertical clock speed controller for receiving slope or slope up/down information provided from the bus decoder in controlling a vertical clock speed, a vertical clock value generator for using the vertical clock speed control signal from the vertical clock speed controller and the external vertical synchronizing signal in generating a vertical clock value, a vertical clock generator for receiving a signal from the vertical clock value generator in generating a vertical clock signal, and an image processor for converting a received image block by block according to a video signal display ratio conversion value received from the vertical clock generator.

21. A device as claimed in claim 20, wherein each of the horizontal clock value generator or the vertical clock value generator includes,
- a horizontal/vertical clock counter for receiving, counting and providing a horizontal or vertical clock, and
- a horizontal/vertical clock number comparator for receiving a signal from the horizontal/vertical clock counter and a regular clock number signal, returning back to an original point again when a number is greater than a horizontal or vertical length stored in advance, the number being a number of a horizontal or vertical clocks counted until a time point corresponding to an end of the image, to conduct a write or read.

22. A device as claimed in claim 20, wherein the image processor includes,
- a horizontal processor for writing the received video signal using a regular clock and reading the received video signal using a horizontal conversion clock, to process the received video signal, horizontally, and
- a vertical processor for converting the video signal from the horizontal processor in a vertical direction.

23. A device as claimed in claim 22, wherein the vertical processor uses one pair of first, and second field memories for alternatingly writing and reading every field, with the received image written on the first field memory in a horizontal direction while the received image read from the first field memory in a vertical direction.

24. A device as claimed in claim 20, wherein the image processor includes,
- an analog to digital converter for horizontal processing of the received video signal, and
- a vertical processor for vertical processing of a video signal from the analog to digital converter.

25. A device as claimed in claim 20, wherein the image processor includes,
- a digital to analog converter for vertical processing of the received video signal, and
- a vertical processor for horizontal processing of a video signal from the digital to analog converter.

26. A device as claimed in claim 19, wherein the clock speed controller includes,
- a pixel counter for determining a length of each horizontal section by a pixel clock from the bus decoder,
- a horizontal clock speed controller for receiving slope or slope up/down information stored in the bus decoder and controlling a horizontal clock speed,
- a horizontal clock value generator for using a horizontal clock speed control signal from the horizontal clock speed controller and an external horizontal synchronizing signal in generating a horizontal clock value, and
- a horizontal clock generator for receiving a signal from the horizontal clock value generator and generating a horizontal clock signal.

27. A device as claimed in claim 19, wherein the clock speed controller includes,
- a vertical position counter for determining a length of each vertical section by a horizontal synchronizing signal from the bus decoder,
- a vertical clock speed controller for receiving slope or slope up/down information provided from the bus decoder in controlling a vertical clock speed,
- a vertical clock value generator for using the vertical clock speed control signal from the vertical clock speed controller and the external vertical synchronizing signal in generating a vertical clock value,
- a vertical clock generator for receiving a signal from the vertical clock value generator in generating a vertical clock signal, and
- an image processor for converting a received image block by block according to a video signal display ratio conversion value received from the vertical clock generator.

28. A device as claimed in claim 19, wherein a data format of the clock speed conversion extent information includes,
- a horizontal/vertical conversion indicating section for indicating a following data of being applicable to horizontal or vertical conversion,
- a section definition indicating section for indicating a section of falling on a horizontal section or a vertical section in a horizontal conversion or a vertical conversion,
- a section number indicating section for indicating a selected section within a preset range,
- a slope indicating section for indicating conduction of conversion on a read or write clock speed,
- an increase/decrease indicating section for indicating increase/decrease of a slope of a clock speed according to a condition of the slope indicating section, and
- a section length indicating section for determining a number of pixels or lines of the present slope.

29. A method for converting an aspect ratio of a video signal, in which a received image is displayed on a screen divided into a plurality of horizontal, and vertical sections, the method comprising the steps of:
- generating arbitrary mapping information on the received image in image block units defined by the horizontal, and vertical sections; and,
- determining the aspect ratio of the received image for a block using the arbitrary mapping information and converting the received image, varying a vertical display ratio for each horizontal position and/or a horizontal display ratio for each vertical position, of the received image with the aspect ratio.

30. A method for converting an aspect ratio of a video signal, in which a received image is displayed on a screen divided into a plurality of horizontal, and vertical sections, the method comprising the steps of:
- (1) generating interpolation ratio conversion extent information on the received image in image block units defined by the horizontal, and vertical sections;
- (2) receiving, decoding, and storing the interpolation ratio conversion extent information; and,
- (3) determining horizontal and/or vertical interpolation ratio conversion extents of the received image for a block using the stored interpolation ratio conversion extent information and converting the received image varying an interpolation ratio for each horizontal and/or vertical positions, of the received image, with the conversion extents.

31. A method as claimed in claim 30, wherein the step (3) includes the steps of;
- receiving the interpolation ratio conversion extent information and determining lengths of the horizontal sections and/or vertical sections, and
- controlling a clock speed according to slope or slope up/down information contained in the interpolation ratio conversion extent information, to generate horizontal and/or vertical interpolation signals.

32. A method as claimed in claim 30, wherein the horizontal and/or vertical interpolation ratio conversion extent is determined after selecting a denominator from the interpolation ratio conversion extent information and provided of a number of repetition.

33. A method as claimed in claim 32, wherein the denominator is an exponent of 2.

34. A method as claimed in claim 32, wherein a numerator is set as the denominator plus unity in an expansion interpolation and the denominator minus unity in a compression interpolation.

35. A method as claimed in claim 30, wherein, in the case of an expansion of interpolation ratio, data reading at a moment one clock later than an interpolation interval is skipped once at starting of the interpolation, to cause a number of input data to be less than a number of output data by one.

36. A method as claimed in claim 30, wherein, in the case of a compression of interpolation ratio, data writing is skipped once at an end of the interpolation, to cause a number of output data to be less than a number of input data by one.

37. A method for converting an aspect ratio of a video signal, in which a received image is displayed on a screen divided into a plurality of horizontal, and vertical sections, the method comprising the steps of:

(1) generating deflective ratio conversion extent information on the received image in image block units defined by the horizontal, and vertical sections;

(2) receiving, decoding, and storing the deflective ratio conversion extent information; and, (3) determining horizontal and/or vertical deflective ratio conversion extents of the received image for a block using the stored interpolation ratio conversion extent information and converting the received image varying a deflective ratio for each horizontal and/or vertical positions, of the received image, with the conversion extents.

38. A method as claimed in claim 37, wherein the step (3) includes the steps of;

determining lengths of the horizontal sections and/or vertical sections from the stored deflective ratio conversion extent information, controlling slopes of horizontal and/or vertical deflective waves according to slope or slope up/down information contained in the deflective ratio conversion extent information, and providing horizontal and/or vertical deflective pulses using a horizontal or vertical synchronizing signal to slope values of the horizontal and/or vertical deflective waves.

39. A method for converting an aspect ratio of a video signal, in which a received image is displayed on a screen divided into a plurality of horizontal, and vertical sections, the method comprising the steps of:

(1) generating clock speed conversion extent information on the received image in image block units defined by the horizontal, and vertical sections;

(2) receiving, decoding, and storing the clock speed conversion extent information; and, (3) determining horizontal and/or vertical clock speed conversion extents of the received image for a block using the stored clock speed conversion extent information and converting the received image varying a clock speed for each horizontal and/or vertical positions, of the received image, with the conversion extents.

40. A method as claimed in claim 39, wherein the step (3) includes the steps of;

receiving the clock speed conversion extent information and determining lengths of the horizontal sections and/or vertical sections, controlling a slope of clock speed according to slope or slope up/down information contained in the clock speed conversion extent information, and providing horizontal and/or vertical clock speed conversion signals using a horizontal or vertical synchronizing signal to slope values of the horizontal and/or vertical clock speeds.

* * * * *